United States Patent
Holtze et al.

(10) Patent No.: US 9,498,761 B2
(45) Date of Patent: *Nov. 22, 2016

(54) FLUOROCARBON EMULSION STABILIZING SURFACTANTS

(71) Applicants: Raindance Technologies, Inc., Billerica, MA (US); President and Fellows of Harvard College, Cambridge, MA (US)

(72) Inventors: Christian Holtze, Medford, MA (US); David A. Weitz, Cambridge, MA (US); John Brian Hutchison, Medford, MA (US)

(73) Assignees: Raindance Technologies, Inc., Billerica, MA (US); President and Fellows of Harvard College, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/687,388

(22) Filed: Apr. 15, 2015

(65) Prior Publication Data

US 2015/0217246 A1 Aug. 6, 2015

Related U.S. Application Data

(63) Continuation of application No. 12/310,048, filed as application No. PCT/US2007/017617 on Aug. 7, 2007, now Pat. No. 9,012,390.

(60) Provisional application No. 60/836,455, filed on Aug. 7, 2006.

(51) Int. Cl.
| | |
|---|---|
| *B01F 17/00* | (2006.01) |
| *C08L 71/00* | (2006.01) |
| *C08G 81/00* | (2006.01) |
| *C08G 65/00* | (2006.01) |
| *C08G 65/332* | (2006.01) |
| *C08G 65/337* | (2006.01) |

(52) U.S. Cl.
CPC ......... *B01F 17/005* (2013.01); *B01F 17/0035* (2013.01); *C08G 65/007* (2013.01); *C08G 65/332* (2013.01); *C08G 65/337* (2013.01); *C08G 81/00* (2013.01); *C08L 71/00* (2013.01); *C08G 2650/48* (2013.01); *C08L 2201/52* (2013.01); *C08L 2205/05* (2013.01)

(58) Field of Classification Search
CPC .............................. B01F 17/005; C08G 81/00
USPC .............................. 435/120; 564/159; 516/27
See application file for complete search history.

(56) References Cited

U.S. PATENT DOCUMENTS

| | | | |
|---|---|---|---|
| 2,097,692 A | 11/1937 | Fiegel | |
| 2,164,172 A | 6/1939 | Dalton | |
| 2,656,508 A | 10/1953 | Coulter | |
| 2,692,800 A | 10/1954 | Nichols et al. | |
| 2,797,149 A | 6/1957 | Skeggs | |
| 2,879,141 A | 3/1959 | Skeggs | |
| 2,971,700 A | 2/1961 | Peeps | |
| 3,479,141 A | 11/1969 | Smythe et al. | |
| 3,608,821 A | 9/1971 | Simm et al. | |
| 3,621,059 A * | 11/1971 | Philip Lee Bartlett ............... | C08G 65/263 106/2 |

(Continued)

FOREIGN PATENT DOCUMENTS

| | | | |
|---|---|---|---|
| AU | WO 2005000970 A1 * | 1/2005 | ............... G03G 9/12 |
| AU | 2004225691 B2 | 6/2010 | |

(Continued)

OTHER PUBLICATIONS

Schatz et al., Screening of peptide libraries linked to lac repressor, Methods Enzymol 267: 171-91 (1996).

(Continued)

*Primary Examiner* — Nicole M Buie-Hatcher
*Assistant Examiner* — M. Reza Asdjodi
(74) *Attorney, Agent, or Firm* — Brown Rudnick LLP; Thomas C. Meyers

(57) ABSTRACT

Surfactants (e.g., fluorosurfactants) for stabilizing aqueous or hydrocarbon droplets in a fluorophilic continuous phase are presented. In some embodiments, fluorosurfactants include a fluorophilic tail soluble in a fluorophilic (e.g., fluorocarbon) continuous phase, and a headgroup soluble in either an aqueous phase or a lipophilic (e.g., hydrocarbon) phase. The combination of a fluorophilic tail and a headgroup may be chosen so as to create a surfactant with a suitable geometry for forming stabilized reverse emulsion droplets having a disperse aqueous or lipophilic phase in a continuous, fluorophilic phase. In some embodiments, the headgroup is preferably non-ionic and can prevent or limit the adsorption of molecules at the interface between the surfactant and the discontinuous phase. This configuration can allow the droplet to serve, for example, as a reaction site for certain chemical and/or biological reactions. In another embodiment, aqueous droplets are stabilized in a fluorocarbon phase at least in part by the electrostatic attraction of two oppositely charged or polar components, one of which is at least partially soluble in the dispersed phase, the other at least partially soluble in the continuous phase. One component may provide colloidal stability of the emulsion, and the other may prevent the adsorption of biomolecules at the interface between a component and the discontinuous phase. Advantageously, surfactants and surfactant combinations of the invention may provide sufficient stabilization against coalescence of droplets, without interfering with processes that can be carried out inside the droplets.

20 Claims, 18 Drawing Sheets

(56) References Cited

U.S. PATENT DOCUMENTS

| | | |
|---|---|---|
| 3,698,635 A | 10/1972 | Sickles |
| 3,784,471 A * | 1/1974 | Kaiser .................. B01J 13/0026 252/62.56 |
| 3,816,331 A | 6/1974 | Brown, Jr. et al. |
| 3,930,061 A | 12/1975 | Scharfenberger |
| 3,960,187 A | 6/1976 | Stock et al. |
| 3,980,541 A | 9/1976 | Aine |
| 3,982,541 A | 9/1976 | L'Esperance, Jr. |
| 4,014,469 A | 3/1977 | Sato |
| 4,022,575 A | 5/1977 | Hansen et al. |
| 4,034,966 A | 7/1977 | Suh et al. |
| 4,059,552 A | 11/1977 | Zweigle et al. |
| 4,091,042 A | 5/1978 | Alexanderson et al. |
| 4,117,550 A | 9/1978 | Folland et al. |
| 4,130,394 A | 12/1978 | Negersmith |
| 4,210,809 A | 7/1980 | Pelavin |
| 4,253,846 A | 3/1981 | Smythe et al. |
| 4,266,721 A | 5/1981 | Sickles |
| 4,279,345 A | 7/1981 | Allred |
| 4,297,345 A | 10/1981 | Howarth |
| 4,315,754 A | 2/1982 | Ruzicka et al. |
| 4,378,957 A | 4/1983 | Malkin et al. |
| 4,383,767 A | 5/1983 | Jido |
| 4,439,980 A | 4/1984 | Biblarz et al. |
| 4,508,265 A | 4/1985 | Jido |
| 4,533,634 A | 8/1985 | Maldonado et al. |
| 4,585,209 A | 4/1986 | Aine et al. |
| 4,618,476 A | 10/1986 | Columbus |
| 4,675,285 A | 6/1987 | Clark et al. |
| 4,676,274 A | 6/1987 | Brown |
| 4,683,195 A | 7/1987 | Mullis et al. |
| 4,683,202 A | 7/1987 | Mullis |
| 4,739,044 A | 4/1988 | Stabinsky |
| 4,757,141 A | 7/1988 | Fung et al. |
| 4,767,515 A | 8/1988 | Scott et al. |
| 4,767,929 A | 8/1988 | Valentine |
| 4,779,805 A | 10/1988 | Jackson et al. |
| 4,801,086 A | 1/1989 | Noakes |
| 4,801,529 A | 1/1989 | Perlman |
| 4,829,996 A | 5/1989 | Noakes et al. |
| 4,853,336 A | 8/1989 | Saros et al. |
| 4,859,363 A * | 8/1989 | Davis .................. A61K 9/0026 514/755 |
| 4,865,444 A | 9/1989 | Green et al. |
| 4,883,750 A | 11/1989 | Whiteley et al. |
| 4,897,211 A * | 1/1990 | Dekura .................. G11B 5/71 428/328 |
| 4,908,112 A | 3/1990 | Pace |
| 4,931,225 A | 6/1990 | Cheng |
| 4,941,959 A | 7/1990 | Scott |
| 4,962,885 A | 10/1990 | Coffee |
| 4,963,498 A | 10/1990 | Hillman et al. |
| 4,981,580 A | 1/1991 | Auer |
| 4,996,004 A | 2/1991 | Bucheler et al. |
| 5,091,652 A | 2/1992 | Mathies et al. |
| 5,096,615 A | 3/1992 | Prescott et al. |
| 5,122,360 A | 6/1992 | Harris et al. |
| 5,180,662 A | 1/1993 | Sitkovsky |
| 5,185,099 A | 2/1993 | Delpuech et al. |
| 5,188,290 A | 2/1993 | Gebauer et al. |
| 5,188,291 A | 2/1993 | Cross |
| 5,204,112 A | 4/1993 | Hope et al. |
| 5,207,973 A | 5/1993 | Harris et al. |
| 5,241,159 A | 8/1993 | Chatteriee et al. |
| 5,260,466 A | 11/1993 | McGibbon |
| 5,262,027 A | 11/1993 | Scott |
| 5,270,163 A | 12/1993 | Gold et al. |
| 5,296,375 A | 3/1994 | Kricka et al. |
| 5,304,487 A | 4/1994 | Wilding et al. |
| 5,310,653 A | 5/1994 | Hanausek-Walaszek et al. |
| 5,313,009 A | 5/1994 | Guenkel et al. |
| 5,344,594 A | 9/1994 | Sheridon |
| 5,378,957 A | 1/1995 | Kelly |
| 5,397,605 A | 3/1995 | Barbieri et al. |
| 5,399,461 A | 3/1995 | Van et al. |
| 5,399,491 A | 3/1995 | Kacian et al. |
| 5,403,617 A | 4/1995 | Haaland |
| 5,413,924 A | 5/1995 | Kosak et al. |
| 5,417,235 A | 5/1995 | Wise et al. |
| 5,427,946 A | 6/1995 | Kricka et al. |
| 5,445,934 A | 8/1995 | Fodor et al. |
| 5,452,878 A | 9/1995 | Gravesen et al. |
| 5,452,955 A | 9/1995 | Lundstrom |
| 5,454,472 A | 10/1995 | Benecke et al. |
| 5,460,945 A | 10/1995 | Springer et al. |
| 5,475,096 A | 12/1995 | Gold et al. |
| 5,480,614 A | 1/1996 | Kamahori |
| 5,486,335 A | 1/1996 | Wilding et al. |
| 5,498,392 A | 3/1996 | Wilding et al. |
| 5,500,415 A | 3/1996 | Dollat et al. |
| 5,503,851 A | 4/1996 | Mank et al. |
| 5,512,131 A | 4/1996 | Kumar et al. |
| 5,516,635 A | 5/1996 | Ekins et al. |
| 5,518,709 A | 5/1996 | Sutton et al. |
| 5,523,162 A | 6/1996 | Franz et al. |
| 5,587,128 A | 12/1996 | Wilding et al. |
| 5,604,097 A | 2/1997 | Brenner |
| 5,612,188 A | 3/1997 | Shuler et al. |
| 5,616,478 A | 4/1997 | Chetverin et al. |
| 5,617,997 A | 4/1997 | Kobayashi et al. |
| 5,635,358 A | 6/1997 | Wilding et al. |
| 5,636,400 A | 6/1997 | Young |
| 5,641,658 A | 6/1997 | Adams et al. |
| 5,643,729 A | 7/1997 | Taniguchi et al. |
| 5,655,517 A | 8/1997 | Coffee |
| 5,656,155 A | 8/1997 | Norcross et al. |
| 5,661,222 A | 8/1997 | Hare |
| 5,662,874 A | 9/1997 | David |
| 5,670,325 A | 9/1997 | Lapidus et al. |
| 5,681,600 A | 10/1997 | Antinone et al. |
| 5,695,934 A | 12/1997 | Brenner |
| 5,726,026 A | 3/1998 | Wilding et al. |
| 5,726,404 A | 3/1998 | Brody |
| 5,733,526 A | 3/1998 | Trevino et al. |
| 5,739,036 A | 4/1998 | Parris |
| 5,744,366 A | 4/1998 | Kricka et al. |
| 5,750,988 A | 5/1998 | Apffel et al. |
| 5,762,775 A | 6/1998 | DePaoli et al. |
| 5,779,868 A | 7/1998 | Parce et al. |
| 5,783,431 A | 7/1998 | Peterson et al. |
| 5,840,506 A | 11/1998 | Giordano |
| 5,846,719 A | 12/1998 | Brenner et al. |
| 5,849,491 A | 12/1998 | Radomski et al. |
| 5,858,187 A | 1/1999 | Ramsey et al. |
| 5,858,655 A | 1/1999 | Arnold |
| 5,858,670 A | 1/1999 | Lam et al. |
| 5,863,722 A | 1/1999 | Brenner |
| 5,868,322 A | 2/1999 | Loucks, Jr. et al. |
| 5,872,010 A | 2/1999 | Karger et al. |
| 5,876,771 A | 3/1999 | Sizer et al. |
| 5,880,071 A | 3/1999 | Parce et al. |
| 5,882,680 A | 3/1999 | Suzuki et al. |
| 5,884,846 A | 3/1999 | Tan |
| 5,887,755 A | 3/1999 | Hood, III |
| 5,888,746 A | 3/1999 | Tabiti et al. |
| 5,888,778 A | 3/1999 | Shuber |
| 5,904,933 A | 5/1999 | Riess et al. |
| 5,921,678 A | 7/1999 | Desai et al. |
| 5,927,852 A | 7/1999 | Serafin |
| 5,928,870 A | 7/1999 | Lapidus et al. |
| 5,932,100 A | 8/1999 | Yager et al. |
| 5,935,331 A | 8/1999 | Naka et al. |
| 5,942,056 A | 8/1999 | Singh |
| 5,942,443 A | 8/1999 | Parce et al. |
| 5,958,203 A | 9/1999 | Parce et al. |
| 5,972,187 A | 10/1999 | Parce et al. |
| 5,980,936 A | 11/1999 | Krafft et al. |
| 5,989,815 A | 11/1999 | Skolnick et al. |
| 5,989,892 A | 11/1999 | Nishimaki et al. |
| 5,995,341 A | 11/1999 | Tanaka et al. |
| 5,997,636 A | 12/1999 | Gamarnik et al. |
| 6,008,003 A | 12/1999 | Haak-Frendscho et al. |
| 6,023,540 A | 2/2000 | Walt et al. |
| 6,028,066 A | 2/2000 | Unger |

(56) References Cited

U.S. PATENT DOCUMENTS

| | | | |
|---|---|---|---|
| 6,042,709 A | 3/2000 | Parce et al. |
| 6,045,755 A | 4/2000 | Lebl et al. |
| 6,046,056 A | 4/2000 | Parce et al. |
| 6,048,551 A | 4/2000 | Hilfinger et al. |
| 6,068,199 A | 5/2000 | Coffee |
| 6,080,295 A | 6/2000 | Parce et al. |
| 6,086,740 A | 7/2000 | Kennedy |
| 6,096,495 A | 8/2000 | Kasai et al. |
| 6,103,537 A | 8/2000 | Ullman et al. |
| 6,105,571 A | 8/2000 | Coffee |
| 6,105,877 A | 8/2000 | Coffee |
| 6,116,516 A | 9/2000 | Ganan-Calvo |
| 6,118,849 A | 9/2000 | Tanimori et al. |
| 6,119,953 A | 9/2000 | Ganan-Calvo et al. |
| 6,120,666 A | 9/2000 | Jacobson et al. |
| 6,124,388 A | 9/2000 | Takai et al. |
| 6,124,439 A | 9/2000 | Friedman et al. |
| 6,130,052 A | 10/2000 | Van Baren et al. |
| 6,130,098 A | 10/2000 | Handique et al. |
| 6,137,214 A | 10/2000 | Raina |
| 6,138,077 A | 10/2000 | Brenner |
| 6,139,303 A | 10/2000 | Reed et al. |
| 6,140,053 A | 10/2000 | Koster |
| 6,143,496 A | 11/2000 | Brown et al. |
| 6,149,789 A | 11/2000 | Benecke et al. |
| 6,150,180 A | 11/2000 | Parce et al. |
| 6,150,516 A | 11/2000 | Brenner et al. |
| 6,165,778 A | 12/2000 | Kedar |
| 6,171,796 B1 | 1/2001 | An et al. |
| 6,171,850 B1 | 1/2001 | Nagle et al. |
| 6,172,214 B1 | 1/2001 | Brenner |
| 6,172,218 B1 | 1/2001 | Brenner |
| 6,174,160 B1 | 1/2001 | Lee et al. |
| 6,174,469 B1 | 1/2001 | Ganan-Calvo |
| 6,180,372 B1 | 1/2001 | Franzen |
| 6,184,012 B1 | 2/2001 | Neri et al. |
| 6,187,214 B1 | 2/2001 | Ganan-Calvo |
| 6,187,954 B1 * | 2/2001 | Falcone .............. C07C 231/02 564/136 |
| 6,189,803 B1 | 2/2001 | Ganan-Calvo |
| 6,196,525 B1 | 3/2001 | Ganan-Calvo |
| 6,197,335 B1 | 3/2001 | Sherman |
| 6,197,835 B1 | 3/2001 | Ganan-Calvo |
| 6,203,993 B1 | 3/2001 | Shuber et al. |
| 6,210,396 B1 | 4/2001 | MacDonald et al. |
| 6,210,891 B1 | 4/2001 | Nyren et al. |
| 6,210,896 B1 | 4/2001 | Chan |
| 6,214,558 B1 | 4/2001 | Shuber et al. |
| 6,221,654 B1 | 4/2001 | Quake et al. |
| 6,227,466 B1 | 5/2001 | Hartman et al. |
| 6,234,402 B1 | 5/2001 | Ganan-Calvo |
| 6,235,383 B1 | 5/2001 | Hong et al. |
| 6,235,475 B1 | 5/2001 | Brenner et al. |
| 6,241,159 B1 | 6/2001 | Ganan-Calvo et al. |
| 6,243,373 B1 | 6/2001 | Turock |
| 6,248,378 B1 | 6/2001 | Ganan-Calvo |
| 6,251,661 B1 | 6/2001 | Urabe et al. |
| 6,252,129 B1 | 6/2001 | Coffee |
| 6,258,568 B1 | 7/2001 | Nyren |
| 6,258,858 B1 | 7/2001 | Nakajima et al. |
| 6,263,222 B1 | 7/2001 | Diab et al. |
| 6,266,459 B1 | 7/2001 | Walt et al. |
| 6,267,353 B1 | 7/2001 | Friedline et al. |
| 6,267,858 B1 | 7/2001 | Parce et al. |
| 6,268,165 B1 | 7/2001 | O'Brien |
| 6,268,222 B1 | 7/2001 | Chandler et al. |
| 6,274,320 B1 | 8/2001 | Rothberg et al. |
| 6,274,337 B1 | 8/2001 | Parce et al. |
| 6,294,344 B1 | 9/2001 | O'Brien |
| 6,296,673 B1 | 10/2001 | Santarsiero et al. |
| 6,299,145 B1 | 10/2001 | Ganan-Calvo |
| 6,301,055 B1 | 10/2001 | Legrand et al. |
| 6,306,659 B1 | 10/2001 | Parce et al. |
| 6,310,354 B1 | 10/2001 | Hanninen et al. |
| 6,310,653 B1 | 10/2001 | Malcolm, Jr. et al. |
| 6,316,208 B1 | 11/2001 | Roberts et al. |
| 6,316,213 B1 | 11/2001 | O'Brien |
| 6,318,640 B1 | 11/2001 | Coffee |
| 6,336,463 B1 | 1/2002 | Ohta |
| 6,344,325 B1 | 2/2002 | Quake et al. |
| 6,352,828 B1 | 3/2002 | Brenner |
| 6,355,193 B1 | 3/2002 | Stott |
| 6,355,198 B1 | 3/2002 | Kim et al. |
| 6,357,670 B2 | 3/2002 | Ganan-Calvo |
| 6,386,463 B1 | 5/2002 | Ganan-Calvo |
| 6,391,559 B1 | 5/2002 | Brown et al. |
| 6,394,429 B2 | 5/2002 | Ganan-Calvo |
| 6,399,339 B1 | 6/2002 | Wolberg et al. |
| 6,399,389 B1 | 6/2002 | Parce et al. |
| 6,403,373 B1 | 6/2002 | Scanlan et al. |
| 6,405,936 B1 | 6/2002 | Ganan-Calvo |
| 6,408,878 B2 | 6/2002 | Unger et al. |
| 6,409,832 B2 | 6/2002 | Weigl et al. |
| 6,429,025 B1 | 8/2002 | Parce et al. |
| 6,429,148 B1 | 8/2002 | Chu et al. |
| 6,432,143 B2 | 8/2002 | Kubiak et al. |
| 6,432,148 B1 | 8/2002 | Ganan-Calvo |
| 6,432,630 B1 | 8/2002 | Blankenstein |
| 6,439,103 B1 | 8/2002 | Miller |
| 6,440,706 B1 | 8/2002 | Vogelstein et al. |
| 6,450,139 B1 | 9/2002 | Watanabe |
| 6,450,189 B1 | 9/2002 | Ganan-Calvo |
| 6,454,193 B1 | 9/2002 | Busick et al. |
| 6,464,336 B1 | 10/2002 | Sharma |
| 6,464,886 B2 | 10/2002 | Ganan-Calvo |
| 6,475,441 B1 | 11/2002 | Parce et al. |
| 6,481,648 B1 | 11/2002 | Zimmermann |
| 6,489,103 B1 | 12/2002 | Griffiths et al. |
| 6,503,933 B1 | 1/2003 | Moloney et al. |
| 6,506,609 B1 | 1/2003 | Wada et al. |
| 6,508,988 B1 | 1/2003 | Van Dam et al. |
| 6,520,425 B1 | 2/2003 | Reneker |
| 6,524,456 B1 | 2/2003 | Ramsey et al. |
| 6,540,395 B2 | 4/2003 | Muhlbauer et al. |
| 6,540,895 B1 | 4/2003 | Spence et al. |
| 6,551,836 B1 | 4/2003 | Chow et al. |
| 6,553,944 B1 | 4/2003 | Allen et al. |
| 6,553,960 B1 | 4/2003 | Yoshikawa et al. |
| 6,554,202 B2 | 4/2003 | Ganan-Calvo |
| 6,557,334 B2 | 5/2003 | Jager |
| 6,557,834 B2 | 5/2003 | Ganan-Calvo |
| 6,558,944 B1 | 5/2003 | Parce et al. |
| 6,558,960 B1 | 5/2003 | Parce et al. |
| 6,560,030 B2 | 5/2003 | Legrand et al. |
| 6,565,010 B2 | 5/2003 | Anderson et al. |
| 6,569,631 B1 | 5/2003 | Pantoliano et al. |
| 6,576,420 B1 | 6/2003 | Carson et al. |
| 6,591,852 B1 | 7/2003 | McNeely et al. |
| 6,592,321 B2 | 7/2003 | Bonker et al. |
| 6,592,821 B1 | 7/2003 | Wada et al. |
| 6,608,726 B2 | 8/2003 | Legrand et al. |
| 6,610,499 B1 | 8/2003 | Fulwyler et al. |
| 6,614,598 B1 | 9/2003 | Quake et al. |
| 6,627,603 B1 | 9/2003 | Bibette et al. |
| 6,630,006 B2 | 10/2003 | Santarsiero et al. |
| 6,630,353 B1 | 10/2003 | Parce et al. |
| 6,632,619 B1 | 10/2003 | Harrison et al. |
| 6,638,749 B1 * | 10/2003 | Beckman .............. C07K 1/145 435/183 |
| 6,645,432 B1 | 11/2003 | Anderson et al. |
| 6,646,253 B1 | 11/2003 | Rohwer et al. |
| 6,653,626 B2 | 11/2003 | Fischer et al. |
| 6,656,267 B2 | 12/2003 | Newman |
| 6,659,370 B1 | 12/2003 | Inoue |
| 6,660,252 B2 | 12/2003 | Matathia et al. |
| 6,670,142 B2 | 12/2003 | Lau et al. |
| 6,679,441 B1 | 1/2004 | Borra et al. |
| 6,680,178 B2 | 1/2004 | Harris et al. |
| 6,682,890 B2 | 1/2004 | Mack et al. |
| 6,717,136 B2 | 4/2004 | Andersson et al. |
| 6,729,561 B2 | 5/2004 | Hirae et al. |
| 6,739,036 B2 | 5/2004 | Koike et al. |
| 6,744,046 B2 | 6/2004 | Valaskovic et al. |
| 6,752,922 B2 | 6/2004 | Huang et al. |

(56) References Cited

U.S. PATENT DOCUMENTS

| | | |
|---|---|---|
| 6,753,147 B2 | 6/2004 | Vogelstein et al. |
| 6,766,817 B2 | 7/2004 | da Silva |
| 6,767,194 B2 | 7/2004 | Jeon et al. |
| 6,767,704 B2 | 7/2004 | Waldman et al. |
| 6,790,328 B2 | 9/2004 | Jacobson et al. |
| 6,793,753 B2 | 9/2004 | Unger et al. |
| 6,797,056 B2 | 9/2004 | David |
| 6,800,849 B2 | 10/2004 | Staats |
| 6,806,058 B2 | 10/2004 | Jesperson et al. |
| 6,808,382 B2 | 10/2004 | Lanfranchi |
| 6,808,882 B2 | 10/2004 | Griffiths et al. |
| 6,814,980 B2 | 11/2004 | Levy et al. |
| 6,815,040 B2 * | 11/2004 | Pellerite ............... C03C 12/00 359/453 |
| 6,818,395 B1 | 11/2004 | Quake et al. |
| 6,832,787 B1 | 12/2004 | Renzi |
| 6,833,242 B2 | 12/2004 | Quake et al. |
| 6,841,350 B2 | 1/2005 | Ogden et al. |
| 6,872,250 B2 | 3/2005 | David et al. |
| 6,890,487 B1 | 5/2005 | Sklar et al. |
| 6,897,018 B1 | 5/2005 | Yuan et al. |
| 6,905,844 B2 | 6/2005 | Kim |
| 6,918,404 B2 | 7/2005 | Dias da Silva |
| 6,926,313 B1 | 8/2005 | Renzi |
| 6,935,768 B2 | 8/2005 | Lowe et al. |
| 6,936,417 B2 | 8/2005 | Orntoft |
| 6,942,978 B1 | 9/2005 | O'Brien |
| 6,949,342 B2 | 9/2005 | Golub et al. |
| 6,960,437 B2 | 11/2005 | Enzelberger et al. |
| 6,974,667 B2 | 12/2005 | Horne et al. |
| 6,998,232 B1 | 2/2006 | Feinstein et al. |
| 7,005,251 B2 * | 2/2006 | Kashiwagi ............... G03C 1/09 430/224 |
| 7,022,472 B2 | 4/2006 | Robbins et al. |
| 7,041,481 B2 | 5/2006 | Anderson et al. |
| 7,049,072 B2 | 5/2006 | Seshi |
| 7,056,674 B2 | 6/2006 | Baker et al. |
| 7,057,026 B2 | 6/2006 | Barnes et al. |
| 7,066,586 B2 | 6/2006 | da Silva |
| 7,068,874 B2 | 6/2006 | Wang et al. |
| 7,078,180 B2 | 7/2006 | Genetta |
| 7,081,192 B1 | 7/2006 | Wang et al. |
| 7,081,340 B2 | 7/2006 | Baker et al. |
| 7,090,983 B1 | 8/2006 | Muramatsu et al. |
| 7,115,230 B2 | 10/2006 | Sundararajan et al. |
| 7,118,910 B2 | 10/2006 | Unger et al. |
| 7,129,091 B2 | 10/2006 | Ismagilov et al. |
| 7,138,233 B2 | 11/2006 | Griffiths et al. |
| 7,153,700 B1 | 12/2006 | Pardee et al. |
| 7,156,917 B2 | 1/2007 | Moriyama et al. |
| 7,163,801 B2 | 1/2007 | Reed |
| 7,169,560 B2 | 1/2007 | Lapidus et al. |
| 7,171,311 B2 | 1/2007 | Dai et al. |
| 7,198,899 B2 | 4/2007 | Schleyer et al. |
| 7,204,431 B2 | 4/2007 | Li et al. |
| 7,229,770 B1 | 6/2007 | Price et al. |
| 7,238,750 B2 * | 7/2007 | Muller .................. C08F 2/48 525/292 |
| 7,252,943 B2 | 8/2007 | Griffiths et al. |
| 7,267,938 B2 | 9/2007 | Anderson et al. |
| 7,268,167 B2 | 9/2007 | Higuchi et al. |
| 7,282,337 B1 | 10/2007 | Harris |
| 7,291,462 B2 | 11/2007 | O'Brien et al. |
| 7,294,503 B2 | 11/2007 | Quake et al. |
| 7,300,765 B2 | 11/2007 | Patel |
| 7,308,364 B2 | 12/2007 | Shaughnessy et al. |
| 7,314,721 B2 | 1/2008 | Gure et al. |
| 7,316,906 B2 | 1/2008 | Chiorazzi et al. |
| 7,326,529 B2 | 2/2008 | Ali et al. |
| 7,332,280 B2 | 2/2008 | Levy et al. |
| 7,332,590 B2 | 2/2008 | Nacht et al. |
| 7,341,211 B2 | 3/2008 | Ganan Calvo et al. |
| 7,348,142 B2 | 3/2008 | Wang |
| 7,358,231 B1 | 4/2008 | McCaffey et al. |
| 7,361,474 B2 | 4/2008 | Siegler |
| 7,364,862 B2 | 4/2008 | Ali et al. |
| 7,368,255 B2 | 5/2008 | Bae et al. |
| 7,378,233 B2 | 5/2008 | Sidransky et al. |
| 7,378,280 B2 | 5/2008 | Quake et al. |
| 7,390,463 B2 | 6/2008 | He et al. |
| 7,393,665 B2 | 7/2008 | Brenner |
| 7,416,851 B2 | 8/2008 | Davi et al. |
| 7,429,467 B2 | 9/2008 | Holliger et al. |
| 7,432,064 B2 | 10/2008 | Salceda et al. |
| 7,442,507 B2 | 10/2008 | Polsky et al. |
| 7,449,303 B2 | 11/2008 | Coignet |
| 7,468,271 B2 | 12/2008 | Golovchenko et al. |
| 7,473,530 B2 | 1/2009 | Huttemann |
| 7,473,531 B1 | 1/2009 | Domon et al. |
| 7,476,506 B2 | 1/2009 | Schleyer et al. |
| 7,479,370 B2 | 1/2009 | Coignet |
| 7,479,371 B2 | 1/2009 | Ando et al. |
| 7,479,376 B2 | 1/2009 | Waldman et al. |
| 7,482,129 B2 | 1/2009 | Soyupak et al. |
| 7,501,244 B2 | 3/2009 | Reinhard et al. |
| 7,504,214 B2 | 3/2009 | Erlander et al. |
| 7,507,532 B2 | 3/2009 | Chang et al. |
| 7,507,541 B2 | 3/2009 | Raitano et al. |
| 7,510,707 B2 | 3/2009 | Platica et al. |
| 7,510,842 B2 | 3/2009 | Podust et al. |
| 7,514,209 B2 | 4/2009 | Dai et al. |
| 7,514,210 B2 | 4/2009 | Holliger et al. |
| 7,524,633 B2 | 4/2009 | Sidransky |
| 7,527,933 B2 | 5/2009 | Sahin et al. |
| 7,537,897 B2 | 5/2009 | Brenner et al. |
| 7,541,383 B2 | 6/2009 | Fu et al. |
| 7,544,473 B2 | 6/2009 | Brenner |
| 7,556,776 B2 | 7/2009 | Fraden et al. |
| 7,582,446 B2 | 9/2009 | Griffiths et al. |
| 7,622,081 B2 | 11/2009 | Chou et al. |
| 7,632,562 B2 | 12/2009 | Nair et al. |
| 7,635,562 B2 | 12/2009 | Harris et al. |
| 7,638,276 B2 | 12/2009 | Griffiths et al. |
| 7,655,435 B2 | 2/2010 | Holliger et al. |
| 7,655,470 B2 | 2/2010 | Ismagilov et al. |
| 7,666,593 B2 | 2/2010 | Lapidus |
| 7,691,576 B2 | 4/2010 | Holliger et al. |
| 7,698,287 B2 | 4/2010 | Becker et al. |
| 7,708,949 B2 | 5/2010 | Stone et al. |
| 7,718,578 B2 | 5/2010 | Griffiths et al. |
| 7,736,890 B2 | 6/2010 | Sia et al. |
| 7,741,130 B2 | 6/2010 | Lee, Jr. et al. |
| 7,814,175 B1 | 10/2010 | Chang et al. |
| 7,824,889 B2 | 11/2010 | Vogelstein et al. |
| 7,888,017 B2 | 2/2011 | Quake et al. |
| 7,897,044 B2 | 3/2011 | Hoyos et al. |
| 7,897,341 B2 | 3/2011 | Griffiths et al. |
| 7,901,939 B2 | 3/2011 | Ismagilov et al. |
| 7,955,575 B2 * | 6/2011 | Derand ............. B01L 3/502707 204/451 |
| 7,968,287 B2 | 6/2011 | Griffiths et al. |
| 8,012,382 B2 | 9/2011 | Kim et al. |
| 8,153,402 B2 | 4/2012 | Holliger et al. |
| 2001/0010338 A1 | 8/2001 | Ganan-Calvo |
| 2001/0020011 A1 | 9/2001 | Mathiowitz et al. |
| 2001/0023078 A1 | 9/2001 | Bawendi et al. |
| 2001/0029983 A1 | 10/2001 | Unger et al. |
| 2001/0034031 A1 | 10/2001 | Short et al. |
| 2001/0041343 A1 | 11/2001 | Pankowsky |
| 2001/0041344 A1 | 11/2001 | Sepetov et al. |
| 2001/0042793 A1 | 11/2001 | Ganan-Calvo |
| 2001/0048900 A1 | 12/2001 | Bardell et al. |
| 2001/0050881 A1 | 12/2001 | Depaoli et al. |
| 2002/0004532 A1 | 1/2002 | Matathia et al. |
| 2002/0005354 A1 | 1/2002 | Spence et al. |
| 2002/0008028 A1 | 1/2002 | Jacobson et al. |
| 2002/0012971 A1 | 1/2002 | Mehta |
| 2002/0022038 A1 | 2/2002 | Biatry et al. |
| 2002/0022261 A1 | 2/2002 | Anderson et al. |
| 2002/0033422 A1 | 3/2002 | Ganan-Calvo |
| 2002/0036139 A1 | 3/2002 | Becker et al. |
| 2002/0058332 A1 | 5/2002 | Quake et al. |
| 2002/0067800 A1 | 6/2002 | Newman et al. |
| 2002/0119459 A1 | 8/2002 | Griffiths |

(56) References Cited

U.S. PATENT DOCUMENTS

| | | |
|---|---|---|
| 2002/0125135 A1* | 9/2002 | Derand ............ B01L 3/502707 204/454 |
| 2002/0143437 A1 | 10/2002 | Handique et al. |
| 2002/0155080 A1 | 10/2002 | Glenn et al. |
| 2002/0158027 A1 | 10/2002 | Moon et al. |
| 2002/0164271 A1 | 11/2002 | Ho |
| 2002/0164629 A1 | 11/2002 | Quake et al. |
| 2003/0012586 A1 | 1/2003 | Iwata et al. |
| 2003/0015425 A1 | 1/2003 | Bohm et al. |
| 2003/0017579 A1 | 1/2003 | Corn et al. |
| 2003/0039169 A1 | 2/2003 | Ehrfeld et al. |
| 2003/0059764 A1 | 3/2003 | Ravkin et al. |
| 2003/0061687 A1 | 4/2003 | Hansen et al. |
| 2003/0064414 A1 | 4/2003 | Benecky et al. |
| 2003/0082795 A1 | 5/2003 | Shuler et al. |
| 2003/0124586 A1 | 7/2003 | Griffiths et al. |
| 2003/0144260 A1 | 7/2003 | Gilon |
| 2003/0148544 A1 | 8/2003 | Nie et al. |
| 2003/0169227 A1* | 9/2003 | Wu .......................... G02F 1/167 345/107 |
| 2003/0183525 A1 | 10/2003 | Elrod et al. |
| 2003/0224509 A1 | 12/2003 | Moon et al. |
| 2003/0229376 A1 | 12/2003 | Sandhu |
| 2003/0230486 A1 | 12/2003 | Chien et al. |
| 2003/0232356 A1 | 12/2003 | Dooley et al. |
| 2004/0005582 A1 | 1/2004 | Shipwash |
| 2004/0005594 A1 | 1/2004 | Holliger et al. |
| 2004/0018525 A1 | 1/2004 | Wirtz et al. |
| 2004/0027915 A1 | 2/2004 | Lowe et al. |
| 2004/0037813 A1 | 2/2004 | Simpson et al. |
| 2004/0041093 A1 | 3/2004 | Schultz et al. |
| 2004/0050946 A1 | 3/2004 | Wang et al. |
| 2004/0053247 A1 | 3/2004 | Cordon-Cardo et al. |
| 2004/0068019 A1 | 4/2004 | Higuchi et al. |
| 2004/0071781 A1 | 4/2004 | Chattopadhyay et al. |
| 2004/0079881 A1 | 4/2004 | Fischer et al. |
| 2004/0096515 A1 | 5/2004 | Bausch et al. |
| 2004/0136497 A1 | 7/2004 | Meldrum et al. |
| 2004/0146921 A1 | 7/2004 | Eveleigh et al. |
| 2004/0159633 A1 | 8/2004 | Whitesides et al. |
| 2004/0181131 A1 | 9/2004 | Maynard et al. |
| 2004/0181343 A1 | 9/2004 | Wigstrom et al. |
| 2004/0182712 A1 | 9/2004 | Basol |
| 2004/0188254 A1 | 9/2004 | Spaid |
| 2004/0224419 A1 | 11/2004 | Zheng et al. |
| 2004/0253731 A1 | 12/2004 | Holliger et al. |
| 2004/0258203 A1 | 12/2004 | Yamano et al. |
| 2005/0032238 A1 | 2/2005 | Karp et al. |
| 2005/0032240 A1 | 2/2005 | Lee et al. |
| 2005/0037392 A1 | 2/2005 | Griffiths et al. |
| 2005/0042648 A1 | 2/2005 | Griffiths et al. |
| 2005/0048467 A1 | 3/2005 | Sastry et al. |
| 2005/0064460 A1 | 3/2005 | Holliger et al. |
| 2005/0069920 A1 | 3/2005 | Griffiths et al. |
| 2005/0079510 A1 | 4/2005 | Berka et al. |
| 2005/0084923 A1 | 4/2005 | Mueller et al. |
| 2005/0087122 A1 | 4/2005 | Ismagliov et al. |
| 2005/0095611 A1 | 5/2005 | Chan et al. |
| 2005/0100895 A1 | 5/2005 | Waldman et al. |
| 2005/0129582 A1 | 6/2005 | Breidford et al. |
| 2005/0152908 A1 | 7/2005 | Liew et al. |
| 2005/0164239 A1 | 7/2005 | Griffiths et al. |
| 2005/0170431 A1 | 8/2005 | Ibrahim et al. |
| 2005/0172476 A1 | 8/2005 | Stone et al. |
| 2005/0183995 A1 | 8/2005 | Deshpande et al. |
| 2005/0207940 A1 | 9/2005 | Butler et al. |
| 2005/0221339 A1 | 10/2005 | Griffiths et al. |
| 2005/0226742 A1 | 10/2005 | Unger et al. |
| 2005/0227264 A1 | 10/2005 | Nobile et al. |
| 2005/0260566 A1 | 11/2005 | Fischer et al. |
| 2005/0272159 A1 | 12/2005 | Ismagliov et al. |
| 2006/0003347 A1 | 1/2006 | Griffiths et al. |
| 2006/0003429 A1 | 1/2006 | Frost et al. |
| 2006/0003439 A1 | 1/2006 | Ismagliov et al. |
| 2006/0036348 A1 | 2/2006 | Handique et al. |
| 2006/0046257 A1 | 3/2006 | Pollock et al. |
| 2006/0051329 A1 | 3/2006 | Lee et al. |
| 2006/0078888 A1 | 4/2006 | Griffiths et al. |
| 2006/0078893 A1* | 4/2006 | Griffiths ............... B01F 5/0646 435/6.16 |
| 2006/0094119 A1 | 5/2006 | Ismagliov et al. |
| 2006/0108012 A1 | 5/2006 | Barrow et al. |
| 2006/0110759 A1 | 5/2006 | Paris et al. |
| 2006/0115821 A1 | 6/2006 | Einstein et al. |
| 2006/0147909 A1 | 7/2006 | Rarbach et al. |
| 2006/0153924 A1 | 7/2006 | Griffiths et al. |
| 2006/0154298 A1 | 7/2006 | Griffiths et al. |
| 2006/0160762 A1 | 7/2006 | Zetter et al. |
| 2006/0163385 A1 | 7/2006 | Link et al. |
| 2006/0169800 A1 | 8/2006 | Rosell et al. |
| 2006/0195269 A1 | 8/2006 | Yeatman et al. |
| 2006/0223127 A1 | 10/2006 | Yip et al. |
| 2006/0234254 A1 | 10/2006 | An et al. |
| 2006/0234259 A1 | 10/2006 | Rubin et al. |
| 2006/0252057 A1 | 11/2006 | Raponi et al. |
| 2006/0258841 A1 | 11/2006 | Michl et al. |
| 2006/0263888 A1 | 11/2006 | Fritz et al. |
| 2006/0269558 A1 | 11/2006 | Murphy et al. |
| 2006/0269971 A1 | 11/2006 | Diamandis |
| 2006/0281089 A1 | 12/2006 | Gibson et al. |
| 2007/0003442 A1 | 1/2007 | Link et al. |
| 2007/0026439 A1 | 2/2007 | Faulstich et al. |
| 2007/0053896 A1 | 3/2007 | Ahmed et al. |
| 2007/0054119 A1 | 3/2007 | Garstecki et al. |
| 2007/0056853 A1 | 3/2007 | Aizenberg et al. |
| 2007/0077572 A1 | 4/2007 | Tawfik et al. |
| 2007/0077579 A1 | 4/2007 | Griffiths et al. |
| 2007/0092914 A1 | 4/2007 | Griffiths et al. |
| 2007/0120899 A1 | 5/2007 | Ohnishi et al. |
| 2007/0123430 A1* | 5/2007 | Pasquier ..................... C09K 8/34 507/136 |
| 2007/0154889 A1 | 7/2007 | Wang |
| 2007/0166705 A1 | 7/2007 | Milton et al. |
| 2007/0184439 A1 | 8/2007 | Guilford et al. |
| 2007/0184489 A1 | 8/2007 | Griffiths et al. |
| 2007/0195127 A1 | 8/2007 | Ahn et al. |
| 2007/0213410 A1* | 9/2007 | Hastwell ................ G03G 9/135 516/20 |
| 2007/0259351 A1 | 11/2007 | Chinitz et al. |
| 2007/0259368 A1 | 11/2007 | An et al. |
| 2007/0259374 A1 | 11/2007 | Griffiths et al. |
| 2007/0292869 A1 | 12/2007 | Becker et al. |
| 2008/0003142 A1* | 1/2008 | Link ..................... B01F 3/0807 422/82.08 |
| 2008/0009005 A1 | 1/2008 | Kruk |
| 2008/0014589 A1 | 1/2008 | Link et al. |
| 2008/0014590 A1 | 1/2008 | Dahary et al. |
| 2008/0020940 A1 | 1/2008 | Stedronsky et al. |
| 2008/0021330 A1 | 1/2008 | Hwang et al. |
| 2008/0023330 A1 | 1/2008 | Viovy et al. |
| 2008/0038754 A1 | 2/2008 | Farias-Eisner et al. |
| 2008/0044828 A1 | 2/2008 | Kwok |
| 2008/0050378 A1 | 2/2008 | Nakamura et al. |
| 2008/0050723 A1 | 2/2008 | Belacel et al. |
| 2008/0053205 A1 | 3/2008 | Pollack et al. |
| 2008/0057514 A1 | 3/2008 | Goldenring |
| 2008/0058432 A1 | 3/2008 | Wang et al. |
| 2008/0063227 A1 | 3/2008 | Rohrseitz |
| 2008/0064047 A1 | 3/2008 | Zetter et al. |
| 2008/0081330 A1 | 4/2008 | Kahvejian |
| 2008/0081333 A1 | 4/2008 | Mori et al. |
| 2008/0092973 A1 | 4/2008 | Lai |
| 2008/0113340 A1 | 5/2008 | Schlegel |
| 2008/0118462 A1 | 5/2008 | Alani et al. |
| 2008/0138806 A1 | 6/2008 | Chow et al. |
| 2008/0166772 A1 | 7/2008 | Hollinger et al. |
| 2008/0171078 A1 | 7/2008 | Gray |
| 2008/0176211 A1 | 7/2008 | Spence et al. |
| 2008/0176236 A1 | 7/2008 | Tsao et al. |
| 2008/0181850 A1 | 7/2008 | Thaxton et al. |
| 2008/0206756 A1 | 8/2008 | Lee et al. |
| 2008/0222741 A1 | 9/2008 | Chinnaiyan |
| 2008/0234138 A1 | 9/2008 | Shaughnessy et al. |
| 2008/0234139 A1 | 9/2008 | Shaughnessy et al. |

(56) References Cited

U.S. PATENT DOCUMENTS

| | | |
|---|---|---|
| 2008/0268473 A1 | 10/2008 | Moses et al. |
| 2008/0269157 A1 | 10/2008 | Srivastava et al. |
| 2008/0274908 A1 | 11/2008 | Chang |
| 2008/0280302 A1 | 11/2008 | Kebebew |
| 2008/0286199 A1 | 11/2008 | Livingston et al. |
| 2008/0286801 A1 | 11/2008 | Arjol et al. |
| 2008/0286811 A1 | 11/2008 | Moses et al. |
| 2008/0293578 A1 | 11/2008 | Shaugnessy et al. |
| 2008/0311570 A1 | 12/2008 | Lai |
| 2008/0311604 A1 | 12/2008 | Elting et al. |
| 2009/0004687 A1 | 1/2009 | Mansfield et al. |
| 2009/0005254 A1 | 1/2009 | Griffiths et al. |
| 2009/0012187 A1 | 1/2009 | Chu et al. |
| 2009/0017463 A1 | 1/2009 | Bhowmick |
| 2009/0021728 A1 | 1/2009 | Heinz et al. |
| 2009/0023137 A1 | 1/2009 | Van Der Zee et al. |
| 2009/0026082 A1 | 1/2009 | Rothberg et al. |
| 2009/0029372 A1 | 1/2009 | Wewer |
| 2009/0042737 A1 | 2/2009 | Katz et al. |
| 2009/0053700 A1 | 2/2009 | Griffiths et al. |
| 2009/0053732 A1 | 2/2009 | Vermesh et al. |
| 2009/0060797 A1 | 3/2009 | Mathies et al. |
| 2009/0062144 A1 | 3/2009 | Guo |
| 2009/0068170 A1 | 3/2009 | Weitz et al. |
| 2009/0075265 A1 | 3/2009 | Budiman et al. |
| 2009/0075307 A1 | 3/2009 | Fischer et al. |
| 2009/0075311 A1 | 3/2009 | Karl |
| 2009/0081237 A1 | 3/2009 | D'Andrea et al. |
| 2009/0081685 A1 | 3/2009 | Beyer et al. |
| 2009/0087849 A1 | 4/2009 | Malinowski et al. |
| 2009/0092973 A1 | 4/2009 | Erlander et al. |
| 2009/0098542 A1 | 4/2009 | Budiman et al. |
| 2009/0098543 A1 | 4/2009 | Budiman et al. |
| 2009/0118128 A1 | 5/2009 | Liu et al. |
| 2009/0124569 A1 | 5/2009 | Bergan et al. |
| 2009/0127454 A1 | 5/2009 | Ritchie et al. |
| 2009/0127589 A1 | 5/2009 | Rothberg et al. |
| 2009/0131353 A1 | 5/2009 | Insel et al. |
| 2009/0131543 A1 | 5/2009 | Weitz et al. |
| 2009/0191565 A1 | 7/2009 | Lapidus et al. |
| 2009/0197248 A1 | 8/2009 | Griffiths et al. |
| 2009/0197772 A1 | 8/2009 | Griffiths et al. |
| 2009/0246788 A1 | 10/2009 | Albert et al. |
| 2009/0325236 A1 | 12/2009 | Griffiths et al. |
| 2010/0003687 A1 | 1/2010 | Simen et al. |
| 2010/0009353 A1 | 1/2010 | Barnes et al. |
| 2010/0022414 A1* | 1/2010 | Link .................. B01F 3/0807 506/18 |
| 2010/0035252 A1 | 2/2010 | Rothberg et al. |
| 2010/0075436 A1 | 3/2010 | Urdea et al. |
| 2010/0105112 A1* | 4/2010 | Holtze ................ C08G 65/007 435/120 |
| 2010/0111768 A1 | 5/2010 | Banerjee et al. |
| 2010/0124759 A1 | 5/2010 | Wang et al. |
| 2010/0136544 A1 | 6/2010 | Agresti et al. |
| 2010/0137143 A1 | 6/2010 | Rothberg et al. |
| 2010/0137163 A1 | 6/2010 | Link et al. |
| 2010/0159592 A1 | 6/2010 | Holliger et al. |
| 2010/0172803 A1 | 7/2010 | Stone et al. |
| 2010/0188073 A1 | 7/2010 | Rothberg et al. |
| 2010/0197507 A1 | 8/2010 | Rothberg et al. |
| 2010/0210479 A1 | 8/2010 | Griffiths et al. |
| 2010/0213628 A1 | 8/2010 | Bausch et al. |
| 2010/0233026 A1 | 9/2010 | Ismagliov et al. |
| 2010/0282617 A1 | 11/2010 | Rothberg et al. |
| 2010/0300559 A1 | 12/2010 | Schultz et al. |
| 2010/0300895 A1 | 12/2010 | Nobile et al. |
| 2010/0301398 A1 | 12/2010 | Rothberg et al. |
| 2010/0304982 A1 | 12/2010 | Hinz et al. |
| 2011/0000560 A1 | 1/2011 | Miller et al. |
| 2011/0142734 A1 | 6/2011 | Ismagilov et al. |
| 2011/0174622 A1 | 7/2011 | Ismagilov et al. |
| 2011/0176966 A1 | 7/2011 | Ismagilov et al. |
| 2011/0177494 A1 | 7/2011 | Ismagilov et al. |
| 2011/0177586 A1 | 7/2011 | Ismagilov et al. |
| 2011/0177609 A1 | 7/2011 | Ismagilov et al. |
| 2011/0188717 A1 | 8/2011 | Baudry et al. |
| 2011/0190146 A1 | 8/2011 | Boehm et al. |
| 2011/0244455 A1 | 10/2011 | Larson et al. |
| 2011/0250597 A1 | 10/2011 | Larson et al. |
| 2011/0275063 A1 | 11/2011 | Weitz et al. |
| 2012/0010098 A1 | 1/2012 | Griffiths et al. |
| 2012/0015382 A1 | 1/2012 | Weitz et al. |
| 2012/0015822 A1 | 1/2012 | Weitz et al. |
| 2012/0184464 A1* | 7/2012 | Lee .................. B01L 3/502784 506/17 |
| 2012/0264646 A1* | 10/2012 | Link .................. B01F 3/0807 506/11 |
| 2015/0217246 A1* | 8/2015 | Holtze .................. B01F 17/005 524/17 |

FOREIGN PATENT DOCUMENTS

| | | | |
|---|---|---|---|
| CA | 2520548 A1 | 10/2004 | |
| CH | 563807 A5 | 7/1975 | |
| DE | 43 08 839 C2 | 4/1997 | |
| EP | 0047130 B1 | 2/1985 | |
| EP | 0361343 A1 * | 4/1990 | ............ B60R 19/36 |
| EP | 0361346 A2 | 4/1990 | |
| EP | 0249007 A3 | 3/1991 | |
| EP | 0476178 A1 | 3/1992 | |
| EP | 0540281 B1 | 7/1996 | |
| EP | 0528580 B1 | 12/1996 | |
| EP | 0895120 | 2/1999 | |
| EP | 1741482 | 1/2007 | |
| EP | 2127736 | 12/2009 | |
| GB | 1148543 | 4/1969 | |
| GB | 1 446 998 | 8/1976 | |
| GB | 2 005 224 | 4/1979 | |
| GB | 2 047 880 | 12/1980 | |
| GB | 2 062 225 | 5/1981 | |
| GB | 2 064 114 | 6/1981 | |
| GB | 2 097 692 A | 11/1982 | |
| GB | 2 210 532 | 6/1989 | |
| JP | 3-232525 | 10/1998 | |
| JP | 2000-27145 | 10/2000 | |
| WO | 84/02000 | 5/1984 | |
| WO | 91/05058 A1 | 4/1991 | |
| WO | 91/07772 | 5/1991 | |
| WO | 92/03734 | 3/1992 | |
| WO | 92/21746 | 12/1992 | |
| WO | 93/03151 | 2/1993 | |
| WO | 93/08278 | 4/1993 | |
| WO | 93/22053 | 11/1993 | |
| WO | 93/22054 | 11/1993 | |
| WO | 93/22055 | 11/1993 | |
| WO | 93/22058 | 11/1993 | |
| WO | 93/22421 | 11/1993 | |
| WO | 94/16332 | 7/1994 | |
| WO | 94/23738 | 10/1994 | |
| WO | 94/24314 | 10/1994 | |
| WO | 94/26766 | 11/1994 | |
| WO | 95/11922 | 5/1995 | |
| WO | 95/19922 | 7/1995 | |
| WO | 95/24929 | 9/1995 | |
| WO | 95/33447 | 12/1995 | |
| WO | 96/34112 | 10/1996 | |
| WO | 96/38730 | 12/1996 | |
| WO | 96/40062 | 12/1996 | |
| WO | 96/40723 | 12/1996 | |
| WO | 97/00125 | 1/1997 | |
| WO | 97/00442 | 1/1997 | |
| WO | 97/04297 | 2/1997 | |
| WO | 97/04748 | 2/1997 | |
| WO | 97/23140 | 7/1997 | |
| WO | 97/28556 | 8/1997 | |
| WO | 97/39814 | 10/1997 | |
| WO | 97/40141 | 10/1997 | |
| WO | 97/45644 | 12/1997 | |
| WO | 97/47763 | 12/1997 | |
| WO | 98/00231 | 1/1998 | |
| WO | 98/00705 | 1/1998 | |
| WO | 98/02237 | 1/1998 | |
| WO | 98/10267 | 3/1998 | |

(56) References Cited

FOREIGN PATENT DOCUMENTS

| | | |
|---|---|---|
| WO | 98/13502 | 4/1998 |
| WO | 98/23733 | 6/1998 |
| WO | 98/31700 | 7/1998 |
| WO | 98/33001 | 7/1998 |
| WO | 98/34120 | 8/1998 |
| WO | 98/37186 | 8/1998 |
| WO | 98/41869 | 9/1998 |
| WO | 98/52691 | 11/1998 |
| WO | 98/58085 | 12/1998 |
| WO | 99/02671 | 1/1999 |
| WO | 99/22858 | 5/1999 |
| WO | 99/28020 | 6/1999 |
| WO | 99/31019 | 6/1999 |
| WO | 99/54730 | 10/1999 |
| WO | 99/61888 | 12/1999 |
| WO | 00/04139 A1 | 1/2000 |
| WO | 00/47322 | 2/2000 |
| WO | 00/52455 | 2/2000 |
| WO | 00/40712 | 6/2000 |
| WO | 00/61275 | 10/2000 |
| WO | 00/70080 | 11/2000 |
| WO | 00/76673 | 12/2000 |
| WO | 01/12327 | 2/2001 |
| WO | 01/14589 | 3/2001 |
| WO | 01/18244 | 3/2001 |
| WO | 01/64332 | 9/2001 |
| WO | 01/68257 | 9/2001 |
| WO | 01/69289 | 9/2001 |
| WO | 01/72431 | 10/2001 |
| WO | 01/80283 | 10/2001 |
| WO | 02/18949 | 3/2002 |
| WO | 02/22869 | 3/2002 |
| WO | 02/23163 | 3/2002 |
| WO | 02/31203 | 4/2002 |
| WO | 02/47665 | 6/2002 |
| WO | 02/047665 | 8/2002 |
| WO | 02/060275 | 8/2002 |
| WO | 02/078845 | 10/2002 |
| WO | 02/103011 | 12/2002 |
| WO | 02/103363 | 12/2002 |
| WO | 03/011443 | 2/2003 |
| WO | 03/037302 | 5/2003 |
| WO | 03/044187 | 5/2003 |
| WO | 03/078659 | 9/2003 |
| WO | 03/099843 | 12/2003 |
| WO | 2004/002627 | 1/2004 |
| WO | 2004/018497 | 3/2004 |
| WO | 2004/024917 | 3/2004 |
| WO | 2004/038363 | 5/2004 |
| WO | 2004/069849 | 8/2004 |
| WO | 2004/074504 | 9/2004 |
| WO | 2004/083443 | 9/2004 |
| WO | 2004/087308 | 10/2004 |
| WO | 2004/088314 | 10/2004 |
| WO | 2004/091763 | 10/2004 |
| WO | 2004/102204 | 11/2004 |
| WO | 2004/103565 | 12/2004 |
| WO | 2005/000970 | 1/2005 |
| WO | 2005/002730 | 1/2005 |
| WO | 2005/021151 | 3/2005 |
| WO | 2005/103106 | 11/2005 |
| WO | 2005/118138 | 12/2005 |
| WO | 2006/002641 | 1/2006 |
| WO | 2006/009657 | 1/2006 |
| WO | 2006/027757 | 3/2006 |
| WO | 2006/038035 | 4/2006 |
| WO | 2006/040551 | 4/2006 |
| WO | 2006/040554 | 4/2006 |
| WO | 2006/078841 | 7/2006 |
| WO | 2006/096571 | 9/2006 |
| WO | 2006/101851 | 9/2006 |
| WO | WO 2006096571 A2 * | 9/2006 ............ A61K 9/113 |
| WO | 2007/021343 | 2/2007 |
| WO | 2007/030501 | 3/2007 |
| WO | 2007/081385 | 7/2007 |
| WO | 2007/081387 | 7/2007 |
| WO | 2007/089541 | 8/2007 |
| WO | 2007/114794 | 10/2007 |
| WO | 2007/123744 | 11/2007 |
| WO | 2007/133710 | 11/2007 |
| WO | 2007/138178 | 12/2007 |
| WO | 2008/021123 | 2/2008 |
| WO | 2008/063227 | 5/2008 |
| WO | 2008/097559 | 8/2008 |
| WO | 2008/121342 | 10/2008 |
| WO | 2008/130623 | 10/2008 |
| WO | 2009/029229 | 3/2009 |
| WO | 2010/056728 | 5/2010 |
| WO | 2010/040006 | 8/2010 |
| WO | 2010/151776 | 12/2010 |
| WO | 2011/042564 | 4/2011 |
| WO | 2011/079176 | 6/2011 |

OTHER PUBLICATIONS

Schneegass et al., Miniaturized flow-through PCR with different template types in a silicone chip thermocycler, Lab on a Chip, Royal Soc of Chem, 1:42-9 (2001).

Schubert et al., Designer Capsules, Nat Med 8:1362 (2002).

Schweitzer et al., Immunoassays with rolling circle DNA amplification: A versatile platform for ultrasensitive antigen detection, PNAS 97(18), 10113-10119 (2000).

Schweitzer, B. et al., Combining nucleic acid amplification and detection. Curr Opin Biotechnol 12(1):21-7 (2001).

Scott, R.L., The Solubility of Fluorocarbons, J. Am. Chem. Soc, 70: 4090-4093 (1948).

Seethala and Menzel, Homogeneous, Fluorescence Polarization Assay for Src-Family Tyrosine Kinases, Anal Biochem 253(2):210-218 (1997).

Seiler et al., Planar glass chips for capillary electrophoresis: repetitive sample injection, quantitation, and separation efficiency, Anal Chem 65(10):1481-1488 (1993).

Selwyn M. J., A simple test for inactivation of an enzyme during assay, Biochim Biophys Acta 105:193-195 (1965).

Seo et al., Microfluidic consecutive flow-focusing droplet generators, Soft Matter, 3:986-992 (2007).

Seong and Crooks, Efficient Mixing and Reactions Within Microfluidic Channels Using Microbead-Supported Catalysts, J Am Chem Soc 124(45):13360-1 (2002).

Seong et al., Fabrication of Microchambers Defined by Photopolymerized Hydrogels and Weirs Within Microfluidic Systems: Application to DNA Hybridization, Analytical Chem 74(14):3372-3377 (2002).

Sepp et al., Microbead display by in vitro compartmentalisation: selection for binding using flow cytometry, FEBS Letters 532:455-58 (2002).

Serpersu et al., Reversible and irreversible modification of erythrocyte membranse permeability by electric field, Biochim Biophys Acta 812(3):779-785 (1985).

Shapiro, H.M., Multistation multiparameter flow cytometry: a critical review and rationale, Cytometry 3: 227-243 (1983).

Shestopalov et al., Multi-Step Synthesis of Nanoparticles Performed on Millisecond Time Scale in a Microfluidic Droplet-Based System, The Royal Society of Chemistry 4:316-321(2004).

Shtern V, and Hussain F., Hysteresis in swirling jets, J. Fluid Mech. 309:1-44 (1996).

Sia &Whitesides, Microfluidic devices fabricated in poly(dimethylsiloxane) for biological studies, Electrophoresis 24 (21):3563-3576 (2003).

Sidhu, S.S., Phage display in pharmaceutical biotechnology, Curr Opin Biotech 11:610-616 (2000).

Siemering et al., Mutations that suppress the thermosensitivity of green fluorescent protein, Current Biology 6:1653-1663 (1996).

Silva-Cunha et al., W/O/W multiple emulsions of insulin containing a protease inhibitor and an absorption enhancer: biological activity after oral administration to normal and diabetic rats, Int J Pharm 169:33-44 (1998).

(56) References Cited

OTHER PUBLICATIONS

Sims et al., Immunopolymerase chain reaction using real-time polymerase chain reaction for detection, Anal. Biochem. 281(2):230-2 (2000).
Slappendel et al., Normal cations and abnormal membrane lipids in the red blood cells of dogs with familial stomatocytosis hypertrophic gastritis, Blood 84:904-909 (1994).
Slob et al., Structural identifiability of PBPK models: practical consequences for modeling strategies and study designs, Crit Rev Toxicol. 27(3):261-72 (1997).
Smith et al., Direct mechanical measurements of the elasticity of single DNA molecules by using magnetic beads, Science 258(5085):1122-1126 (1992).
Smith et al., Fluorescence detection in automated DNA sequence analysis, Nature 321:674-679 (1986).
Smith et al., Phage display, Chemical Reviews 97(2), 391-410 (1997).
Smith et al., The synthesis of oligonucleotides containing an aliphatic amino group at the 5' terminus: synthesis of fluorescent DNA primers for use in DNA sequence analysis, Nucl. Acid Res. 13:2399-2412 (1985).
Smith G.P., Filamentous fusion phage: novel expression vectors that display cloned antigens on the virion surface, Science 228(4705):1315-7(1985).
Smyth et al., Markers of apoptosis: methods for elucidating the mechanism of apoptotic cell death from the nervous system, Biotechniques 32:648-665 (2000).
Sohn, et al, Capacitance cytometry: Measuring biological cells one by one, PNAS 97(20):10687-10690 (2000).
Somasundaram and Ramalingam, Gain studies of Rhodamine 6G dye doped polymer laser, J Photochem Photobiol 125(1-3):93-98 (1999).
Song et al., A microfluidic system for controlling reaction networks in time, Angew. Chem. Int. Ed. 42(7):768-772 (2003).
Song et al., Experimental Test of Scaling of Mixing by Chaotic Advection in Droplets Moving Through Microfluidic Channels, App Phy Lett 83(22):4664-4666 (2003).
Song, H. and Ismagilov, R.F., Millisecond kinetics on a microluidic chip using nanoliters of reagents, J Am Chem Soc. 125: 14613-14619 (2003).
Soni and Meller, Progress toward ultrafast DNA sequencing using solid-state nanopores, Clin Chem 53:1996-2001 (2007).
Soumillion et al., Novel concepts for the selection of catalytic activity. Curr Opin Biotechnol 12:387-394 (2001).
Soumillion et al., Selection of B-lactomase on filamentous bacteriophage by catalytic activity, J Mol Biol, 237:415-22 (1994).
Sproat et al., The synthesis of protected 5'-mercapto-2',5'-dideoxyribonucleoside-3'-0-phosphorainidites, uses of 5'-mercapto-oligodeoxyribonucleotides, Nucleic Acids Res 15:4837-4848 (1987).
Stauber, et a., Rapid generation of monoclonal antibody-secreting hybridomas against African horse sickness virus by in vitro immunization and the fusion/cloning technique, J. Immunol. Meth 161(2):157-168 (1993).
Stemmer, W.P., DNA shuffling by random fragmentation and reassembly: in vitro recombination for molecular evolution. PNAS 91(22):10747-51(1994).
Stemmer, W.P., Rapid evolution of a protein in vitro by DNA shuffling, Nature 370(6488):389-91 (1994).
Stober et al., Controlled growth of monodisperse silica spheres in the micron size range, J Colloid and Interface Sci 26(1):62-69 (1968).
Stofko, H.R. et al., A single step purification for recombinant proteins. Characterization of microtube associated protein (MAP2) fragment which associates with the type II cAMP-dependent protein kinase, Febs Lett 302: 274-278 (1992).
Stone et al., Engineering flows in small devices: Microfluidics toward a lab-on-a-chip, Ann. Rev. Fluid Mech. 36:381-441 (2004).
Strizhkov et al., PCR amplification on a microarray of gel-immobilized oligonucleotides: Detection of bacterial toxin-and drug-resistant genes and their mutations, BioTechniques 29(4):844-857 (2000).
Stroock et al., Chaotic mixer for microchannels, Science 295(5555):647-651 (2002).
Studer et al., Fluorous Synthesis: A Fluorous-Phase Strategy for Improving Separation Efficiency in Organic Synthesis, Science 275:823-826 (1997).
Sugiura et al., Effect of Channel Structure on MicroChannel Emuisification, Langmuir 18:5708-5712 (2002).
Sugiura et al., Interfacial tension driven monodispersed droplet formation from mtcrofabricated channel array Langmuir, 17: 5562-5566 (2001).
Miele et al., Autocatalytic replication of a recombinant RNA, J Mol Biol, 171:281-95 (1983).
Minshuil, J. and Stemmer, W.P., Protein evolution by molecular breeding, Curr Opin Chem Biol 3(3): 284-90 (1999).
Miroux and Walker, Over-production of proteins in *Escherichia coli*: mutant hosts that allow synthesis of some membrane proteins and globular proteins at high levels, J of Mol Biol 260(3):289-98 (1996).
Miyawaki et at., Fluorescent Indicators for Ca2+ Based on Green Fluorescent Proteins and Calmodulin, Nature, 388: 882-887 (1997).
Mize et al., Dual-enzyme cascade—an amplified method for the detection of alkaline phosphatase, Anal Biochem 179 (2): 229-35 (1989).
Mock et al., A fluorometric assay for the biotin-avidin interaction based on displacement of the fluorescent probe 2-anilinonaphthalene-6-sulfonic acid, Anal Biochem, 151:178-81 (1985).
Moldavan, A., Photo-electric technique for the counting of microscopical cells, Science 80:188-189 (1934).
Montigiani, S. et al., Alanine substitutions in calmodulin-binding peptides result in unexpected affinity enhancement, J Mol Biol, 258:6-13 (1996).
Moore, M.J., Exploration by lamp light, Nature, 374:766-7 (1995).
Moudrianakis and Beer, Base sequence determination in nucelic acids with the electron microscope 3. Chemistry and microscopy of guanine-labeled DNA, PNAS 53:564-71 (1965).
Mueth et al., Origin of stratification in creaming emulsions, Physical Review Letters 77(3):578-581 (1996).
Mulbry, W.W. et al., Parathion hydrolase specified by the Flavobacterium opd gene: relationshio between the gene and protein. J Bacteriol, 171: 6740-6746 (1989).
Mulder et al., Characterization of two human monoclonal antibodies reactive with HLA-B12 and HLA-B60, respectively, raised by in vitro secondary immunization of peripheral blood lymphocytes, Hum. Immunol 36(3):186-192 (1993).
Nakano et al., High speed polymerase chain reaction in constant flow, Biosci Biotech and Biochem, 58:349-52 (1994).
Nakano et al., Single-molecule PCR using water-in-oil emulsion, J Biotech, 102:117-24 (2003).
Nakano et al., Single-molecule reverse transcription polymerase chain reaction using water-in-oil emulsion, J Biosci Bioeng 99:293-295 (2005).
Nametkin, S.N. et al., Cell-free translation in reversed micelles, FEB Letters, 309(3):330-32 (1992).
Narang et al, Improved phosphotriester method for the synthesis of gene fragments, Methods Enzymol, 68:90-98 (1979).
Nelson, P. S., et al., Bifunctional oligonucleotide probes synthesized using a novel CPG support are able to detect single base pair mutations, Nucl Acids Res 17(18): 7187-7194 (1989).
Nemoto et al., In vitro virus: bonding of mRNA bearing puromycin at the 3 terminal end to the C-terminal end of its encoded protein on the ribosome in vitro, Federation of European Biochemical Societies, 414:405-8 (1997).
Ness, J.E. et al., Molecular Breeding: the natural approach to protein design. Adv Protein Chem, 55: 261-292 (2000).
Ng et al., Protein crystallization by capillary counter-diffusion for applied crystallographic structure determination, J. Struct. Biol, 142:218-231(2003).

(56) References Cited

OTHER PUBLICATIONS

Ng, B.L. et al., Factors affecting flow karyotype resolution, Cytometry, Part A 69A: 1028-1036 (2006).
Nguyen et al., Optical detection for droplet size control in microfluidic droplet-based analysis systems, Sensors and Actuators B 117(2):431-436 (2006).
Nihant et al., Polylactide Microparticles Prepared by Double Emulsion/Evaporation Technique. I. Effect of Primary Emulsion Stability, Pharmaceutical Research, 11(10):1479-1484 (1994).
Nisisako et al., Controlled formulation of monodisperse double emulsions in a multiple-phase microluidic system, Sot Matter, 1:23-27 (2005).
Nisisako et al., Formation of droplets using branch channels in a microfluidic circuit, Proceedings of the SICE Annual Conference. International Session Papers,1262-1264 (2002).
Nisisako et al., Microstructured Devices for Preparing Controlled Multiple Emulsions. Chem. Eng. Technol 31 (8):1091-1098 (2008).
Nisisako, Takasi et al., Droplet Formation in a MicroChannel NetWO rk, Lab on a Chip, vol. 2, 2002, pp. 24-26.
Nissim, A. et al., Antibody fragments from a single pot phage display library as immunochemical reagents, Embo J, 13:692-8 (1994).
Nof and Shea, Drug-releasing scaffolds fabricated from drug-loaded microspheres, J. Biomed Mater Res 59:349-356 (2002).
Norman, A., Flow Cytometry, Med. Phys., 7(6):609-615 (1980).
Oberholzer et al., Enzymatic RNA replication in self-reproducing vesicles: an approach to a minimal cell, Biochem Biophys Res Commun 207(1):250-7 (1995).
Oberholzer et al., Polymerase chain reaction in liposomes, Chem. Biol. 2(10):677-82 (1995).
Obukowicz, M.G. et al., Secretion and export of IGF-1 in *Escerichia coli* strain JM101, Mol Gen Genet, 215:19-25 (1988).
Office Action for U.S. Appl. No. 11/246,911 mailed Feb. 8, 2011.
Office Action for U.S. Appl. No. 11/360,845 mailed Apr. 26, 2011.
Office Action for U.S. Appl. No. 11/360,845 mailed Aug. 4, 2010.
Office Action for U.S. Appl. No. 11/698,298, mailed Jun. 29, 2011.
Ogura, Y., Catalase activity at high concentrations of hydrogen peroxide, Archs Biochem Biophys, 57: 288-300 (1955).
Oh et al., Distribution of Macropores in Silica Particles Prepared by Using Multiple Emulsions, Journal of Colloid and Interface Science, 254(1): 79-86 (2002).
Okushima et al. Controlled production of monodisperse double emulsions by two-step droplet breakup in microfluidic devices, Langmuir 20(23): 9905-8 (2004).
Olsen et ai., Function-based isolation of novel enzymes from a large library, Nat Bioteoltnol 13(10):1071-4 (2000).
Omburo, G.A. et al., Characterization of the zinc binding site of bacterial phosphotriesterase, J of Biological Chem, 267:13278-83 (1992).
Oroskar et al., Detection of immobilized amplicons by ELISA-like techniques, Clin. Chem. 42:1547-1555 (1996).
Ostermeier, M. et al., A combinatorial approach to hybrid enzymes independent of DNA homology, Nat Biotechnol, 17(12):1205-9 (1999).
Ouelette, A new wave of microfluidic devices, Indust Physicist pp. 14-17 (2003).
Pabit et al., Laminar-Flow Fluid Mixer for Fast Fluorescence Kinetics Studies, Biophys J 83:2872-2878 (2002).
Paddison et al., Stable suppression of gene expression by RNAi in mammalian cells, PNAS 99(3):1443-1448 (2002).
Pannacci et al., Equilibrium and Nonequilibrium States in Microluidic Double Emulsions Physical Review Leters, 101 (16):164502 (2008).
Keij, J.F., et al., High-speed photodamage cell sorting: An evaluation of the ZAPPER prototype, Methods in cell biology, 42: 371-358 (1994).
Kelly et al., Miniaturizing chemistry and biology in microdroplets, Chem Commun 18:1773-1788 (2007).
Kerker, M., Elastic and inelastic light scattering in flow cytometry, Cytometry, 4:1-10 (1983).

Khandjian, UV crosslinking of RNA to nylon membrane enhances hybridization signals, Mol. Bio. Rep. 11: 107-115 (1986).
Kim et al., Comparative study on sustained release of human growth hormone from semi-crystalline poly(L-lactic acid) and amorphous poly(D,L-lactic-co-glycolic acid) microspheres: morphological effect on protein release, Journal of Controlled Release, 98(1):115-125 (2004).
Kim S. et al, Type II quantum dots: CdTe/CdSe (core/shell) and CdSe/ZnTe (core/shell) heterostructures, J. Am Chem Soc. 125:11466-11467 (2003).
Kircher et al., High-throughput DNA sequencing-concepts and limitations, Bioessays 32(6):524-536 (2010).
Kiss et al., High-throughput quantitative polymerase chain reaction in picoliter droplets, Anal. Chem 80:8975-8981 (2008).
Kitagawa et al., Manipulation of a single cell with microcapillary tubing based on its electrophoretic mobility, Electrophoresis 16:1364-1368 (1995).
Klug and Famulok, All you wanted to know about selex, Molecular Biology Reports, 20:97-107 (1994).
Klug and Schwabe, Protein motifs 5. Zinc fingers, FASEB J 9(8):597-604 (1995).
Klug, A., Gene Regulatory Proteins and Their Interaction with DNA, Ann NY Acad Sci, 758: 143-60 (1995).
Knaak et al., Development of partition coefficients, Vmax and Km values, and allometric relationships, Toxicol Lett. 79(I-3):87-98 (1995).
Knight, James B., Hydrodynamic Focusing on a Silicon Chip: Mixing Nanoliters in Microseconds, Physical Review Lett 80(17):3863-3866 (1998).
Kojima et al. PCR amplification from single DNA molecules on magnetic beads in emulsion: application for high-throughput screening of transcription factor targets. Nucleic Acids Res. 33:e150 (2005).
Kolb et al., Cotranslational folding of proteins, Biochem Cell Biol, 73:1217-20 (1995).
Komatsu et al., Roles of cytochromes P450 1A2, 2A6, and 2C8 in 5-fluorouracil formation rom tegafur, an anticancer prodrug, in human liver microsomes. Drug Met. Disp., 28:1457-1463 (2001).
Kopp et al., Chemical amplification: continuous flow PCR on a chip, Science, 280:1046-48 (1998).
Koster et al., Drop-based microfluidic devices for encapsulation of single cells, Lab on a Chip 8:1110-1115 (2008).
Kowalczykowski et al., Biochemistry of homologous recombination in *Escherichia coli*, Microbiol Rev 58(3):401-65 (1994).
Krafft et al., Emulsions and microemulsions with a fluorocarbon phase, Colloid and Interface Science 8(3):251-258 (2003).
Krafft et al., Synthesis and preliminary data on the biocompatibility and emulsifying properties of perfluoroalkylated phosphoramidates as injectable surfactants, Eur. J. Med. Chem., 26:545-550 (1991).
Krafft, Fluorocarbons and fluorinated amphiphiles in drug delivery and biomedical research, Adv Rev Drug Disc 47:209-228 (2001).
Kralj et al., Surfactant-enhanced liquid-liquid extraction in microfluidic channels with inline electric-field enhanced coalescence, Lab Chip 5:531-535 (2005).
Kricka and Wilding, Microchip PCR, Anal Bioanal Chem 377(5):820-825 (2003).
Kricka and Wilding, Micromachining: a new direction for clinical analyzers, Pure and Applied Chemistry 68 (10):1831-1836 (1996).
Krumdiek, C.L. et al., Solid-phase synthesis of pteroylpolyglutamates, Methods Enzymol, 524-29 (1980).
Kumar, A. et al., Activity and kinetic characteristics of glutathione reductase in vitro in reverse micellar waterpool, Biochem Biophys Acta, 996(1-2):1-6 (1989).
Lage et al., Whole genome analysis of genetic alterations in small DNA samples using hyperbranched strand displacement amplification and array-CGH. Genome Res. 13: 294-307 (2003).
Lamprecht et al., pH-sensitive microsphere delivery increases oral bioavailability of calcitonin, Journal of Controlled Release, 98(1): 1-9(2004).
Lancet, D. et al., Probability model for molecular recognition in biuological receptor repertoirs: significance to the olfactory system, PNAS, 90(8):3715-9 (1993).

(56) References Cited

OTHER PUBLICATIONS

Landergren et al., A ligase mediated gene detection technique. Science 241(4869):1077-80 (1988).
Lasheras, et al., Breakup and Atomization of a Round Water Jet by a High Speed Annular Air Jet, J Fluid Mechanics 357:351-379 (1998).
Leary et al., Application of Advanced Cytometric and Molecular Technologies to Minimal Residual Disease Monitoring, Proceedings of SPIE 3913:36-44 (2000).
Lee et al, Investigating the target recognition of DNA cytosine-5 methyltransferase Hhal by library selection using in vitro compartmentalisation (IVC), Nucleic Acids Res 30:4937-4944 (2002).
Lee et al., Circulating flows inside a drop under time-periodic non-uniform electric fields, Phys Fuilds 12(8):1899-1910 (2000).
Lee, et al, Effective Formation of Silicone-in-Fluorocarbon-in-Water Double Emulsions: Studies on Droplet Morphology and Stability, Journal of Dispersion Sci Tech 23(4):491-497(2002).
Lee, et al, Preparation of Silica Paticles Encapsulating Retinol Using O/W/O Multiple Emulsions, Journal of Colloid and Interface Science, 240(1): 83-89 (2001).
Lemof, et al, An AC Magnetohydrodynamic Microfluidic Switch for Micro Total Analysis Systems, Biomedical Microdevices, 5(I):55-60 (2003).
Lesley et al., Use of in vitro protein synthesis from PCR-generated templates to study interaction of E coli transcription factors with core RNA polymerase, J Biol Chem 266(4):2632-8 (1991).
Lesley, S.A., Preparation and use of E. coli S-30 extracts, Methods Mol Biol, 37:265-78 (1995).
Leung et al., A method for random mutagenesis of a defined DNA segment using a modified polymerase chain reaction. Technique 1:11-15 (1989).
Li and Harrison, Transport, Manipulation, and Reaction of Biological Cells On-Chip Using Electrokinetic Effects, Analytical Chemistry 69(8):1564-1568 (1997).
Li et al., Nanoliter microfluidic hybrid method for simultaneous screening and optimization validated with crystallization of membrane proteins, PNAS 103: 19243-19248 (2006).
Li et al., Single-step procedure for labeling DNA strand breaks with fllourescein-or BODIPY-conjugated deoxynucleotides: detection of apoptosis and bromodeoxyuridine incorporation. Cytometry 20:172-180 (1995).
Liao et al., Isolation of a thermostable enzyme variant by cloning and selection in a thermophile, PNAS 83:576-80 (1986).
Lim et al., Microencapsulated islets as bioartificial endocrine pancreas, Science 210(4472):908-10 (1980).
Link et al, Geometrically Mediated Breakup of Drops in Microfluidic Devices, Phys. Rev. Lett., 92(5): 054503-1 thru 054503-4 (2004).
Link et al., Electric control droplets in microfluidic devices, Angew Chem Int Ed 45:2556-2560 (2006).
Lipinski et al., Experimental and Computational Approaches to Estimate Solubility and Permeability in Drug Discovery and Development Settings ,Adv. Drug Deliv. Rev., 46:3-26 (2001).
Huang, Z. et al., A sensitive competitive ELISA for 2,4-dinitrophenol using 3,6-fluorescein diphosphate as a fluorogenic substrate, J Immunol Meth, 149:261 (1992).
Huang, Z.J., Kinetic assay of fluorescein mono-beta-D-galactosidase hydrolysis by beta-galactosidase: a front-face measurement for strongly absorbing fluorogenic substrates, Biochemistry, 30:8530-4 (1991).
Hubert et al. Data Concordance from a Comparison between Filter Binding and Fluorescence Polarization Assay Formats for Identification of RUOCK-II Inhibitors, J biomol Screen 8(4):399-409 (2003).
Huebner, A. et al., Quantitative detection of protein expression in single cells using droplet microfluidics, Chem Com 12:1218-1220 (2007).

Hung et al., Optimization of Droplet Generation by controlling PDMS Surface Hydrophobicity, 2004 ASME International Mechanical Engineering Congress and RD&D Expo, Nov. 13-19, Anaheim, CA (2004).
Hung, et al, Controlled Droplet Fusion in Microfluidic Devices, MicroTAS 2004, Sep. 26-30, Malmo, Sweden (2004).
Hutchison et al., Cell-free cloning using Phi29 polymerase, PNAS 102(48):17332-17336 (2005).
Ibrahim, S.F. et al., High-speed cell sorting: fundamentals and recent advances, Curr Opin Biotchnol, 14(1):5-12 (2003).
Ikeda et al., Bioactivation of tegafur to 5-fluorouracil is catalyzed by cytochrome P-450 2A6 in human liver microsomes in vitro, Clin Cancer Res 6(11):4409-4415 (2000).
Inai et al., Immunohistochemical detection of an enamel protein-related epitope in rat bone at an early stage of osteogenesis, Histochemistry 99(5):335-362 (1993).
International Preliminary Report of Patentability for PCTUS2010061741 Mailed Sep. 16, 2011(4 pages).
International Preliminary Report on Patentability mailed Sep. 20, 2007, for PCT/US2006/007772.
International Search Report and Written Opinion for PCT/US2009/050931 Mailed Nov. 26, 2009 (3 pages).
International Search Report and Written Opinion for PCTUS1154353 Mailed Apr. 20, 2012 (34 pages).
International Search Report and Written Opinion for PCTUS12024745 Mailed May 11, 2012 (21 pages).
International Search Report and Written Opinion for PCTUS1224741 Mailed Jun. 12, 2012 (12 pages).
International Search Report and Written Opinion for PCTUS125499 Mailed May 29, 2012 (10 pages).
International Search Report and Written Opinion in PCT/EP2010/065188 Mailed Jan. 12, 2011 (7 pages).
International Search Report and Written Opinion in PCT/US11/24615 Mailed Jul. 25, 2011 (37 pages).
International Search Report and Written Opinion in PCT/US2004/010903 Mailed Dec. 20, 2004 (16 pages).
International Search Report and Written Opinion in PCT/US2006/021286 Mailed Sep. 14, 2007 (16 pages).
International Search Report and Written Opinion in PCT/US2007/002063 Mailed Nov. 15, 2007 (20 pages).
International Search Report in PCT/US01/18400 Mailed Jan. 28, 2005 ( 37 pages).
Ismagilov, Integrated Microfluidic Systems, Angew. Chem. Int. Ed 42:4130-4132 (2003).
Janda, et al, Chemical selection for catalysis in combinatorial antibody libraries, Science, 275:945-948 (1997).
Jang et al., Controllable delivery of non-viral DNA from porous scaffold, J Controlled Release 86(1):157-168 (2003).
Japanese Office Action for JP 2006-509830 mailed Jun. 1, 2011 (4 pages).
Jermutus et al., Recent advances in producing and selecting functional proteins by using cell-free translation, Curr Opin Biotechnol 9(5): 534-48 (1998).
Jestin et al., A Method for the Selection of Catalytic Activity Using Phage Display and Proximity Coupling, Agnew. Chem. Int. Ed. Engl. 38(8):1124-1127 (1999).
Jo, et al, Encapsulation of Bovine Serum Albumin in Temperature-Programmed Shell-in-Shell Structures, Macromol. Rapid Comm 24:957-962 (2003).
Joerger et al., Analyte detection with DNA-labeled antibodies and polymerase chain reaction, Clin. Chem. 41(9):1371-7 (1995).
Johannsson et al., Amplification by Second Enzymes, In ELISA and Other Solid Phase Immunoassays, Kemeny et al (ed.), Chapter 4, pp. 85-106 John Wiley (1988).
Johannsson, A., Heterogeneous Enzyme Immunoassays, In Principles and Practice of Immunoassay, pp. 295-325 Stockton Press (1991).
Johnson, T.O. et al., Protein tyrosine phosphatase 1B inhibitors for diabetes, Nature Review Drug Discovery 1, 696-709 (2002).
Jones et al. Glowing jellyfish, luminescence and a molecule called coelenterazine, Trends Biotechnol. 17(12):477-81 (1999).

(56) References Cited

OTHER PUBLICATIONS

Jones, L.J. et al., Quenched BODIPY dye-labeled casein substrates for the assay of protease activity by direct fluorescence measurement, Anal Biochem, 251:144 (1997).
Joo et al., Laboratory evolution of peroxide-mediated cytochrome P450 hydroxylaion, Nature 399:670 (1999).
Joos et al., Covalent attachment of hybridizable oligonucleotides to glass supports, Analytical Biochemistry 247:96-101 (1997).
Joyce, G.F., In vitro Evolution of Nucleic Acids, Curr. Opp. Structural Biol, 4: 331-336 (1994).
Kadir and Moore, Haem binding to horse spleen ferritin, Febs Lett, 276: 81-4 (1990).
Kallen, R.G. et al., The mechanism of the condensation of formaldehyde with tetrahydrofolic acid, J. Biol. Chem., 241:5851-63 (1966).
Kambara et al., Optimization of Parameters in a DNA Sequenator Using Fluorescence Detection, Nature Biotechnology 6:816-821 (1988).
Kamensky et al., Spectrophotometer: new instrument for ultrarapid cell analysis, Science 150(3696):630-631 (1965).
Kanouni et al., Preparation of a stable double emulsion (W1/0/W2): role of the interfacial films on the stability of the system, Adv. Collid. Interf. Sci., 99(3): 229-254 (2002).
Katanaev et al., Viral Q beta RNA as a high expression vector for mRNA translation in a cell-free system, Febs Lett, 359:89-92 (1995).
Katsura et al., Indirect micromanipulation of single molecules in water-in-oil emulsion, Electrophoresis, 22:289-93 (2001).
Kawakatsu et al., Regular-sized cell creation in microchannel emulsification by visual microprocessing method, Journal of the American Oil ChemistS Society, 74:317-21 (1997).
Keana J. & Cai, S. X., New reagents for photoaffinity labeling: synthesis and photolysis of functionalized perfluorophenyl azides, J. Org. Chem.55(11):3640-3647 (1990).
Keefe, A.D. et al., Functional proteins from a random-sequence library, Nature, 410: 715-718 (2001).
Keij et al., High-Speed Photodamage Cell Selection Using a Frequency-Doubled Argon Ion Laser, Cytometry, 19(3):209-216 (1995).
Zaug and Cech, The Tetrahymena intervening sequence ribonucleic acid enzyme is a phosphotransferase and an acid phosphatase, Biochemistry 25(16):4478-82 (1986).
Zaug et al., The Tetrahymena ribozyme acts like an RNA restriction endonuclease, Nature 324(6096):429-33 (1986).
Zhang et al., A Simple Statistical Parameter for Use in Evaluation and Validation of High Throughput Screening Assays, Journal of Biomolecular Screening, 4(2): 67-73 (1999).
Zhang, Z.Y., Substrate specificity of the protein tyrosine phosphatases, PNAS 90: 4446-4450 (1993).
Zhao, B. et al., Control and Applications of Immiscible Liquids in Microchannels, J. Am. Chem. Soc, vol. 124:5284-5285 (2002).
Zhao, H. et al., Molecular evolution by staggered extension process (StEP) in vitro recombination. Nat Biotechnol 16(3):258-61 (1998).
Zheng et al., A Droplet-Based, Composite PDMS/Glass Capillary Microfluidic System for Evaluating Protein Crystallization Conditions by Microbatch and Vapor-Diffusion Methods with On-Chip X-Ray Diffraction, Angew. Chem.,116:1-4, (2004).
Zheng et al., A Microiuidic Approach for Screening Submicroliter Volumes against Multiple Reagents by Using Performed Arrays of Nanoliter Plugs in a Three-Phase Liquid/Liquid/Gas Flow, Angew. Chem. Int. Ed., 44(17):2520-2523 (2005).
Zheng et al., Formation of Droplets of Alternating Composition in Microfluidic Channels and Applications to Indexing of Concentrations in Droplet-Based /Assays, Anal. Chem.,76: 4977-4982 (2004).
Zheng et al., Screening of Protein Crystallization Conditions on a Microfluidic Chip Using Nanoliter-Size Droplets, J Am Chem Soc 125(37):11170-11171 (2003).
Zimmermann et al., Dielectric Breakdown of Cell Membranes, Biophys J 14(11):881-889 (1974).

Zimmermann et al., Microscale Production of Hybridomas by Hypo-Osmolar Electrofusion, Hum. Antibod. Hybridomas, 3(1): 14-18 (1992).
Zubay, G., In vitro synthesis of protein in microbial systems, Annu Rev Genet, 7: 267-87 (1973).
Zubay, G., The isolation and properties of CAP, the catabolite gene activator, Methods Enzymol, 65: 856-77 (1980).
Zuckermann, R. et al., Efficient Methods for Attachment of Thiol-Specific Probes to the 3{-end of Synthetic Oligodeoxyribonucleotides, Nucleic Acids Res. 15:5305-5321 (1987).
Lipkin et al., Biomarkers of increased susceptibility to gastreointestinal cancer: new application to studies of cancer prevention in human subjects, Cancer Research 48:235-245 (1988).
Liu et al., Fabrication and characterization of hydrogel-based microvalves, Mecoelectromech. Syst.11:45-53 (2002).
Liu et al., Passive Mixing in a Three-Dimensional Serpentine MicroChannel, J MEMS 9(2):190-197 (2000).
Lizardi et al., Mutation detection and single-molecule counting using isothermal rolling-circle amplification. Nat Genet 19(3):225-32 (1998).
Loakes and Brown, 5-Nitroindole as a universal base analogue. Nucleic Acids Res 22: 4039-4043 (1994).
Loakes et al., Stability and structure of DNA oligonucleotides containing non-specific base analogues. J. Mol. Biol 270:426-435 (1997).
Loeker et al., Colloids and Surfaces A: Physicochem. Eng. Aspects 214:143-150, (2003).
Lopez-Herrera, et al, Coaxial jets generated from electrified Taylor cones. Scaling laws, Aerosol Science, 34:535-552 (2003).
Lopez-Herrera, et al, One-Dimensional Simulation of the Breakup of Capillary Jets of Conducting Liquids Application to E.H.D. Spraying, Aerosol. Set, 30 (7): 895-912 (1999).
Lopez-Herrera, et al, The electrospraying of viscous and non-viscous semi-insulating liquids. Scalilng laws, Bulletin of the American Physical Society,40 (12):2041(1995).
Lorenceau et al, Generation of Polymerosomes from Double-Emulsions, Langmuir, 21(20): 9183-9186 (2005).
Lorenz et al, Isolation and expression of a cDNA encoding Renilla reniformis luciferase, PNAS 88(10):4438-42 (1991).
Loscertales, et al, Micro/Nano Encapsulation via Electrified Coaxial Liquid Jets, Science, 295(5560): 1695-1698 (2002).
Low N.M. et al., Mimicking somatic hypermutaion: affinity maturation of antibodies displayed on bacteriophage using a bacterila mutator strain. J Mol Biol 260(3), 359-68 (1996).
Lowe, K.C., Perfluorochemical respiratory gas carriers: benefits to cell culture systems, J Fluorine Chem 118:19-26 (2002).
Lowman et al., Selecting high affinity binding proteins by monovalent phage display, Biochemistry 30(45):10832-8 (1991).
Lu et al., Robust fluorescein-doped silica nanoparticles via dense-liquid treatment, Colloids and Surfaces a Physicachemical and Engineering Aspects, 303(3):207-210 (2007).
Luisi et al, Activity and Conformation of Enzymes in Reverse Micellar Solutions, Meth. Enzymol 136:188-216 (1987).
Lund et al., Assesment of methods for covalent binding of nucleic acids to magnetic beads, Dynabeads, and the characteristics of the bound nucleic acids in hybridization reactions, Nucleic Acids Research, Oxford University Press, 16(22) (1998).
Lunderberg et al., Solid-phase technology: magnetic beads to improve nucleic acid detection and analysis, Biotechnology Annual Review, 1:373-401 (1995).
Lundstrom, et al, Breakthrough in cancer therapy: Encapsulation of drugs and viruses, www.currentdrugdiscovery.com, Nov. 19-23, 2002.
Lyne, P.D., Structure-Based Virtual Screening: An Overview, Drug Discov. Today, 7(20):1047-1055 (2002).
Ma, C. et al., In vitro protein engineering using synthetic tRNA(Ala) with different anticodons, Biochemistry 32(31):7939-45 (1993).
Mackenzie et al., The application of flow microfluorimetry to biomedical research and diagnosis: a review, Dev Biol Stand 64:181-193 (1986).

(56) References Cited

OTHER PUBLICATIONS

Mackenzie, IABS Symposium on Reduction of Animal Usage in the Development and Control of Biological Products, London, UK, 1985.
Maclean, D. et al., Glossary of terms used in combinatorial chemistry, Pure Appl. Chem. 71(12):2349-2365 (1999).
Magdassi et al., Multiple Emulsions: HLB Shift Caused by Emulsifier Migration to External Interface, J. Colloid Interface Sci 97:374-379 (1984).
Mahajan et al., Bcl-2 and Bax Interactions in Mitochondria Probed with Green Florescent Protein and Fluorescence Resonance Energy Transfer, Nat. Biotechnol. 16(6): 547-552 (1998).
Manley et al., In vitro transcription: whole cell extract, Methods Enzymol, 101:568-82 (1983).
Manz et al., Micromachining of monocrystalline silicon and glass for chemical analysis systems a look into next century's technology or just a fashionable craze, Trends in Analytical Chemistry 10(5):144-149 (1991).
Mao et al., Kinetic behaviour of alpha-chymotrypsin in reverse micelles: a stopped-flow study, Eur J Biochem 208(1):165-70 (1992).
Mao, Q. et al., Substrate effects on the enzymatic activity of alphachymotrypsin in reverse micelles, Biochem Biophys Res Commun, 178(3):1105-12 (1991).
Mardis, E.R., The impact of next-generation sequencing technology on genetics, Trends Genet 24:133-141 (2008).
Margulies, M et al., Genome sequencing in microfabricated high-density picolitre reactors, Nature 437(7057):376-380 (2005).
Marques et al., Porous Flow within Concentric Cylinders, Bull Am Phys Soc Div Fluid Dyn 41:1768 (1996).
Mason, T.J. and Bibette, J. Shear Rupturing of Droplets in Complex Fluids, Langmuir, 13(17):4600-4613 (1997).
Mastrobattista et al., High-throughput screening of enzyme libraries: in vitro evolution of a beta-galactosidase by fluorescence-activated sorting of double emulsions, Chem. Biol. 12(12): 1291-1300 (2005).
Masui et ai., Probing of DNA-Binding Sites of Escherichia coli RecA Protein Utilizing 1-anilinonaphthalene-8-Sulfonic Acid, Biochem 37(35):12133-12143 (1998).
Matayoshi, E.D. et al., Novel fluorogenic substrates for assaying retroviral proteases by resonance energy transfer, Science 247:954 (1990).
Mattheakis et al., An in vitro polysome display system for identifying ligands from very large peptide libraries, PNAS 91:9022-6 (1994).
Mayr, L.M., and Fuerst, P., The Future of High-Throughput Screening, JBiomol Screen 13:443-448 (2008).
Mazutis et al., Droplet-Based Microfluidic Systems for High-Throughput Single DNA Molecule Isothermal Amplification and Analysis, Anal Chem 81(12):4813-4821 (2009).
Mazutis et al., Multi-step microfluidic droplet processing: kinetic analysis of an in vitro translated enzyme, Lab Chip 9:2902-2908 (2009).
McCafferty et al., Phage antibodies: filamentous phage displaying antibody variable domains,Nature, 348: 552-4 (1990).
McDonald and Whitesides, Poly(dimethylsiloxane) as a material for fabricating microfluidic devices, Account Chem. Res. 35:491-499 (2002).
McDonald et al. Fabrication of microfluidic systems in poly(dimethylsiloxane), Electrophoresis 21(1):27-40 (2000).
Melton et al., Efficient in vitro synthesis of biologically active RNA and RNA hybridization probes from plasmids containing a bacteriophage SP6 promoter, Nucl. Acids Res. 12(18):7035-7056 (1984).
Mendel, D. et al., Site-Directed Mutagenesis with an Expanded Genetic Code, Annu Rev Biophys Biomol Struct, 24:435-62 (1995).
Menger and Yamada, Enzyme catalysis in water pools, J. Am. Chem. Soc., 101:6731-4 (1979).
Meylan and Howard, Atom/fragment contribution method for estimating octanol-water partition coefficients, J Pharm Sci. 84(1):83-92 (1995).

Bougueleret, L. et al., Characterization of the gene coding for the EcoRV restriction and modification system of Escherichia coli, Nucleic Acids Res, 12(8):3659-76 (1984).
Boyum, A., Separation of leukocytes from blood and bone marrow. Introduction, Scand J Clin Lab Invest Suppl 97:7 (1968).
Branebjerg et al., Fast mixing by lamination, MEMS Proceedings 9th Ann WO rkshop, San Diego, Feb. 11-15, 1996, 9:441-446 (1996).
Braslavsky et al., Sequence information can be obtained from single DNA molecules, PNAS 100(7):3960-3964 (2003).
Bringer et al., Microfluidic Systems for Chemical Kinetics That Rely on Chaotic Mixing in Droplets, Philos Transact A Math Phys Eng Sci 362:1-18 (2004).
Brody et al., A self-assembled microlensing rotational probe, Applied Physics Letters, 74:144-46 (1999).
Brown et al., Chemical synthesis and cloning of a tyrosine tRNA gene, Methods Enzymol 68:109-151 (1979).
Bru, R. et al., Catalytic activity of elastase in reverse micelles, Biochem Mol Bio Int, 31(4):685-92 (1993).
Bru, R. et al., Product inhibition of alpha-chymotrypsin in reverse micelles. Eur J Biochem 199(1): 95-103 (1991).
Brummelkamp et al., A system for stable expression of short interfering RNAs in mammalian cells, Science 296 (5567):550-3 (2002).
Buckpitt et al.,Hepatic and pulmonary microsomal metabolism of naphthalene to glutathione adducts: factors affecting the relative rates of conjugate formation, J. Pharmacol. Exp. Ther. 231:291-300 (1984).
Buican et al., Automated single-cell manipulation and sorting by light trapping, Applied Optics 26(24):5311-5316 (1987).
Burbaum, J., Miniaturization technologies in HTS: how fast, how small, how soon Drug Discov Today 3:313-322 (1998).
Burns et al., Microfabricated structures for integrated DNA analysis, Proc. Natl. Acad. Sci. USA, 93:5556-5561(1996).
Burns, J.R. et al., The Intensification of Rapid Reactions in Multiphase Systems Using Slug Flow in Capillaries, Lab on a Chip, 1:10-15 (2001).
Burns, Mark et al., An Integrated Nanoliter DNA Analysis Device, Science, 282:484-487(1998).
Byrnes, P.J. et al., Sensitive fluorogenic substrates for the detection of trypsin-like proteases and pancreatic elastase, Anal Biochem, 126:447 (1982).
Cahill et al., Polymerase chain reaction and Q beta replicase amplification, Clin Chem 37(9):1482-5 (1991).
Caldwell, S.R. et al., Limits of diffusion in the hydrolysis of substrates by the phosphodiesterase from Pseudomonas diminuta, Biochemistry, 30: 7438-7444 (1991).
Calvert, P., Inkjet printing for materials and devices, Chem Mater 13: 3299-3305 (2001).
Caruthers, Gene synthesis machines: DNA chemistry and its uses, Science 230:281-285 (1985).
Chakrabarti, A.C. et al., Production of RNA by a polymerase protein encapsulated within phospholipid vesicles, J Mol Evol, 39(6):555-9 (1994).
Chamberlain and Ring, Characterization of T7-specific ribonucleic acid polymerase. 1. General properties of the enzymatic reaction and the template specificity of the enzyme, J Biol Chem 248:2235-44 (1973).
Chan, Emory M. et al., Size-Controlled Growth of CdSe Nanocrystals in Microfluidic Reactors, Nano Letters, 3(2):199-201(2003).
Chang and Su, Controlled double emulsification utilizing 3D PDMS microchannels, Journal of Micromechanics and Microengineering 18:1-8 (2008).
Chang, T.M., Recycling of NAD(P) by multienzyme systems immobilized by microencapsulation in artifical cells, Methods Enzymol, 136(67):67-82 (1987).
Chao et al., Control of Concentration and Volume Gradients in Microfluidic Droplet Arrays for Protein Crystallization Screening, 26th Annual International Conference of the IEEE Engineering in Medicine and Biology Society, San Francisco, California Sep. 1-5, (2004).

(56) References Cited

OTHER PUBLICATIONS

Chao et al., Droplet Arrays in Microfluidic Channels for Combinatorial Screening Assays, Hilton Head 2004: A Solid State Sensor, Actuator and Microsystems Workshop, Hilton Head Island, South Carolina, Jun. 6-10, (2004).
Chapman et al., In vitro selection of catalytic RNAs, Curr. op. Struct. Biol., 4:618-22 (1994).
Chayen, Crystallization with oils: a new dimension in macromolecular crystal growth Journal of Crystal Growth,196:434-441(1999).
Chen et al., Capturing a Photoexcited Molecular Structure Through Time-Domain X-ray Absorption Fine Structure, Science 292(5515):262-264 (2001).
Chen et al., Microfluidic Switch for Embryo and Cell Sorting the 12th International Conference on Solid State Sensors, Actuators, and Microsystems, Boston, MA Jun. 8-12, 2003 Transducers, 1: 659-662 (2003).
Chen-Goodspeed et al., Structural Determinants of the substrate and stereochemical specificity of phosphotriesterase, Biochemistry, 40(5):1325-31 (2001).
Chen-Goodspeed, M. et al., Enhancement, relaxation, and reversal of the stereoselectivity for phosphotriesterase by rational evolution of active site residues, Biochemistry, 40: 1332-1339 (2001b).
Cheng, Z.,et al, Electro flow focusing inmicrofluidic devices, Microfluidics Poster, presented at DBAS, Frontiers in Nanoscience, presented Apr. 10, 2003.
Chetverin and Spirin, Replicable RNA vectors: prospects for cell-free gene amplification, expression, and cloning, Prog Nucleic Acid Res Mol Biol, 51:225-70 (1995).
Chiang, C.M. et al., Expression and purification of general transcription factors by FLAG epitope-tagging and peptide elution, Pept Res, 6: 62-64 (1993).
Chiba et al., Controlled protein delivery from biodegradable tyrosino-containing poly(anhydride-co-imide) microspheres, Biomaterials, 18(13): 893-901 (1997).
Chiou et al., A closed-cylce capillary polymerase chain reaction machine, Analytical Chemistry, American Chamical Society, 73:2018-21 (2001).
Chiu et al., Chemical transformations in individual ultrasmall biomimetic containers, Science, 283: 1892-1895 (1999).
Chou et al., A mirofabricated device for sizing and sorting DNA molecules 96:11-13(1998).
Clackson, T. et al., In vitro selection from protein and peptide libraries, Trends Biotechnol, 12:173-84 (1994).
Clausell-Tormos et al., Droplet-based microfluidic platforms for the encapsulation and screening of Mammalian cells and multicellular organisms, Chem Biol 15(5):427-437 (2008).
Cohen, S. et al., Controlled delivery systems for proteins based on poly(lactic/glycolic acid) microspheres, Pharm Res, 8(6)113-720 (1991).
Collins et al., Optimization of Shear Driven Droplet Generation in a Microluidic Device, ASME International Mechanical Engineering Congress and R&D Expo, Washington (2003).
Collins, J. et al., Microfluidic flow transducer based on the measurements of electrical admittance, Lab on a Chip, 4:7-10 (2004).
Compton, J., Nucleic acid sequence-based amplification, Nature, 350(6313):91-2 (1991).
Cormack, B.P. et al., FACS-optimized mutants of the green fluorescent protein (GFP), Gene 173(1):33-38 (1996).
Cortesi et al., Production of lipospheres as carriers for bioactive compounds, Biomateials, 23(11): 2283-2294 (2002).
Courrier et al., Reverse water-in-fluorocarbon emulsions and microemulsions obtained with a fluorinated surfactant, Colloids and Surfaces A: Physicochem. Eng. Aspects 244:141-148 (2004).
Eow et al., The behavior of a liquid-liquid interface and drop-interface coalescence under the influence of an electric field, Colloids and Surfaces A: Physiochem. Eng. Aspects 215:101-123 (2003).

Eow, et al. Electrostatic and hydrodynamic separation of aqueous drops in a flowing viscous oil, Chemical Eng Proc 41:649-657 (2002).
Extended European Search Report for EP 10181911.8 mailed Jun. 1, 2011 (7 pages).
Extended European Search Report for EP 10184514.7 mailed Dec. 20, 2010 (5 pages).
Faca et al., A mouse to human search for plasma proteome changes associated with pancreatic tumor development, PLoS Med 5(6):e123 (2008).
Fahy et al., Self-sustained sequence replication (3SR): an isothermal transcription-based amplification system alternative to PCR, PCR Methods Appl 1:25-33 (1991).
Fan and Harrison, Micromachining of capillary electrophoresis injectors and separators on glass chips and evaluation of flow at capillary intersections, Anal Chem 66:177-184 (1994).
Fastrez, J., In vivo versus in vitro screening or selection for catalytic activity in enzymes and abzymes, Mol Biotechnol 7(1):37-55 (1997).
Fettinger et al., Stacked modules for micro flow systems in chemical analysis: concept and studies using an enlarged model, Sens Actuat B. 17:19-25 (1993).
Fiedler et al., Dielectrophoretic sorting of particles and cells in a microsystem, Anal Chem 70(9):1909-1915 (1998).
Field, J. et al., Purification of a RAS-responsive adenylyl cyclase complex from *Saccharomyces cervisiae* by use of an epitope addition method. Mol Cell Biol, 8: 2159-2165 (1988).
Fields, S. and Song, O., A novel genetic system to detect protein-protein interactions, Nature 340(6230): 245-6 (1989).
Filella et al., TAG-72, CA 19.9 and CEA as tumor markers in gastric cancer, Acta Oncol. 33(7):747-751 (1994).
Finch, C.A., Encapsulation and controlled release, Spec Publ R Soc Chem, 138:35 (1993).
Finch, C.A., Industrial Microencapsulation: Polymers for Microcapsule Walls, 1-12 in Encapsulation and Controlled Release, Woodhead Publishing (1993).
Fire & Xu, Rolling replication of short DNA circles, PNAS 92(10):4641-5 (1995).
Firestine, S.M. et al., Using an AraC-based three hybrid system to detect biocatalysts in vivo, Nat Biotechnol 18:544-547 (2000).
Fisch et al., A strategy of exon shuffling for making large peptide repertoires displayed on filamentous bacteriophage, PNAS 93:7761-6 (1996).
Fisher et al., Cell Encapsulation on a Microfluidic Platform, The Eighth International Conference on Miniaturised Systems for Chemistry and Life Scieces, MicroTAS 2004, Sep. 26-30, Malmo, Sweden.
Fletcher et al., Micro reactors: principles and applications in organic synthesis, Tetrahedron 58:4735-4757 (2002).
Fluri et al., Integrated capillary electrophoresis devices with an efficient postcolumn reactor in planar quartz and glass chips, Anal Chem 68:4285-4290 (1996).
Fornusek, L. et al., Polymeric microspheres as diagnostic tools for cell surface marker tracing, Crit Rev Ther Drug Carrier Syst, 2:137-74 (1986).
Fowler, Enhancement of Mixing by Droplet-Based Microfluidics, Int Conf MEMS 97-100 (2002).
Freese, E., The specific mutagenic effect of base analogues on Phage T4, J Mol Biol, 1: 87 (1959).
Frenz et al., Reliable microfluidic on-chip incubation of droplets in delay-lines, Lab on a Chip 9:1344-1348 (2008).
Fu et al., A microfabricated fluorescence-activated cell sorter, Nature Biotechnology, 17(11):1109-1111 (1999).
Fu et al., An Integrated Microfabricated Cell Sorter, Anal. Chem., 74: 2451-2457 (2002).
Fulton et al., Advanced multiplexed analysis with the FlowMetrix system, Clin Chem 43:1749-1756 (1997).
Fulwyler, Electronic Separation of Biological Cells by Volume, Science 150(3698):910-911 (1965).
Gallarate et al., On the stability of ascorbic acid in emulsified systems for topical and cosmetic use, Int J Pharm 188(2):233-241 (1999).

(56) References Cited

OTHER PUBLICATIONS

Ganan-Calvo, A.M., Perfectly Monodisperse Microbubbling by Capillary Flow Focusing, Phys Rev Lett 87(27): 274501-1-4 (2001).

Ganan-Calvo, Generation of Steady Liquid Microthreads and Micron-Sized Monodisperse Sprays and Gas Streams, Phys Rev Lett 80(2):285-288 (1998).

Garcia-Ruiz et al. A super-saturation wave of protein crystallization, J. Crystal Growth, 232:149-155(2001).

Garcia-Ruiz et al., Investigation on protein crystal growth by the gel acupuncture method{, Acta, Cryst., 1994, D50, 99. pp. 484-490.

Garstecki, et al., Formation of monodisperse bubbles in a microfluidic flow-focusing device, Appl Phys Lett 85(13):2649-2651 (2004).

Gasperlin et al., The structure elucidation of semisolid w/o emulsion systems containing silicone surfactant, Intl J Pharm, 107:51-6 (1994).

Gasperlin et al., Viscosity prediction of lipophillic semisolid emulsion systems by neural network modeling, Intl J Pharm, 196:37-50 (2000).

Georgiou et al., Display of heterologous proteins on the surface of microorganisms: from the screenign of combinatiorial libraires to live recombinant vaccines. Nat Biotechnol 15(1), 29-34 (1997).

Georgiou, G., Analysis of large libraries of protein mutants using flow cytometry, Adv Protein Chem, 55: 293-315 (2000).

Gerdts et al., A Synthetic Reaction NetWork: Chemical Amplification Using Nonequilibrium Autocatalytic Reactions Coupled in Time, J. Am. Chem. Soc 126:6327-6331 (2004).

Ghadessy et al., Directed Evolution of Polymerase Function by Compartmentalized Self-Replication, PNSAS 98(8):4552-4557 (2001).

Gibbs et al., Detection of single DNA base differences by competitive oligonucleotide priming, Nucleic Acids Res. 17(7): 2437-48 (1989).

Gilliland, G., Analysis of cytokine mRNA and DNA: Detection and quantitation by competitive polymerase chain reaction, PNAS, 87(7):2725-9 (1990).

Giusti et al., Synthesis and characterization of 5' fluorescent dye labeled oligonucleotides, Genome Res 2:223-227 (1993).

Gold et al., Diversity of Oligonucleotide Functions Annu Rev Biochem, 64: 763-97 (1995).

Goodall, J. L. et al., Operation of Mixed-Culture Immobilized Cell Reactors for the Metabolism of Meta- and Para-Nitrobenzoate by *Comamonas* Sp. JS46 and *Comamonas* Sp. JS47, Biotechnology and Bioengineering, 59 (1): 21-27 (1998).

Gordon and Balasubramanian, Solid phase synthesis—designer linkers for combinatorial chemistry: a review, J. Chem. Technol. Biotechnol., 74(9):835-851 (1999).

Grasland-Mongrain et al., Droplet coalescence in microfluidic devices, 30 pages (Jul. 2003) From internet: http://www.eleves.ens.fr/home/grasland/rapports/stage4.pdf.

Green, R. and Szostak, J.W., Selection of a Ribozyme That Functions as a Superior Template in a Self Copying Reaction, Science, 258: 1910-5 (1992).

Gregoriadis, G., Enzyme entrapment in liposomes, Methods Enzymol 44:218-227 (1976).

Griffiths et al., Directed evolution of an extremely fast phosphotriesterase by in vitro compartmentalization, EMBO J, 22:24-35 (2003).

Griffiths et al., Isolation of high affinity human antibodies directly from large synthetic repertoires, Embo J 13(14):3245-60 (1994).

Griffiths et al., Man-made enzymes-from design to in vitro compartmentalisation, Curr Opin Biotechnol 11:338-353 (2000).

Griffiths, A., and Tawfik, D., Miniaturising the laboratory in emulsion droplets, Trend Biotech 24(9):395-402 (2006).

Griffiths, A.D. et al., Strategies for selection of antibodies by phage display, Curr Opin Biotechnol, 9:102-8 (1998).

Guatelli, J.C. et al., Isothermal, in vitro amplification of nucleic acids by a multienzyme reaction modeled after retroviral replication, PNAS, 87(5):1874-8 (1990).

Guixe et al., Ligand-Induced Conformational Transitions in *Escherichia coli* Phosphofructokinase 2: Evidence for an Allosteric Site for MgATP2n, Biochem., 37: 13269-12375 (1998).

Gupta, K.C., et al., A general method for the synthesis of 3'-sulfhydryl and phosphate group containing oligonucleotides, Nucl Acids Res 19 (11): 3019-3026 (1991).

Haber et al., Activity and spectroscopic properties of bovine liver catalase in sodium bis(2-ethylhexyl) sulfosuccinate/isooctane reverse micelles, Eur J Biochem 217(2): 567-73 (1993).

Habig and Jakoby, Assays for differentiation of glutathione S-transferases, Methods in Enzymology, 77: 398-405 (1981).

Hadd et al., Microchip Device for Performing Enzyme Assays, Anal. Chem 69(17): 3407-3412 (1997).

Haddad et al., A methodology for solving physiologically based pharmacokinetic models without the use of simulation software, Toxicol Lett. 85(2): 113-26 (1996).

Hagar and Spitzer, The effect of endotoxemia on concanavalin A induced alterations in cytoplasmic free calcium in rat spleen cells as determined with Fluo-3, Cell Calcium 13:123-130 (1992).

Hai et al., Investigation on the release of fluorescent markers from the w/o/w emulsions by fluorescence-activated cell sorter, J Control Release, 96(3): 393-402 (2004).

Haies et al., Morphometric study of rat lung cells. I. Numerical and dimensional characteristics of parenchymal cell population, Am. Rev. Respir. Dis. 123:533-54 (1981).

Hall, Experimental evolution of Ebg enzyme provides clues about the evolution of catalysis and to evolutionary potential, FEMS Microbiol Lett, 174(1):1-8 (1999).

Hall, The EBG system of *E. coli*: origin and evolution of a novel beta-galactosidase for the metabolism of lactose, Genetica 118(2-3):143-56 (2003).

Han et al., Quantum-dot-tagged Microbeads for Multiplexed Optical Coding of Biomolecules, Nat Biotech 19(7):631-635 (2001).

Handen, J.S., High-throughput screening—challenges for the future, Drug Discov World, 47-50 (2002).

Handique, K. et al., On-Chip Thermopneumatic Pressure for Discrete Drop Pumping, Analytical Chemistry, 73:1831-1838 (2001).

Hanes et al., Degradation of porous poly(anhydide-co-imide) microspheres and implication for controlled macromolecule delivery, Biomaterials, 19(1-3): 163-172(1998).

Hanes et al., In vitro selection and evolution of functional proteins by using ribosome display, PNAS 94:4937-42 (1997).

Hansen et al., A robust and scalable microfluidic metering method that allows protein crystal growth by free interface diffusion, PNAS 99(26):16531-16536 (2002).

Harada et al., Monoclonal antibody G6K12 specific for membrane-associated differentiation marker of human stratified squamous epithelia and squamous cell carcinoma, J. Oral Pathol. Med 22(4):145-152 (1993).

Harder, K.W. et al., Characterization and kinetic analysis of the intracellular domain of human protein tyrosine phosphatase beta (HPTP beta) using synthetic phosphopeptides, Biochem J 298 (Pt 2): 395-401 (1994).

Harries et al., A Numerical Model for Segmented Flow in a Microreactor, Int J of Heat and Mass Transfer, 46:3313-3322 (2006).

Harris et al., Single-molecule DNA sequencing of a viral genome, Science 320(5872):106-109 (2008).

Harrison et al., Micromachining a miniaturized capillary electrophoresis-based chemical analysis system on a chip, Science 261(5123):895-897 (1993).

Hasina et al., Plasminogen activator inhibitor-2: a molecular biomarker for head and neck cancer progression, Cancer Research 63:555-559 (2003).

Haynes Principles of Digital PCR and Measurement IssueOct. 15, 2012.

Hayward et al., Dewetting Instability during the Formation of Polymersomes from BloceCopolymer-Stabilized Double Emulsions, Langmuir, 22(10): 4457-4461 (2006).

He et al., Selective encapsulation of single cells and subcellular organelles into picoliter- and femtoliter-volume droplets, Anal Chem 77(6):1539-1544 (2005).

(56) References Cited

OTHER PUBLICATIONS

Heim et al., Engineering Green Fluorescent Protein for Improved Brightness, Longer Wavelengths and Fluorescence Response Energy Transfer, Carr. Biol, 6(2): 178-182 (1996).
Hellman et al., Differential tissue-specific protein markers of vaginal carcinoma, Br J Cancer, 100(8): 1303-131 (2009).
Hergenrother et al., Small-Molecule Microarrays: Covalent Attachment and Screening of Alcohol-Containing Small Molecules on Glass Slides, J. Am. Chem. Soc, 122: 7849-7850 (2000).
Hildebrand et al., Liquid-Liquid Solubility of Perfluoromethylcyclohexane with Benzene, Carbon Tetrachloride, Chlorobenzene, Chloroform and Toluene, J. Am. Chem. Soc, 71: 22-25 (1949).
Hjelmfelt et al, Pattern-Recognition in Coupled Chemical Kinetic Systems, Science, 260(5106):335-337 (1993).
Ho, S.N. et al., Site-directed mutageneiss by overlap extension using the polymerase chain reaction, Gene, 77(1):51-9 (1989).
Hoang, Physiologically based pharmacokinetic models: mathematical fundamentals and simulation implementations, Toxicol Lett 79(1-3):99-106 (1995).
Hochuli et al., New metal chelate adsorbent selective for proteins and peptides containing neighbouring histidine residues, J Chromatogr 411: 177-84 (1987).
Holmes et al., Reagents for Combinatorial Organic Synthesis: Development of a New O-Nitrobenzyl Photolabile Linder for Solid Phase Synthesis, J. OrgChem., 60: 2318-2319(1995).
Hong, S.B. et al., Stereochemical constraints on the substrate specificity of phosphodiesterase, Biochemistry, 38:1159-1165 (1999).
Hoogenboom et al., Multi-subunit proteins on the surface of filamentous phage: methodologies for displaying antibody (Fab) heavy and light chains, Nucl Acids Res., 91: 4133-4137 (1991).
Hoogenboom, H.R., Designing and optimizing library selection strategies for generating high-affinity antibodies, Trends Biotechnol, 15:62-70 (1997).
Hopfinger & Lasheras, Explosive Breakup of a Liquid Jet by a Swirling Coaxial Jet, Physics of Fluids 8(7):1696-1700 (1996).
Hopman et al., Rapid synthesis of biotin-, digoxigenin-, trinitrophenyl-, and fluorochrome-labeled tyramides and their application for In situ hybridization using CARD amplification, J of Histochem and Cytochem, 46(6):771-77 (1998).
Horton et al., Engineering hybrid genes without the use of restriction enzymes: gene splicing by overlap extension, Gene 77(1), 61-8 (1989).
Hosokawa, Kazuo et al., Handling of Picoliter Liquid Samples in a Poly(dimethylsiloxane)-Based Microfluidic Device, Analytical Chemistry, 71(20):4781-4785 (1999).
Hsu et al., Comparison of process parameters for microencapsulation of plasmid DNA in poly(D, L-lactic-co-glycolic acid microspheres, J Drug Target, 7:313-23 (1999).
Huang L. R. et al., Continuous particle separation through deterministic lateral displacement, Science 304(5673):987-990 (2004).
Van Dilla et al., Cell Microfluorometry: A Method for Rapid Fluorescence Measurement, Science 163(3872):1213-1214 (1969).
Van Dilla et al., The fluorescent cell photometer: a new method for the rapid measurement of biological cells stained with fluorescent dyes, Annual Report of the Los Alamos Scientific Laboratory of the University of California (Los Alamos, NM), Biological and Medical Research Groupp (H-4) of the Health Division, Compiled by D. G. Ott, pp. 100-105, distributed Jan. 23, 1968.
Vanhooke et al., Three-dimensional structure of the zinc-containing phosphotrieesterase with the bound substrate analog diethy 4-methylbenzylphosphonate, Biochemistry 35:6020-6025 (1996).
Varga, J.M. et al., Mechanism of allergic cross-reactions-I. Multispecific binding of ligands to a mouse monoclonal anti-DNP IgE antibody. Mol Immunol 28(6), 641-54 (1991).
Vary, A homogeneous nucleic acid hybridization assay based on strand displacement, Nucl Acids Res 15(17):6883-6897 (1987).
Venkateswaran et al., Production of Anti-Fibroblast Growth Factor Receptor Monoclonal Antibodies by in Vitro Immunization, Hybirdoma, 11(6):729-739 (1992).
Venter et al., The sequence of the human genome, Science 291(5507):1304-51 (2001).
Vogelstein et al., Digital PCR, PNAS 96(16):9236-9241 (1999).
Voss, E.W., Kinetic measurements of molecular interactions by spectrofluorometry, J Mol Recognit, 6:51-58 (1993).
Wahler, D. et al., Novel methods for biocatalyst screening. Curr Opin Chem Biol, 5: 152-158 (2001).
Walde, P. et al., Oparin's reactions revisited: enzymatic synthesis of poly(adenylic acid) in micelles and self-reproducing vescsiles. J Am Chem Soc. 116: 7541-7547 (1994).
Walde, P. et al., Spectroscopic and kinetic studies of lipases solubilized in reverse micelles, Biochemistry, 32(15):4029-34 (1993).
Walde, P. et al., Structure and activity of trypsin in reverse micelles, Eur J Biochem, 173(2):401-9 (1988).
Walker et al., Isothermal in vitro amplification of DNA by a restriction enzyme/DNA polymerase system, PNAS 89(1):392-6 (1992).
Walker et al., Strand displacement amplification—an isothermal, in vitro DNA amplification technique, Nucleic Acid Res, 20(7):1691-6 (1992).
Wang et al., DEP actuated nanoliter droplet dispensing using feedback control, Lab on a Chip 9:901-909 (2008).
Wang et al., Preparation of Titania Particles Utilizing the Insoluble Phase Interface in a MicroChannel Reactor, Chemical Communications 14:1462-1463 (2002).
Wang, A.M. et al., Quantitation of mRNA by the polymerase chain reaction. Proc natl Acad Sci USA 86(24), 9717-21 (1989).
Wang, G.T. et al., Design and synthesis of new fluorogenic HIV protease substrates based on resonance energy transfer, Tetrahedron Lett., 31:6493 (1990).
Warburton, B., Microcapsules for Multiple Emulsions, Encapsulation and Controlled Release, Spec Publ R Soc Chem, 35-51 (1993).
Wasserman et al., Structure and reactivity of allyl-siloxane monolayers formed by reaction of allcyltrichlorosilanes on silicon substrates, Langmuir 5:1074-1087 (1989).
Weil. et al., Selective and accurate initiation of transcription at the Ad2 major late promotor in a soluble system dependent on purified RNA polymerase II and DNA, Cell, 18(2):469-84 (1979).
Werle et al., Convenient single-step, one tube purification of PCR products for direct sequencing, Nucl Acids Res 22(20):4354-4355 (1994).
Wetmur et al., Molecular haplotyping by linking emulsion PCR: analysis of paraoxonase 1 haplotypes and phenotypes, Nucleic Acids Res 33(8):2615-2619 (2005).
Wick et al., Enzyme-containing liposomes can endogenously produce membrane-constituting lipids, Chem Biol 3(4):277-85 (1996).
Widersten and Mannervik, Glutathione Transferases with Novel Active Sites Isolated by Phage Display from a Library of Random Mutants, J Mol Biol 250(2):115-22 (1995).
Wiggins et al., Foundations of chaotic mixing, Philos Transact A Math Phys Eng Sci 362(1818):937-70 (2004).
Williams et al., Amplification of complex gene libraries by emulsion PCR, Nature Methods 3(7):545-550 (2006).
Williams et al., Methotrexate, a high-affinity pseudosubstrate of dihydrofolate reductase, Biochemistry, 18(12):2567-73 (1979).
Wilson, D.S. and Szostak, J.W., In vitro selection of functional nucleic acids, Ann. Rev. Biochem. 68: 611-647 (1999).
Winter et al., Making antibodies by phage display technology, Annu Rev Immunol 12:433-55 (1994).
Wittrup, K.D., Protein engineering by cell-surface display. Curr Opin Biotechnology, 12: 395-399 (2001).
Wolff et al., Integrating advanced functionality in a microfabricated high-throughput fluorescent-activated cell sorter, Lab Chip, 3(1): 22-27 (2003).
Wronski et al., Two-color, fluorescence-based microplate assay for apoptosis detection. Biotechniques, 32:666-668 (2002).
Wu et al., The ligation amplification reaction (LAR)-amplification of specific DNA sequences using sequential rounds of template-dependent ligation, Genomics 4(4):560-9 (1989).

(56) References Cited

OTHER PUBLICATIONS

Wyatt et al., Synthesis and purification of large amounts of RNA oligonucleotides, Biotechniques 11(6):764-9 (1991).
Xia and Whitesides, Soft Lithography, Angew. Chem. Int. Ed. 37:550-575 (1998).
Xia and Whitesides, Soft Lithography, Ann. Rev. Mat. Sci. 28:153-184 (1998).
Xu, S. et al., Generation of monodisperse particles by using microfluidics: control over size, shape, and composition, Angew. Chem. Int. Ed. 44:724-728 (2005).
Yamagishi, J. et al., Mutational analysis of structure-activity relationships in human tumor necrosis factor-alpha, Protein Eng, 3:713-9 (1990).
Yamaguchi et al., Insulin-loaded biodegradable PLGA microcapsules: initial burst release controlled by hydrophilic additives, Journal of Controlled Release, 81(3): 235-249 (2002).
Yelamos, J. et al., Targeting of non-Ig sequences in place of the V segment by somatic hypermutation. Nature 376(6537):225-9 (1995).
Yershov et al., DNA analysis and diagnostics on oligonucleotide microchips, PNAS 93(10):4913-4918 (1996).
Yonezawa et al., DNA display for in vitro selection of diverse peptide libraries, Nucleic Acids Research, 31(19): e118 (2203).
Yu et al. Responsive biomimetic hydrogel valve for microfluidics. Appl. Phys. Lett 78:2589-2591 (2001).
Yu et al., Quantum dot and silica nanoparticle doped polymer optical fibers, Optics Express 15(16):9989-9994 (2007).
Yu et al., Specifc inhibition of PCR by non-extendable oligonucleotides using a 5' to 3' exonuclease-deficient DNA polymerase, Biotechniques 23(4):714-6, 718-20 (1997).
Zaccolo, M. et al., An approach to random mutagenesis of DNA using mixtures of triphosphate derivatives of nucleoside analogues. J Mol Biol 255(4):589-603 (1996).
Zakrzewski, S.F., Preparation of tritiated dihydrofolic acid of high specific activity, Methods Enzymol, 539 (1980).
Zaug and Cech, The intervening sequence RNA of Tetrahymena is an enzyme, Science 231(4737):470-5 (1986).
Adang, A.E. et al., The contribution of combinatorial chemistry to lead generation: an interim analysis, Curr Med Chem 8: 985-998 (2001).
Advisory Action for U.S. Appl. No. 11/360,845, mailed Jun. 14, 2010.
Advisory Action for U.S. Appl. No. 11/698,298 mailed May 20, 2011.
Affholter and F. Arnold, Engineering a Revolution, Chemistry in Britain, Apr. 1999, p. 48.
Agrawal and Tang, Site-specific functionalization of oligodeoxynucleotides for non-radioactive labelling, Tetrahedron Letters 31:1543-1546 (1990).
Aharoni et al., High-Throughput screens and selections of enzyme-encoding genes, Curr Opin Chem Biol, 9(2): 210-6 (2005).
Ahn et al., Dielectrophoretic manipulation of drops for high-speed microluidic sorting devices, Applied Phys Lett 88, 024104 (2006).
Allen et al., High throughput fluorescence polarization: a homogeneous alternative to radioligand binding for cell surface receptors J Biomol Screen. 5(2):63-9 (2000).
Altman et al., Solid-state laser using a rhodamine-doped silica gel compound, IEEE Photonics technology letters 3(3):189-190 (1991).
Amstutz, P. et al., In vitro display technologies: novel developments and applications. Curr Opin Biotechnol, 12, 400-405 (2001).
Anarbaev et al., Klenow fragment and DNA polymerase alpha-primase fromserva calf thymus in water-in-oil microemulsions, Biochim Biophy Acta 1384:315-324 (1998).
Anderson et al., Preparation of a cell-free protein-synthesizing system from wheat germ, Methods Enzymol 101:635-44 (1983).
Anderson, J.E., Restriction endonucleases and modification methylases, Curr. Op. Struct. Biol., 3:24-30 (1993).
Ando, S. et al., PLGA microspheres containing plasmid DNA: preservation of supercoiled DNA via cryopreparation and carbohydrate stabilization, J Pharm Sci, 88(1):126-130 (1999).

Angell et al., Silicon micromechanical devices, Scientific American 248:44-55 (1983).
Anhuf et al., Determination of SMN1 and SMN2 copy number using TaqMan technology, Hum Mutat 22(1):74-78 (2003).
Anna et al., Formation of dispersions using flow focusing in microchannels, Applied Physics Letters,82(3): 364-366 (2003).
Arkin, M.R. et al., Probing the importance of second sphere residues in an esterolytic antibody by phage display, J Mol Mi 284(4):1083-94 (1998).
Armstrong et al., Multiple-Component Condensation Strategies for Combinatorial Library Synthesis, Acc. Chem. Res. 29(3):123-131 (1996).
Ashkin and Dziedzic, Optical trapping and manipulation of viruses and bacteria, Science 235(4795):1517-20 (1987).
Ashkin et al., Optical trapping and manipulation of single cells using infrared laser beams, Nature 330:769-771 (1987).
Atwell, S. & Wells, J.A., Selection for Improved Subtiligases by Phage Display, PNAS 96: 9497-9502(1999).
Auroux, Pierre-Alain et al., Micro Total Analysis Systems. 2. Analytical Standard Operations and Applications, Analytical Chemistry, vol. 74, No. 12, 2002, pp. 2637-2652.
Baccarani et al., *Escherichia coli* dihydrofolate reductase: isolation and characterization of two isozymes, Biochemistry 16(16):3566-72 (1977).
Baez et al., Glutathione transferases catalyse the detoxication of oxidized metabolites (o-quinones) of catecholamines and may serve as an antioxidant system preventing degenerative cellular processes, Biochem. J 324:25-28 (1997).
Bagwe et al, Improved drug delivery using microemulsions: rationale, recent progress, and new horizons, Crit Rev Ther Drug Carr Sys 18(1):77-140 (2001).
Baker, M., Clever PCR: more genotyping, smaller volumes, Nature Methods 7:351-356 (2010).
Ball and Schwartz, CMATRIX: software for physiologically based pharmacokinetic modeling using a symbolic matrix representation system, Comput Biol Med 24(4):269-76 (1994).
Ballantyne and Nixon, Selective Area Metallization by Electron-Beam Controlled Direct Metallic Deposition, J. Vac. Sci. Technol. 10:1094 (1973).
Barany F., The ligase chain reaction in a PCR World, PCR Methods and Applications 1(1):5-16 (1991).
Barany, F. Genetic disease detection and DNA amplification using cloned thermostable ligase, PNAS 88(1): 189-93 (1991).
Baret et al., Fluorescence-activated droplet sorting (FADS): efficient microfluidic cell sorting based on enzymatic activity, Lab on a Chip 9:1850-1858 (2009).
Baret et al., Kinetic aspects of emulsion stabilization by surfactants: a microfluidic analysis, Langmuir 25:6088-6093 (2009).
Bass et al., Hormone Phage: An Enrichment Method for Variant Proteins With Altered Binding Properties, Proteins 8:309-314(1990).
Bauer, J., Advances in cell separation: recent developments in counterflow centrifugal elutriation and continuous flow cell separation, J Chromotography, 722:55-69 (1999).
Beebe et al., Functional hydrogel structures for autonomous flow control inside microfluidic channels, Nature 404:588-590 (2000).
Beer et al., On-Chip, Real-Time, Single-Copy Polymerase Chain Reaction in Picoliter Droplets, Anal. Chem., 2007, v. 79, pp. 847-8475.
Bein, Thomas, Efficient Assays for Combinatorial methods for the Discovery of Catalysts, Agnew. Chem. Int. Ed. 38:3, 323-26 (1999).
Benichou et al., Double Emulsions Stabilized by New Molecular Recognition Hybrids of Natural Polymers, Polym. Adv. Tehcnol 13:1019-1031 (2002).
Benner, S.A., Expanding the genetic lexicon: incorporating non-standard amino acids into proteins by ribosome-based synthesis, Trends Biotechnol 12:158-63 (1994).
Benning, M.M. et al., The binding of substrate analogs to phosphotriesterase. J Biol Chem, 275, 30556-30560 (2000).
Berman et al., An agarose gel electrophoresis assay for the detection of DNA-binding activities in yeast cell extracts, Methods Enzymol 155:528-37 (1987).

(56) References Cited

OTHER PUBLICATIONS

Bernath et al, In Vitro Compartmentalization by Double Emulsions: Sorting and Gene Enrichment by Fluorescence Activated Cell Sorting, Anal. Biochem 325:151-157 (2004).
Bernath et al., Directed evolution of protein inhibitors of DNA-nucleases by in vitro compartmentalization (IVC) and nano-droplet delivery, J. Mol. Biol 345(5):1015-26 (2005).
Betlach, L. et al., A restriction endonuclease analysis of the bacterial plasmid controlling the EcoRl restriction and modification of DNA. Federation Proceedings, 35, 2037-2043 (1976).
Bibette et al., Emulsions: basic principles, Rep. Prog. Phys. 62: 969-1033 (1999).
Bico, Jose et al., Rise of Liquids and Bubbles in Angular Capillary Tubes, Journal of Colloid and Interface Science, 247:162-166 (2002).
Bico, Jose et al., Self-Propelling Slugs, J. Fluid Mech., 467:101-127 (2002).
Blattner and Dahlberg, RNA synthesis startpoints in bacteriophage lambda: are the promoter and operator transcribed, Nature New Biol 237(77):227-32 (1972).
Boder et al., Yeast surface display for screening combinatorial polypeptide libraries, Nat Biotechnol 15(6):553-7 (1997).
Park et al., Cylindrical compact thermal-cycling device for continuous-flow polymeras chain reaction, Anal Chem, ACS, 75:6029-33 (2003).
Park et al., Model of Formation of Monodispersed Colloids, J. Phys. Chem. B 105:11630-11635 (2001).
Parker et al., Development of high throughput screening assays using fluorescence polarization: nuclear receptor-ligand-binding and kinase/phosphatase assays, J Biomol Screen, 5(2): 77-88 (2000).
Parmley et al., Antibody-selectable filamentous fd phage vectors: affinity purification of target genes. Gene 73(2):305-18 (1988).
Pedersen et al., A method for directed evolution and functional cloning of enzymes, PNAS 95(18):10523-8 (1998).
Pelham and Jackson, An efficient mRNA-dependent translation system from reticulocyte lysates, Eur J Biochem 67:247-56 (1976).
Pelletier et al., An in vivo library-versus-library selection of optimized protein-protein interactions, Nature Biotechnology, 17:683-90 (1999).
Peng et al., Controlled Production of Emulsions Using a Crossflow Membrane, Particle & Particle Systems Characterization 15:21-25 (1998).
Perelson et al., Theorectical studies of clonal selection: minimal antibody repertoire size and relaibility of self-non-self discrimination. J Theor Biol 81(4):645-70 (1979).
Perez-Gilabert et al., Application of active-phase plot to the kinetic analysis of lipoxygenase in reverse micelles, Biochemistry J. 288:1011-1015 (1992).
Perrin, J., Polarisation de la lumiere de fluorescence vie moyenne des molecules dans letat excite, J. Phys. Rad. 1:390-401 (1926).
Petrounia, I.P. et al., Designed evolution of enzymatic properties, Curr Opin Biotechnol, 11:325-330 (2000).
Piemi et al., Transdermal delivery of glucose through hairless rat skin in vitro: effect of multiple and simple emulsions, Int J Pharm, 171:207-215 (1998).
Pirrung et al., A General Method for the Spatially Defined Immobilization of Biomolecules on Glass Surfaces Using 'Caged' Biotin, Bioconjug Chem 7: 317-321 (1996).
Ploem, In Fluorescent and Luminescent Probes for Biological Activity Mason, T. G. Ed., Academic Press, Landon, pp. 1-11, 1993.
Pluckthun, A. et al., In vitro selection and evolution of proteins, Adv Protein Chem, 55: 367-403 (2000).
Pollack et al., Electrowetting-based actuation of droplets for integrated microfluidics, Lab Chip 2:96-101 (2002).
Pollack et al., Selective chemical catalysis by an antibody, Science 234(4783):1570-3 (1986).
Pons et al, Synthesis of Near-Infrared-Emitting, Water-Soluble CdTeSe/CdZnS Core/Shell Quantum Dots, Chemistry of Materials 21(8):1418-1424 (2009).

Posner et al., Engineering specificity for folate into dihydrofolate reductase from *Escherichia coli*, Biochemistry, 35:1653-63 (1996).
Poulin and Theil, "A priori" prediction of tissue: plasma partition coefficients of drugs to facilitate the use of physiologically-based pharmokinetic models in drug discovery, J Pharm Sci 89(1):16-35 (2000).
Priest, et al. Generation of Monodisperse Gel Emulsions in a Microfluidic Device, Applied Physics Letters, 88:024106 (2006).
Qi et al., Acid Beta-Glucosidase: Intrinsic Fluorescence and Conformational Changes Induced by Phospholipids and Saposin C, Biochem., 37(33): 11544-11554 (1998).
Raghuraman et al., Emulston Liquid Membranes for Wastewater Treatment: Equilibrium Models for Some Typical Metal-Extractant Systems, Environ. Sci. Technol 28:1090-1098 (1994).
Ralhan, Discovery and Verification of Head-and-neck Cancer Biomarkers by Differential Protein Expression Analysis Using iTRAQ Labeling, Multidimensional Liquid Chromatography, and Tandem Mass Spectrometry, Mol Cell Proteomics 7(6):1162-1173 (2008).
Ramsey, J.M., The burgeoning power of the shrinking laboratory, Nat Biotechnol 17(11):1061-2 (1999).
Ramstrom and Lehn, Drug discovery by dynamic combinatorial libraries, Nat Rev Drug Discov 1:26-36 (2002).
Raushel, F.M. et al., Phosphotriesterase: an enzyme in search of its natural substrate, Adv Enzymol Relat Areas Mol Biol, 74: 51-93 (2000).
Rech et al., Introduction of a yeast artificial chromosome vector into *Sarrachomyeces cervesia* by electroporation, Nucleic Acids Res 18:1313 (1990).
Reyes et al., Micro Total Analysis Systems. 1. Introduction, Theory and Technology, Anal Chem 74(12):2623-2636 (2002).
Riess, J.S., Fluorous micro- and nanophases with a biomedical perspective, Tetrahedron 58(20):4113-4131 (2002).
Roach et al., Controlling nonspecific protein adsorption in a plug-based microfluidic system by controlling inteifacial chemistry using fluorous-phase surfactants, Anal. Chem. 77:785-796 (2005).
Roberts & Ja, In vitro selection of nucleic acids and proteins: What are we learning, Curr Opin Struct Biol 9(4): 521-9 (1999).
Roberts et al., Simian virus 40 DNA directs synthesis of authentic viral polypeptides in a linked transcription-translation cell-free system 72(5):1922-1926 (1975).
Roberts, et al., RNA-peptide fusion for the in vitro selection of peptides and proteins, PNAS 94:12297-302 (1997).
Roberts, J.W.,Termination factor for RNA synthesis, Nature, 224: 1168-74 (1969).
Roberts, R.W. Totally in vitro protein selection using mRNA-protein fusions and ribosome display. Curr Opin Chem Biol 3(3), 268-73 (1999).
Rodriguez-Antona et al., Quantitative RT-PCR measurement of human cytochrome P-450s: application to drug induction studies. Arch. Biochem. Biophys., 376:109-116 (2000).
Rolland et al., Fluorescence Polarization Assay by Flow Cytometry, J. Immunol. Meth., 76(1): 1-10 (1985).
Rosenberg et al.,Termination of transcription in bacteriophage lambda, J Biol Chem, 250: 4755-64 (1975).
Rosenberry, T.L., Acetylcholinesterase, Adv Enzymol Relat Areas Mol Biol, 43: 103-218 (1975).
Rotman, Measurement of activities of single molecules of beta-galactosidase, PNAS, 47:1981-91 (1961).
Russon et al., Single-nucleotide polymorphism analysis by allele-specific extension of fluorescently labeled nucleotides in a microfluidic flow-through device, Electrophoresis, 24:158-61 (2003).
Sadtler et al., Achieving stable, reverse water-in-fluorocarbon emulsions. Angew Chem Int Ed 35:1976-1978 (1996).
Saiki, R.K, et al, Primer directed enzymatic amplification of DNA with a thermostable DNA polymerase. Science 239(4839):487-91 (1988).
Sakamoto, Rapid and simple quantification of bacterial cells by using a microfluidic device, Appl Env Microb. 71:2 (2005).
Sanchez et al., Breakup of Charged Capillary Jets, Bulletin of the American Physical Society Division of Fluid Dynamics 41:1768-1768 (1996).

(56) References Cited

OTHER PUBLICATIONS

Sano, T. et al., Immuno-PCR-Very sensitive antigen-detection by means of sepcific antibody-DNA conjugates. Science 258(5079), 120-122 (1992).
SantaLucia, A unified view of polymer, dumbbell, and oligonucleotide DNA nearest-neighbor thermodynamics, PNAS 95(4):1460-5 (1998).
Santra et al., Fluorescence lifetime measurements to determine the core-shell nanostructure of FITC-doped silica nanoparticles: An optical approach to evaluate nanoparticle photostability, J Luminescence 117(1):75-82 (2006).
Craig, D. et al., Fluorescence-based enzymatic assay by capillary electrophoresis laser-induced fluoresence detection for the determinination of a few alpha-galactosidase molecules, Anal. Biochem. 226: 147 (1995).
Creagh, A.L. et al., Structural and catalytic properties of enzymes in reverse micelles, Enzyme Microb Technol 15(5):383-92 (1993).
Crosland-Taylor, A Device for Counting Small Particles suspended in a Fluid through a Tube, Nature 171:37-38 (1953).
Crowley, J. M., Electrical breakdown of bimolecular lipid membranes as an electromechanical instability, Biophys J. 13(7):711-724 (1973).
Cull, M.G. et al., Screening for receptor ligands using large libraries of peptides linked to the C terminus of the lac repressor, PNAS 89:1865-9 (1992).
Curran, D.P., Strategy-level separations in organic synthesis: from planning to practice. Angew Chem Int Ed, 37:1174-11-96 (1998).
Czarnik, A.W., Encoding methods for combinatorial chemistry, Curr Opin Chem Biol 1:60-66 (1997).
Dankwardt et al., Combinatorial synthesis of small-molecule libraries using 3-amino-5-hydroxybenzoic acid, 1:113-120 (1995).
Davis, J.A. et al., Deterministic hydrodynamics: Taking blood apart, PNAS 103:14779-14784 (2006).
Davis, S.S. et al., Multiple emulsions as targetable delivery systems, Methods in Enzymology, 149: 51-64 (1987).
de Gans, B.J. et al., Inkjet printing of polymers: state of the art and future developments, Advanced materials, 16:203-213 (2004).
De-Bashan, L. E. et al., Removal of ammonium and phosphorus ions from synthetic wastewater by the microalgae Chlorella vulgaris coimmobilized in alginate beads with the microalgae growth-promoting bacterium Azospirillum brasilense, Water Research 36:2941-2948 (2002).
Delagrave, S. et al., Red-shifted excitation mutants of the green fluorescent protein, Biotechnology 13(2):151-4 (1995).
DelRaso, In vitro methodologies for enhanced toxicity testing, Toxicol. Lett. 68:91-99 (1993).
Demartis et al., A strategy for the isolation of catalytic activities from repertoires of enzymes displayed on phage, J. Mol. Biol 286:617-633 (1999).
Dickinson, E., Emulsions and droplet size control, Wedlock, D.J., Ed., in Controlled Particle Droplet and Bubble Formulation, ButterWO rth-Heine-mann, 191-257 (1994).
DiMatteo, et al., Genetic conversion of an SMN2 gene to SMN1: A novel approach to the treatment of spinal muscular atrophy, Exp Cell Res. 314(4):878-886 (2008).
Dinsmore et al., Colioidosomes: Selectively Permeable Capsules Composed of Colloidal Particles, Science 298(5595):1006-1009. (2002).
Dittrich et al., A new embedded process for compartmentalized cell-free protein expression and on-line detection in microfluidic devices, Chembiochem 6(5):811-814 (2005).
Doi et al., In vitro selection of restriction endonucleases by in vitro compartmentilization, Nucleic Acids Res, 32(12):e95 (2004).
Doi, N. and Yanagawa, H. Stable: protein-DNA fusion system for screening of combinatorial protein libraries in vitro, FEBS Lett., 457: 227-230 (1999).
Doman, T.N. et al., Molecular docking and high-throughput screening for novel inhibitors of protein tyrosine phosphatase-1B, J Med Chem, 45: 2213-2221 (2002).

Domling A., Recent advances in isocyanide-based multicomponent chemistry, Curr Opin Chem Biol, 6(3):306-13 (2002).
Domling and Ugi, Multicomponent Reactions with Isocyanides, Angew Chem Int Ed 39(18):3168-3210 (2000).
Dove et al., In Brief, Nature Biotechnology 20:1213 (2002).
Dower et al., High efficiency transformation of *E. coli* by high voltage electroporation, Nucleic Acids Res 16:6127-6145 (1988).
Dressman et al., Transforming single DNA molecules into fluorescent magnetic particles for detection and enumeration of genetic variations, PNAS 100:8817-22 (2003).
Dreyfus et al., Ordered and disordered patterns in two phase flows in microchannels, Phys Rev Lett 90(14):144505-1-144505-4 (2003).
Drmanac et al., Sequencing by hybridization: towards an automated sequencing of one million M13 clones arrayed on membranes, Elctrophoresis 13:566-573 (1992).
Dubertret et al., In vivo imaging of quantum dots encapsulated in phospholipid micelles, Science, 298: 1759-1762 (2002).
Duffy et al., Rapid Protyping of Microfluidic Systems and Polydimethylsiloxane, Anal Chem 70:474-480 (1998).
Duggleby, R. G. Enzyme Kinetics and Mechanisms, Pt D. Academic Press 249:61-90 (1995).
Dumas, D.P., Purification and properties of the phosphotriesterase from Psuedomonas diminuta, J Biol Chem 264:19659-19665 (1989).
Eckert and Kunkel, DNA polymerase fidelity and the polymerase chain reaction, Genome Res 1:17-24 (1991).
Edd et al., Controlled encapsulation of single-cells into monodisperse picolitre drops, Lab Chip 8(8):1262-1264 (2008).
Edel, Joshua B. et al., Microfluidic Routes to the Controlled Production of Nanopaticles, Chemical Communications, 1136-1137 (2002).
Edris et al., Encapsulation of orange oil in a spray dried double emulsion, Nahrung/Food, 45(2):133-137 (2001).
Effenhauser et al., Glass chips for high-speed capillary electrophoresis separations with submicrometer plate heights, Anal Chem 65:2637-2642 (1993).
Eggers, Jens et al., Coalescence of Liquid Drops, J. Fluid Mech. ,401: 293-310 (1999).
Ehrig, T. et al., Green-fluorescent protein mutants with altered fluorescence excitation spectra, Febs Lett, 367(2):163-66 (1995).
Eigen et al., Hypercycles and compartments: compartments assists—but does not replace—hypercyclic organization of early genetic information, J Theor Biol, 85:407-11 (1980).
Eigen et al., The hypercycle: coupling of RNA and protein biosynthesis in the infection cycle of an RNA bacteriophage, Biochemistry, 30:11005-18 (1991).
Eigen, Wie entsteht information Prinzipien der selbstorganisation in der biologie, Berichte der punsen-gesellschaft fur physikalische chemi, 80:1059-81 (1976).
Ellington and Szostak, In vitro selection of RNA molecules that bind specific ligands, Nature, 346:818-822 (1990).
Ellman et al., Biosynthetic method for introducing unnatural amino acids site-specifically into proteins, Methods Enzymol, 202:301-36 (1991).
Endo et al. Kinetic determination of trace cobalt by visual autocatalytic indication, Talanta 47:349-353 (1998).
Endo et al., Autocatalytic decomposition of cobalt complexes as an indicator system for the determination of trace amounts of cobalt and effectors, Analyst 121:391-394 (1996).
Eow et al., Electrocoalesce-separators for the separation of aqueous drops from a flowing dielectric viscous liquid, Separation and Purification Tech 29:63-77 (2002).
Eow et al., Electrostatic enhancement of coalescence of water droplets in oil: a review of the technology, Chemical Engineeing Journal 85:357-368 (2002).
Eow et al., Motion, deformation and break-up of aqueous drops in oils under high electric field strengths, Chemical Eng Proc 42:259-272 (2003).
Sundberg et al., Spatially-Addressable Immobilisation of Macromolecules on Solid Supports, J. Am. Chem. Soc, 117:12050-12057 (1995).

(56) References Cited

OTHER PUBLICATIONS

Sung et al. Chip-based microfluidic devices coupled with electrospray ionization-mass spectrometry, Electrophoresis 26:1783-1791 (2005).
Suzuki et al., Random mutagenesis of thermus aquaticus DNA polmerase I: concordance of immutable sites in vivo with the crystal structure, PNAS USA, 93:96701-9675 (1996).
Tabatabai and Faghri, A New Two-Phase Flow Map and Transition Boundary Accounting for Surface Tension Effects in Horizontal Miniature and Micro Tubes, J Heat Transfer 123:958-968 (2001).
Tabatabai et al, Economic feasability study of polyelectrolyte-enhanced ultrafiltration (PEUF) for water softening, J Membrane Science 100(3):193-207 (1995).
Tabatabai et al., Reducing Surfactant Adsorption on Carbonate Reservoirs, SPE Resenroir Engineering 8(2):117-122 (1993).
Tabatabai, Water Softening Using polyelectrolyte-enhanced ultrafiltration, Separation Science Technology 30(2):211-224 (1995).
Takayama et al., Patterning Cells and Their Environments Using Multiple Laminar Fluid Flows in Capillary NetWO rks, PNAS 96:5545-5548 (1999).
Takeuchi et al., An Axisymmetric Flow-Focusing Microfluidic Device, Adv. Mater 17(8):1067-1072 (2005).
Taly et al., Droplets as Microreactors for High-Throughput Biology, Chembiochem 8(3):263-272 (2007).
Tan et al., Controlled Fission of Droplet Emulsions in Bifurcating Microfluidic Channels, Transducers Boston (2003).
Tan et al., Design of microluidic channel geometries for the control of droplet volume, chemical concentration, and sorting, Lab Chip, 4(4): 292-298 (2004).
Tan et al., Monodispersed microfluidic droplet generation by shear focusing microfluidic device, Sensors and Actuators 114:350-356 (2006).
Tan, Y.C., Microfluidic Liposome Generation from Monodisperse Droplet Emulsion-Towards the Realization of Artificial Cells, Summer Bioengineering Conference, Florida (2003).
Tan, Y.C., Monodisperse Droplet Emulsions in Co-Flow Microfluidic Channels, Micro TAS, Lake Tahoe (2003).
Tanaka et al., Ethanol Production from Starch by a Coimmobilized Mixed Culture System of Aspergillus awamori and Zymomonas mobilis, Biotechnol Bioeng XXVII:1761-1768 (1986).
Tang et al., A multi-color fast-switching microfluidic droplet dye laser, Lab Chip 9:2767-2771 (2009).
Taniguchi et al., Chemical Reactions in Microdroplets by Electrostatic Manipulation of Droplets in Liquid Media, Lab on a Chip 2:19-23 (2002).
Tawfik et al., catELISA: a facile general route to catalytic antibodies, PNAS 90(2):373-7 (1993).
Tawfik et al., Efficient and selective p-nitrophenyl-ester=hydrolyzing antibodies elicited by a p-nitrobenzyl phosphonate hapten, Eur J Biochem, 244:619-26 (1997).
Tawfik et al., Man-made cell-like compartments for molecular evolution, Nature Biotechnology, 7(16):652-56 (1998).
Tawfik, D.S. et al., 1,8-diabycyclo[5.4.0]undecane mediated transesterification of p-nitrophenyl phosphonates—a novel route to phosphono esters, Synthesis-Stuttgart, 10: 968-972 (1993).
Taylor et al., Characterization of chemisorbed monolayers by surface potential measurments, J. Phys. D. Appl. Phys. 24:1443 (1991).
Taylor, The formation of emulsions in definable field of flow, Proc R Soc London A 146(858):501-523 (1934).
Tchagang et al., Early detection of ovarian cancer using group biomarkers, Mol Cancer Ther 7:27-37 (2008).
Tencza et al., Development of a Fluorescence Polarization-Based Diagnostic Assay for Equine Infectious Anemia Virus, J Clinical Microbiol 38(5):1854-185 (2000).
Terray et al., Microfluidic Control Using Colloidal Devices,Science, 296(5574):1841-1844 (2002).
Terray, et al, Fabrication of linear colloidal structures for microfluidic applications, Applied Phys Lett 81(9):1555-1557 (2002).
Tewhey et al., Microdroplet-based PCR amplification for large scale targeted sequencing, Nat Biotechnol 27(11):1025-1031 (2009).
Theberge et al., Microdroplets in Microfluidics: An Evolving Platform for Discoveries in Chemistry and Biology, Angew. Chem. Int Ed 49(34):5846-5868 (2010).
Thompson, L.F., Introduction to Lithography, ACS Symposium Series 219:1-13, (1983).
Thorsen et al., Dynamic pattern formation in a vesicle-generating microfluidic device, Phys Rev Lett 86(18):4163-4166 (2001).
Thorsen et al., Microfluidic Large-Scale Integration, Science 298:580-584 (2002).
Tice et al., Effects of viscosity on droplet formation and mixing in microfluidic channels, Analytica Chimica Acta 507:73-77 (2004).
Tice et al., Formation of droplets and mixing in multiphase microfluidics at low values of the reynolds and the capillary numbers, Langmuir 19:9127-9133 (2003).
Titomanlio et al., Capillary experiments of flow induced crystallization of HOPE, AIChe Journal, 36(1):13-18(1990).
Tleugabulova et al., Evaluating formation and growth mechanisms of silica particles using fluorescence anisotropy decay analysis, Langmuir 20(14):5924-5932 (2004).
Tokatlidis et al., Nascent chains: folding and chaperone intraction during elongation on ribosomes, Philos Trans R Soc Lond B Biol Sci, 348:89-95 (1995).
Tokeshi et al., Continuous-Flow Chemical Processing on a Microchip by Combining Microunit Operations and a Multiphase Flow NetWO rk, Anal Chem 74(7):1565-1571 (2002).
Tokumitsu, H. et al., Preparation of gadopentetic acid-loaded chitosan microparticles for gadolinium neutron-capture therapy of cancer by a novel emulsion-droplet coalescence technique, Chem and Pharm Bull 47(6):838-842 (1999).
Tonelli et al., 2002, Perfluoropolyether functional oligomers: unusual reactivity in organic chemistry, Journal of fluorine Chemistry, 118; 107-121.
Tramontano, A., Catalytic antibodies, Science 234(4783):1566-70 (1986).
Trindade, T., Nanocrystalline semiconductors: synthesis, properties, and perspectives, Chem. Mat. 13:3843-3858 (2001).
Tripet, B. et al., Engineering a de novo-designed coiled-coil heterodimerization domain off the rapid detection, purification and characterization of recombinantly expressed peptides and proteins, Protein Engng., 9:1029-42 (1996).
Tuerk, C. and Gold, L., Systematic Evolution of Ligands by Exponentid Enrichment: RNA Ligands to Bacteriophage T4 DNA Polymerase, Science, 249:505-10 (1990).
Umbanhowar et al., Monodisperse Emulsion Generation via Drop Break Off in a Coflowing Stream, Langmuir 16(2):347-351 (2000).
Unger et al., Monolithic microfabricated valves and pumps by multylayer soft lithography, Science 288(5463):113-116 (2000).
Utada, A. et al., Monodisperse double emulsions generated from a microcapillary device, Science, 308:537-541 (2005).
Vainshtein et al., Peptide rescue of an N-terminal truncation of the stoffel fragment of Taq DNA polymerase, Protein Science, 5:1785-92 (1996).
Van Bockstaele et al., Prognostic markers in chronic lymphocytic leukemia: a comprehensive review, Blood Rev 23(1):25-47 (2009).
Sawada, et al. "Synthesis and surfactant properties of novel fluoroalkylated amphiphilic oligomers," Chem. Commun. pp. 179-180 (1996).

* cited by examiner 3.3.1 P, P-dimorpholino P-(2-phenylethyloxyd)
phosphate (AEH12) head group 3.3.2 P-(2-phenylethyloxyd) phosphoric acid
(AEH14) head group 3.3.3 P-morpholino-P-(PEO)-P-(2-phenylethyloxyd) phosphate (AEH19) head group

FLUOROCARBON EMULSION STABILIZING SURFACTANTS

RELATED APPLICATIONS

This application is a continuation of U.S. application Ser. No. 12/310,048, filed Feb. 9, 2009, which is a 35 U.S.C. §371 National Phase Application of PCT/US2007/017617, filed Aug. 7, 2007, which claims priority to, and the benefit of, U.S. Provisional Patent Application No. 60/836,455, filed Aug. 7, 2006. Each of these applications is incorporated herein by reference in its entirety.

FIELD OF INVENTION

The present invention relates generally to surfactants, and more specifically, to surfactants for stabilizing emulsions having a continuous fluorophilic phase.

BACKGROUND

Many emulsions comprise an aqueous phase and a hydrocarbon oil phase. Fluorocarbon oils are often immiscible with both water and hydrocarbon oils; thus, water or hydrocarbon oils may be dispersed as emulsion droplets in a fluorocarbon phase. The use of fluorocarbon oils as the continuous phase of an emulsion offers advantages over conventional hydrocarbon systems. For example, fluorocarbon oils may be well suited as the continuous phase for emulsions that require reduced diffusion and/or cross-contamination of hydrophilic or lipophilic material between droplets in the emulsion. Stabilizing such emulsions, however, sometimes requires the addition of appropriate surfactants, and these surfactants are often not available or do not have desirable physical characteristics. This is especially true because fluorocarbons are not commonly used as the continuous emulsion phase. Accordingly, new surfactants and surfactant systems for stabilizing droplets of water and hydrocarbon oils or organic solvents in a continuous fluorophilic phase are needed.

SUMMARY OF THE INVENTION

Surfactants for stabilizing emulsions having a continuous fluorophilic phase are presented. In one embodiment, a fluorosurfactant is provided. The fluorosurfactant has one of the general formulas: A-B-A or A-B or (A-B)$_n$ or B-(A)$_n$, or (B)$_n$-A or A-B-A', where A (and A', if present) comprises a fluorophilic component having a molecular weight greater than 1,000 or greater than 1,500 g/mol, the fluorophilic component comprising a (per)fluoropolyether or a different poly(perfluoroalkyl-methacrylates), etc., and B is one or both of: a) non-ionic and soluble in an aqueous phase; or b) a hydrocarbon soluble in a hydrocarbon phase, and n is an integer greater than 0. In other embodiments, the fluorosurfactant may have a formula such as those described herein.

In another embodiment, a macroemulsion is provided. The macroemulsion comprises an aqueous dispersed phase or a lipophilic dispersed phase having an average diameter greater than or equal to about 50 nanometers, a continuous phase comprising a fluorinated solvent or oil, and a fluorinated, non-ionic surfactant, where at least 95% of the dispersed phase does not coalesce for at least 30 minutes at 25 degrees C. and 1 atm.

In one aspect, the invention is directed to an article. In one set of embodiments, the article comprises a fluorosurfactant comprising the formula: A-B-A or A-B or (A-B)$_n$ or B-(A)$_n$ or (B)$_n$-A or A-B-A' or A-X—B or A-X$^1$—B—X$^2$-A or (A-X$^1$—B—X$^2$)$_n$ or B—X-(A)$_n$ or B—(X-A)$_n$ or B-(A-X)$_n$ or B—X$^1$-(A-X$^2$)$_n$, wherein A and A' comprise a fluorophilic component having a molecular weight greater than 1,000 g/mol, the fluorophilic component comprises a fluoropolyether; B is either: a) non-ionic and soluble in an aqueous phase or b) a hydrocarbon soluble in a hydrocarbon phase; X, when present, is either a covalent bond or a linking group, and X$^1$ and X$^2$, where present, may be the same or different; and n is an integer greater than 0.

In another set of embodiments, the fluorosurfactant comprises the formula: A-B-A or A-B or (A-B)$_n$ or B-(A)$_n$ or (B)$_n$-A or A-B-A' or A-X—B or A-X$^1$—B—X$^2$-A or (A-X$^1$—B—X$^2$)$_n$ or B—X-(A)$_n$ or B—(X-A)$_n$ or B-(A-X)$_n$ or B—X$^1$-(A-X$^2$)$_n$, wherein A and A' comprise a component having a molecular weight greater than 1,000 g/mol, the component comprising a fluorophilic portion having fluorinated side chains; B is either: a) non-ionic and soluble in an aqueous phase or b) a hydrocarbon soluble in a hydrocarbon phase; X, when present, is either a covalent bond or a linking group, and X$^1$ and X$^2$, where present, may be the same or different; and n is an integer greater than 0.

In still another set of embodiments, the fluorosurfactant comprises the formula: A-B-A or A-B or (A-B)$_n$ or B-(A)$_n$ or (B)$_n$-A or A-B-A' or A-X—B or A-X$^1$—B—X$^2$-A or (A-X$^1$—B—X$^2$)$_n$ or B—X-(A)$_n$ or B—(X-A)$_n$ or B-(A-X)$_n$ or B—X$^1$-(A-X$^2$)$_n$, wherein A and A' comprise a component having a molecular weight greater than 1,000 g/mol; B is either: a) non-ionic and soluble in an aqueous phase or b) a hydrocarbon soluble in a hydrocarbon phase; X, when present, is either a covalent bond or a linking group, and X$^1$ and X$^2$, where present, may be the same or different; and n is an integer greater than 0.

In yet another set of embodiments, the fluorosurfactant has a backbone comprising the formula: A-B-A or A-B or (A-B)$_n$ or B-(A)$_n$ or (B)$_n$-A or A-B-A' or A-X—B or A-X$^1$—B—X$^2$-A or (A-X$^1$—B—X$^2$)$_n$ or B—X-(A)$_n$ or B—(X-A)$_n$ or B-(A-X)$_n$ or B—X$^1$-(A-X$^2$)$_n$, wherein A and A' comprise a fluorophilic component having a molecular weight greater than 1,000 g/mol, the fluorophilic component comprising a fluoropolyether; B is either: a) non-ionic and soluble in an aqueous phase or b) a hydrocarbon soluble in a hydrocarbon phase; X, when present, is either a covalent bond or a linking group, and X$^1$ and X$^2$, where present, may be the same or different; and n is an integer greater than 0.

In another set of embodiments, the fluorosurfactant having a backbone comprising the formula: A-B-A or A-B or (A-B)$_n$ or B-(A)$_n$ or (B)$_n$-A or A-B-A' or A-X—B or A-X$^1$—B—X$^2$-A or (A-X$^1$—B—X$^2$)$_n$ or B—X-(A)$_n$ or B—(X-A)$_n$ or B-(A-X)$_n$ or B—X$^1$-(A-X$^2$)$_n$, wherein A and A' comprise a fluorophilic component comprising a (per)fluoropolyether; B is either: a) non-ionic and soluble in an aqueous phase or b) a hydrocarbon soluble in a hydrocarbon phase; X, when present, is either a covalent bond or a linking group, and X$^1$ and X$^2$, where present, may be the same or different; and n is an integer greater than 0.

In another aspect, the invention is directed to an emulsion. In one set of embodiments, the emulsion comprises an aqueous, polar, and/or hydrophilic dispersed phase or a lipophilic dispersed phase having an average diameter greater than or equal to about 50 nm; a continuous phase comprising a fluorinated solvent or oil; and a fluorinated, non-ionic surfactant. In some cases, at least 95% of the dispersed phase does not coalesce for at least 30 minutes at 25 degrees C. and 1 atm.

In another set of embodiments, the emulsion comprises an aqueous dispersed phase or a lipophilic dispersed phase having an average diameter greater than or equal to about 50 nm; a continuous phase comprising a fluorinated solvent or oil; and a fluorinated surfactant comprising a morpholino group. The emulsion, in still another set of embodiments, includes an aqueous dispersed phase or a lipophilic dispersed phase having an average diameter greater than or equal to about 50 nm; a continuous phase comprising a fluorinated solvent or oil; and a fluorinated surfactant comprising a phosphate group.

Yet another embodiment is directed to a method. The method, in one some cases, is generally directed to performing a chemical and/or biological reaction it he dispersed phase of any of the embodiments described above, or described herein.

In another aspect, the present invention is directed to a method of making one or more of the embodiments described herein. In another aspect, the present invention is directed to a method of using one or more of the embodiments described herein.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
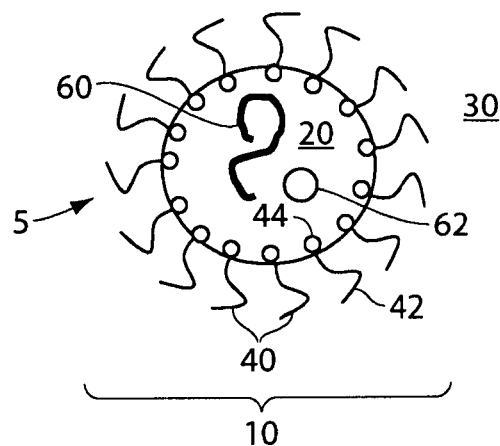
FIG. 1A shows an aqueous droplet containing a non-adsorbed biological and/or chemical species therein, of an aqueous-in-fluorophilic emulsion, according to one embodiment of the invention.

Surfactants (e.g., fluorosurfactants) for stabilizing aqueous or hydrocarbon droplets in a fluorophilic continuous phase are presented (or vice versa). In some embodiments, the fluorosurfactants include a fluorophilic tail soluble in a fluorophilic (e.g., fluorocarbon) continuous phase, and a headgroup soluble in either an aqueous phase or a lipophilic (e.g., hydrocarbon) phase. The headgroup and the tail may be directly linked, or linked via a linking moiety. The combination of a fluorophilic tail and a headgroup may be chosen so as to create a surfactant with a suitable geometry for forming stabilized reverse emulsion droplets having a disperse aqueous or lipophilic phase in a continuous, fluorophilic phase. In some embodiments, the headgroup is non-ionic and can prevent or limit the adsorption of molecules at the interface between the surfactant and the discontinuous phase. This configuration can allow the droplet to serve, for example, as a reaction site for certain chemical and/or biological reactions. In another embodiment, aqueous droplets are stabilized in a fluorocarbon phase at least in part by the electrostatic attraction of two oppositely charged or polar components, one of which is at least partially soluble in the dispersed phase, the other at least partially soluble in the continuous phase. One component may provide colloidal stability of the emulsion, and the other may prevent the adsorption of biomolecules at the interface between a component and the discontinuous phase. Advantageously, surfactants and surfactant combinations of the invention may provide sufficient stabilization against coalescence of droplets in certain embodiments of the invention, without interfering with processes that can be carried out inside the droplets.

An "emulsion," as used herein, is a stable mixture of at least two immiscible liquids. In general, immiscible liquids tend to separate into two distinct phases. An emulsion is thus stabilized by the addition of a "surfactant" which functions to reduce surface tension between the at least two immiscible liquids and/or to stabilize the interface. In some embodiments, emulsion described herein include a discontinuous or disperse phase (i.e., the isolated phase stabilized by a surfactant) formed of an aqueous or lipophilic (e.g., hydrocarbon) substance. The continuous phase may be formed of a fluorophilic substance (e.g., a fluorocarbon). The present invention involves, in some embodiments, water-in-fluorocarbon emulsions and hydrocarbon-in-fluorocarbon emulsions having a disperse aqueous or hydrocarbon phase and a fluorocarbon continuous phase. The isolated disperse aqueous or lipophilic phase in a fluorophilic solvent can form a "reverse emulsion," which is simply one example of an emulsion. In some particular embodiments, the emulsions described herein are macroemulsions. Macroemulsions are emulsions that are kinetically stable, as compared to microemulsions, which are thermodynamically stable and undergo spontaneous formation. In some cases, a microemulsion may include droplets having an average diameter of less than about 50 nm.

As used herein "droplet" means an isolated aqueous or lipophilic phase within a continuous phase having any shape, for example cylindrical, spherical, ellipsoidal, irregular shapes, etc. Generally, in emulsions of the invention, aqueous and/or lipophilic droplets are spherical or substantially spherical in a fluorocarbon, continuous phase.

As used herein, "surfactant" defines a molecule that, when combined with a first component defining a first phase, and a second component defining a second phase, will facilitate assembly of separate first and second phases. In some cases, a surfactant of the invention typically can have one or more main fluorophilic chain(s) where one end of the chain is soluble in the fluorophilic phase of the emulsion and one or more chains that are not soluble in the fluorophilic phase of the emulsion (e.g., those chains may be soluble in the aqueous or lipophilic phase). For instance, a surfactant may be a multi-block surfactant (e.g., ABABABA . . . ), where one component of the chain (e.g., "A") is soluble in the fluorophilic phase and another component of the chain (e.g., "B") is soluble in the other phase (e.g., the aqueous or lipophilic phase). As used herein, a multi-block surfactant is a surfactant having an alternating copolymeric structure or an $(A-B-)_n$ structure, i.e., ABA, ABAB, ABABA, ABABABA, etc.). In some cases, one block may be soluble in the fluorophilic phase of the emulsion and one block may be soluble in the other phase of the emulsion (e.g., the aqueous or lipophilic phase). In still other cases, additional components may be present within the surfactant. For example, a multi-block surfactant may have other groups present within its polymeric structure, for example, linking moieties connecting A and B, e.g., $(A-X-B-)_n$, $(A-B-X)_n$, $(A-X^1-B-X^2)_n$, or the like, where "X" represents a covalent bond or a linking moiety, as described below, and $X^1$ and $X^2$, where present, may be the same or different.

As used herein, a "fluorophilic" component comprises any fluorinated compound such as a linear, branched, cyclic, saturated, or unsaturated fluorinated hydrocarbon. The fluorophilic, component can optionally include at least one heteroatom (e.g., in the backbone of the component). In some cases, the fluorophilic compound may be highly fluorinated, i.e., at least 30%, at least 50%, at least 70%, or at least 90% of the hydrogen atoms of the component are replaced by fluorine atoms. The fluorophilic component may comprise a fluorine to hydrogen ratio of, for example, at least 0.2:1, at least 0.5:1, at least 1:1, at least 2:1, at least 5:1, or at least 10:1. In some such embodiments, at least 30%, at least 50%, at least 70%, or at least 90% but less than 100% of the hydrogen atoms of the component are replaced by fluorine atoms. In other cases, the fluorophilic component is perfluorinated, i.e., the component contains fluorine atoms but contains no hydrogen atoms. Fluorophilic components compatible with the present invention may have low toxicity, low surface tension, and the ability to dissolve and transport gases. Examples of fluorophilic components are described below.

As mentioned, in some embodiments, the emulsions of the invention include discontinuous aqueous and/or lipophilic (e.g., hydrocarbon) droplets in a continuous, fluorophilic phase. This means that separate, isolated regions of droplets of an aqueous and/or lipophilic component are contained within a continuous fluorophilic phase, which may be defined by a fluorocarbon component. The discontinuous aqueous and/or lipophilic droplets in the nonaqueous phase typically have an average cross-sectional dimension of greater than 25 nm. In some embodiments, the average cross-sectional dimension of the droplets is greater than 50 nm, greater than 100 nm, greater than 250 nm, greater than 500 nm, greater than 1 micron, greater than 5 microns, greater than 10 microns, greater than 50 microns, greater than 100 microns, greater than 200 microns, or greater than 500 microns, etc. As used herein, the average cross-sectional dimension of a droplet is the diameter of a perfect sphere having the same volume as the droplet.

Compositions of the invention are, according to some embodiments, stable for at least about 1 minute, at least about 5 minutes, at least about 10 minutes, at least about 20 minutes, at least about 30 minutes, at least about 40 minutes, at least about 1 hour, at least about 2 hours, at least about 6 hours, at least about 12 hours, at least about 1 day, at least about 1 week, at least about 1 month, or at least about 2 months, at a temperature of about 25 degrees Celsius and a pressure of 1 atm. As used herein, a "stable emulsion" means that at least about 95% of the droplets of the emulsion do not coalesce, e.g., to form larger droplets over these periods of time.

As used herein, "nonaqueous" is meant to define material such as a fluid that is immiscible with water. That is, a liquid that when mixed with water will form a stable two-phase mixture. The non-aqueous phase need not be liquid, but can be a solid or semi-solid lipid or other nonpolar substance that is not soluble in water. In some instances, the nonaqueous phase can include a lipophilic component (e.g., a hydrocarbon) or a fluorinated component (e.g., a fluorocarbon). The aqueous phase can be any liquid miscible with water; that is, any liquid that, when admixed with water, can form a room-temperature, single-phase solution that is stable. In some cases, the aqueous phase can comprise one or more physiologically acceptable reagents and/or solvents, etc. Non-limiting examples of aqueous phase materials include (besides water itself) methanol, ethanol, DMF (dimethylformamide), or DMSO (dimethyl sulfoxide).

Referring now to FIG. 1A, as a non-limiting illustration, an aqueous-in-fluorophilic (aqueous-in-fluorocarbon) emulsion 5 is shown. The emulsion includes a droplet 10 comprising an aqueous discontinuous phase 20, a fluorophilic (e.g., fluorocarbon) continuous phase 30, and surfactant molecules 40 at the interface. The surfactant molecules include tail 42 and headgroup 44. Typically, the tail is a fluorophilic chain soluble in the fluorophilic phase of the emulsion and the headgroup is soluble in the discontinuous phase. In this particular non-limiting embodiment, the headgroup is a hydrophilic component soluble in the aqueous discontinuous phase. The headgroup may be non-ionic in certain embodiments. In other embodiments involving hydrocarbon-in-fluorocarbon emulsions, the headgroup is a lipophilic component soluble in a lipophilic (e.g., hydrocarbon) discontinuous phase.

Figure 1B:
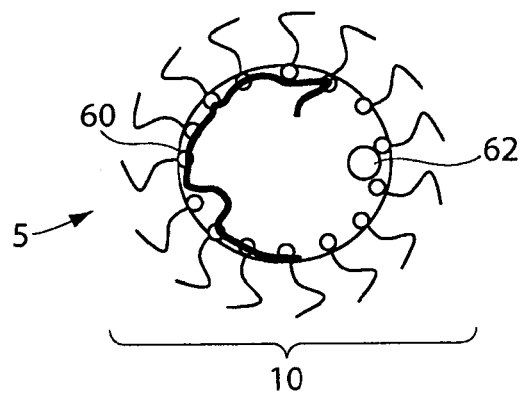
FIG. 1B shows an aqueous droplet containing an adsorbed biological and/or chemical species therein, of an aqueous-in-fluorophilic emulsion, according to one embodiment of the invention.

Also shown in the embodiment illustrated in FIG. 1A are components 60 and 62, such as proteins, DNA, and/or cells, which may be contained within the droplet. In some cases, components 60 and 62 are distinguishable. The components may be, for example, reagents, analytes, reactants, etc. to be tested, assayed, and/or reacted within the droplet. In embodiments in which headgroups 44 of the surfactants are non-ionic, adsorption of the components onto the interface between the surfactant and the discontinuous phase may be limited or prevented in some, but not all, cases. Advantageously, this passivation of the interface may allow the components to be investigated as if they were floating in a bulk medium in certain embodiments of the invention, as described in more detail below. In contrast, FIG. 1B shows components 60 and 62 adsorbed onto the interface between the surfactant and the discontinuous phase of the droplet, according to another embodiment of the invention. This adsorption may occur, in some cases, when the headgroup is ionic and/or includes a chemical moiety that preferentially binds and/or adsorbs the components.

Figure 2A:
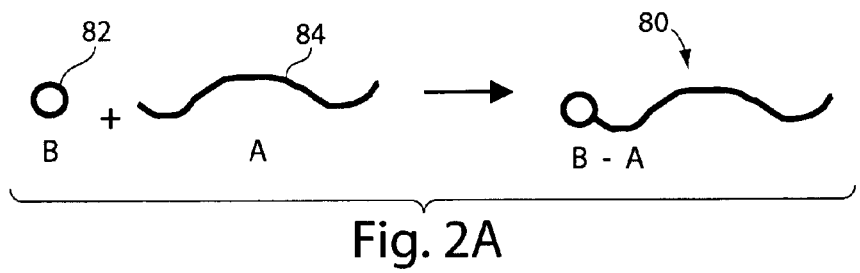
FIG. 2A shows the combination of a headgroup and a fluorophilic tail to form a diblock surfactant according to one embodiment of the invention.
Figure 2B:
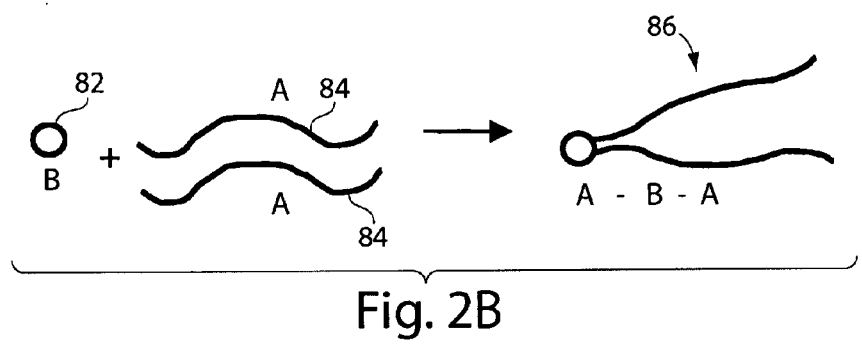
FIG. 2B shows the combination of a headgroup and two fluorophilic tails to form triblock surfactant according to one embodiment of the invention.
Figure 2C:
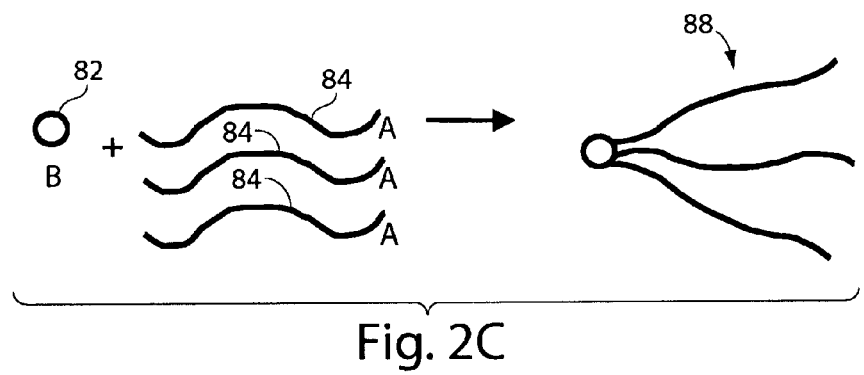
FIG. 2C shows the combination of a headgroup with three fluorophilic tails to form a multi-block surfactant according to one embodiment of the invention.

FIGS. 2A-2C show various non-limiting embodiments of fluorosurfactants of the invention. As shown in the illustrative embodiment of FIG. 2A, fluorosurfactant 80 includes headgroup 82 and fluorophilic component 84. As used herein, a fluorophilic component such as component 84 is referred to as an "A"-block and a non-fluorophilic component of a surfactant, e.g., headgroup 82, is referred to as a "B"-block. The combination of a headgroup with a single fluorophilic component forms an "A-B" structure. The A-B structure is referred to as a diblock structure. In some embodiments of the invention, fluorosurfactants include a multi-block structure, for example, as shown in FIGS. 2B and 2C. FIG. 2B shows the combination of a headgroup with two fluorophilic components to form a triblock A-B-A structure 86. Structures such as A-B-A', where A and A' comprise different fluorophilic components, are also possible. Additional fluorophilic components may be combined with a headgroup to form other multi-block structures, e.g., as shown in FIG. 2C. In some such embodiments, headgroup 82 may be a hydrophilic component that is soluble in an aqueous phase. For example, in some particular embodiments, headgroup 82 may be a non-ionic hydrophilic component, such as a polyether. In other instances, headgroup 82 may be a lipophilic component soluble in a lipophilic (e.g., hydrocarbon) phase. Such an embodiment would be useful for forming hydrocarbon-in-fluorocarbon type emulsions. In addition, in some cases, other types of blocks (e.g., having other physical and/or chemical properties) may be included in the multi-block structure, and/or the blocks themselves may each independently have the same or different numbers of repeat units or monomers. For instance, in certain cases, a fluorosurfactant of the invention may comprise random copolymers, terpolymers, and the like.

Figure 2D:
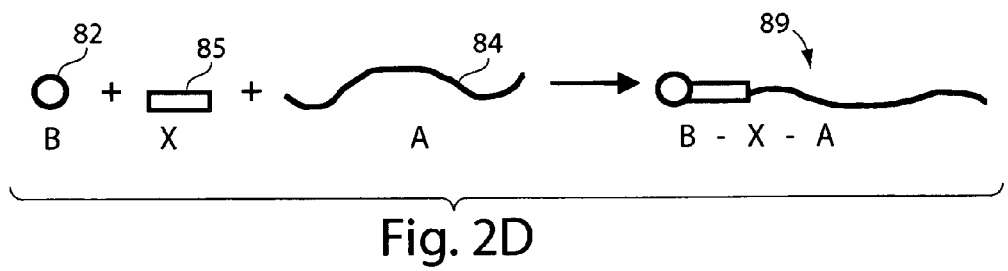
FIGS. 2D-2G show various fluorosurfactants including linking moities according to embodiments of the invention.
Figure 2E:
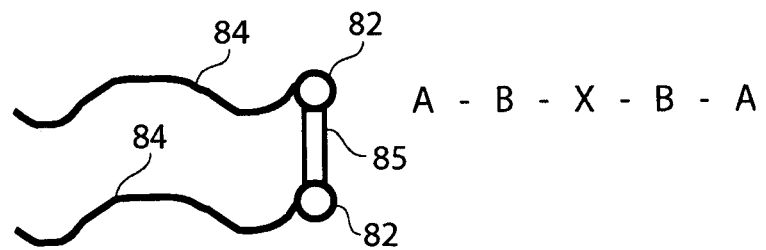
Figure 2F:
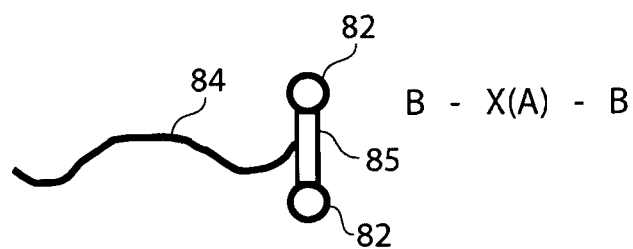
Figure 2G:
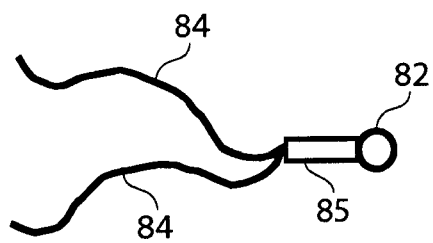
Figure 3A:
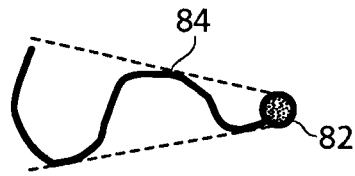
FIGS. 3A-3D show various non-limiting illustrative geometries of surfactants according to one embodiment of the invention.
Figure 3B:
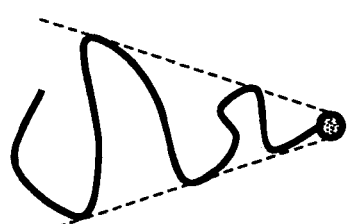
Figure 3C:
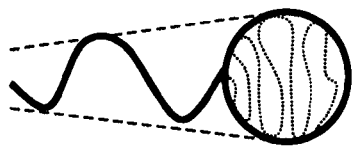
Figure 3D:
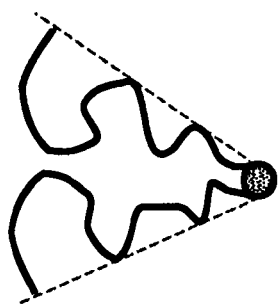
Figure 3E:
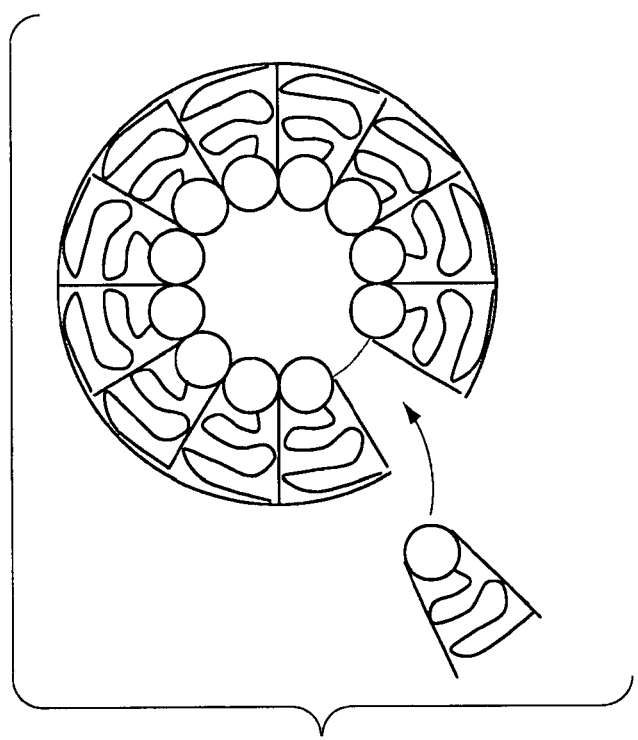
FIG. 3E shows a non-limiting example of packing geometry of surfactants to form a droplet of an emulsion according to one embodiment of the invention.

In another embodiment, a fluorosurfactant of the invention includes a linking moiety (which can be referred to as "X"), which may be hydrophilic or hydrophobic, etc. As shown in FIG. 2D, a moiety 85 may be positioned between the A and B components, e.g., between headgroup 82 and fluorophilic component 84, to produce fluorosurfactant 89. In other embodiments, a linking moiety 85 may be positioned between two headgroups, as illustrated in FIG. 2E. FIG. 2F shows a linking moiety 85 attached to two headgroups and a fluorophilic component, and FIG. 2G shows a linking moiety attached to two fluorophilic components and a headgroups. Of course, other configurations are also possible. Linking moieties are described in more detail below.

One aspect of the invention involves the formation of stabilized emulsions using fluorosurfactants including those described herein. Surprisingly, in order to obtain long-term stabilized emulsions, certain geometries of the fluorosurfactants are needed in some cases. For instance, certain ratios of molecular weights of the fluorophilic component to the headgroup component may be required for steric stabilization of the droplets. In addition, fluorophilic components having large molecular weights can contribute to long term colloidal stabilization, according to certain embodiments. These and other considerations for choosing appropriate components of fluorosurfactants and suitable mixtures of fluorsurfactants may be suitable for forming certain emulsions, for instance, emulsions comprising droplets having an average diameter in the micron or micrometer range. These and other criteria are described in more detail below.

FIGS. 3A-3E show various non-limiting geometries and packing of fluorosurfactants described herein useful for forming certain emulsions having a fluorophilic continuous phase. As illustrated in these embodiments, fluorophilic components having different chemical compositions, molecular weights, and/or lengths can contribute to the overall packing geometry of the surfactants (e.g., in the respective fluorocarbon oil), and, therefore, to the stability of the droplets in the macroemulsion.

The fluorophilic component of surfactant molecules described herein typically comprise a fluorophilic chain at least $C_8$ in length (i.e., contains at least 8 carbon atoms). In some embodiments, the fluorophilic chain is at least $C_{10}$ in length, at least $C_{15}$ in length, at least $C_{20}$ in length, at least $C_{25}$ in length, or at least $C_{30}$ in length. In other embodiments, the fluorophilic chain is at least $C_{50}$ in length, at least $C_{75}$ in length, at least $C_{100}$ length, or greater. As a non-limiting example, a fluorophilic component having the structure —$(C_3F_6O)_{10}$— has 30 carbons equivalent to a $C_{30}$ chain. The fluorophilic component may be linear, branched, cyclic, saturated, unsaturated, etc.

In some embodiments, the fluorophilic component of a fluorosurfactant includes a heteroatom (e.g., a non-carbon such as oxygen (e.g., divalent oxygen), sulfur (e.g., divalent or hexavalent sulfur), nitrogen (e.g., trivalent nitrogen), etc.) in the structure of the component. Such heteroatoms may be bonded, for example, to carbon atoms in the skeletal structure of the component. Additionally and/or alternatively, the fluorophilic component may include one or more branches extending from the main chain of the structure.

In some embodiments, the fluorophilic component of a surfactant is a fluorinated oligomer or polymer (i.e., a fluoropolymer). The fluoropolymer may include a (per)fluoropolyether chain, among other fluorinated polymers that are soluble in a fluorocarbon oil. The (per)fluoropolyether chain may comprise repeating units including, but not limited to, $-(C_nF_{2n}O)_x-$, where n is an integer, for example, $-(C_3F_6O)_x-$, $-(C_4F_8O)_x-$, $-(C_5F_{10}O)_x-$; $-(CF(CF_3)CF_2O)_n-$; $-(CF_2CF_2O)_x-$; $-(CF(CF_3)CF_2O)_x-CF(CF_3)CONH-$; $-(CF_2(CF_2)_zCF_2O)_x-$, where z' is an integer; $-(CFLO)_x-$, where L=—F or —CF$_3$; and $-(CH_2CF_2CF_2O)_x-$. In some cases, $(C_nF_{2n+1}O)_x-$, where n is an integer (for example, $-(CF_3O)_x-$, $-(C_2F_5O)_x-$, $-(C_3F_7O)_x-$, etc.), is used as a terminal group and may not be polymerizable. In some cases, the (per)fluoropolyether chain may have the structure $(C_nF_mO)_x-$, where n and m are integers properly chosen to form a valid structure. In some embodiments, the fluoropolymer comprises poly((per)fluoromethylene oxide), poly((per)fluoroethylene oxide), poly((per)fluoropropylene oxide), and/or poly((per)fluorobutylene oxide). In one particular embodiment, the fluorophilic chain includes poly((per)fluoropropylene oxide). In another embodiment, the fluorophilic chain includes a poly((per)fluoroalkyl-methacrylate). Typically, x in the structures above is greater than or equal to 8. For example, x may be greater than or equal to 10, greater than or equal to 14, greater than or equal to 16, greater than or equal to 20, x greater than or equal to 30, greater than or equal to 40, or greater than or equal to 50.

Non-limiting examples of other types of fluorpolymers or oligomers that can be included in the fluorophilic chain, and/or as side chains, include vinylidene fluoride (VDF), (per)fluoroolefins (e.g., tetrafluoroethylene (TFE)), chlorotrifluoroethylene (CTFE), (per)fluoroalkylvinylethers (PAVE), e.g., $CF_2=CFOR_f$, where $R_f$ is a (per)fluoroether or a $C_n$ (per)fluoroalkyl such as trifluoromethyl or pentafluoropropyl, where n is an integer; and perfluoro-oxyalkylvinylethers $CF_2=CFOR_x$, where x is a $C_1$-$C_{12}$ perfluorooxyalkyl having one or more ether groups, for example, perfluoro-2-propoxy-propyl. Other examples of monomers present within the fluorophilic component include fluorinated acrylates and fluorinated methacrylates. In some cases, the fluorophilic component may be a component where at least about 10% or at least about 20% of the atoms defining the component are fluorine atoms.

A fluorophilic component of a surfactant may have any suitable mixture of hydrogen and fluorine atoms so long as the fluorophilic component is sufficiently soluble in a suitable fluorophilic continuous phase. The solubility of a component in a fluorophilic continuous phase can be readily determined by those of ordinary skill in the art using no more than routine experimentation. For instance, a fluorophilic component may comprise monomer units such as $-(C_3F_5HO)_x-(C_3F_4H_{6-m}O)_x-$, $-(C_3F_4H_2O)_x-$, etc. In some embodiments, the fluorophilic component has a ratio of fluorine to hydrogen atoms of greater than 1:1, greater than or equal to 3:1, greater than or equal to 5:1, greater than or equal to 6:1, greater than or equal to 9:1, greater than or equal to 10:1, greater than or equal to 12:1, greater than or equal to 15:1, or greater than or equal to 20:1. In certain embodiments, the fluorophilic component is perfluorinated.

In some embodiments, the fluorophilic component of a surfactant includes one or more fluoropolymers, where the number of monomer units forming the fluoropolymer is greater than or equal to 8. For example, the polymer (or oligomer) may have greater than or equal to 5 monomers, greater than or equal to 10 monomers, greater than or equal to 14 monomers, greater than or equal to 16 monomers, greater than or equal to 20 monomers, greater than or equal to 30 monomers, greater than or equal to 40 monomers, or greater than or equal to 50 monomers, etc.

The fluorophilic component may have a molecular weight greater than or equal to 1,000 g/mol, greater than or equal to 1,200 g/mol, greater than or equal to 1,500 g/mol, greater than or equal to 1,700 g/mol, greater than or equal to 1,900 g/mol, greater than or equal to 2,000 g/mol, greater than or equal to 2,200 g/mol, greater than or equal to 2,500 g/mol, greater than or equal to 2,700 g/mol, greater than or equal to 3,000 g/mol, greater than or equal to 3,200 g/mol, greater than or equal to 3,500 g/mol, greater than or equal to 3,700 g/mol, greater than or equal to 4,000 g/mol, greater than or equal to 4,200 g/mol, greater than or equal to 4,500 g/mol, greater than or equal to 4,700 g/mol, greater than or equal to 5,000 g/mol, greater than or equal to 5,200 g/mol, greater than or equal to 5,500 g/mol, greater than or equal to 5,700 g/mol, greater than or equal to 6,000 g/mol, greater than or equal to 6,200 g/mol, greater than or equal to 6,500 g/mol, greater than or equal to 6,700 g/mol, greater than or equal to 7,000 g/mol, greater than or equal to 7,200 g/mol, greater than or equal to 7,500 g/mol, greater than or equal to 7,700 g/mol, greater than or equal to 8,000 g/mol, greater than or equal to 8,200 g/mol, greater than or equal to 8,500 g/mol, greater than or equal to 8,700 g/mol, greater than or equal to 9,000 g/mol, greater than or equal to 9,200 g/mol, greater than or equal to 9,500 g/mol, greater than or equal to 9,700 g/mol, or greater than or equal to 10,000 g/mol.

The surfactants described herein may have a hydrophilic headgroup in some cases. In some embodiments, the hydrophilic component of a surfactant is a polymer (or oligomer). The polymer may include, for example, a polyether. The polyether chain may comprise repeating units including, but not limited to, $-(C_nH_{2n}O)_x-$, where n is an integer, for example, $-(C_3H_6O)_x-$, $-(C_4H_8O)_x-$, $-(C_5H_{10}O)_x-$; $-(C_2H_4O)_x-(C_3H_6O)_x-$, $-(C_4H_8O)_x-$, $-(C_5H_{10}O)_x-$ $(CH(CH_3)CH_2O)_x-$; $-(CH_2CH_2O)_x-$; $-(CH(CH_3)CH_2O)_x-CH(CH_3)CONH-$; $-(CH_2(CH_2)_zCH_2O)_x-$, where z' is an integer; $-(CHLO)_x-$, where L=—H or —CH$_3$; or $-(CH_2CH_2CH_2O)_x-$. The polyether chain may include, in some cases, terminal groups such as $(C_nH_{2n+1}O)_x-$, where n is an integer, for example, $(CH_3O)_x-$, $(C_2H_5O)_x-$, $(C_3H_7O)_x-$, etc. In some embodiments, the hydrophilic component comprises polymethylene oxide, polyethylene oxide, polybutylene oxide, and/or poly-THF, and/or various polymers thereof. A non-limiting example is a JEFFAMINE® amine. In one particular embodiment, the fluorophilic chain includes polyethylene glycol. Typically, x in the hydrophilic structures above is greater than or equal to 1. For example, x may be greater than or equal to 5, greater than or equal to 10, greater than or equal to 14, greater than or equal to 16, greater than or equal to 20, greater than or equal to 30, greater than or equal to 40, or greater than or equal to 50. In other embodiments, a headgroup can include a sugar (e.g., glucose, glucosamine, and sorbitol). Other polar headgroups known to those of ordinary skill in the art are also included within the scope of the present invention.

In one set of embodiments, a headgroup of a fluorosurfactant is connected to a linking moiety. In some cases, the linking moiety is a relatively small entity. The linking entity may comprise, for example, a morpholino group (e.g., dimorpholino and monomoropholino groups). The linking entity also may comprises a phosphate group in some instances. In certain embodiments, the linking entity comprises both a morpholino group and a phosphate group (e.g., a dimoporpholino phosphate).

In some embodiments, a linking moiety (e.g., positioned between A and B components of a fluorosurfactant) may be chosen to assist the self assembly and the packing of the fluorosurfactant at the interface. Additionally, a linking moiety may have a good impact on the CMC (critical micelle concentration), and therefore on the diffusion to a newly formed interface from the fluorophilic phase, which may be important for emulsification.

In one set of embodiments, the headgroups of the surfactants may be chosen to render the surfactant soluble in water and/or relatively biologically inert. As mentioned, headgroups such as dimorpholino phosphate (DMP) and polyethylene glycol (PEG) are examples of potentially suitable headgroups. A non-limiting example of a tail of a surfactant is Krytox FS(H) (manufactured by DuPont), a carboxylic acid-terminated perfluoropolyether. This tail may have stability in fluorocarbon oils, its length (which can provide steric repulsion between the surfactant molecules), and the fact that it possesses a terminal group that is suitable for the grafting of different headgroups.

Specific examples of potentially suitable headgroups include, but are not limited to:

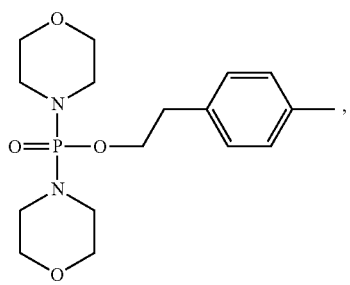

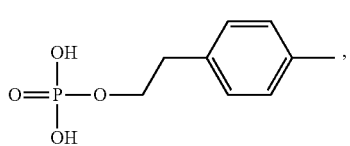

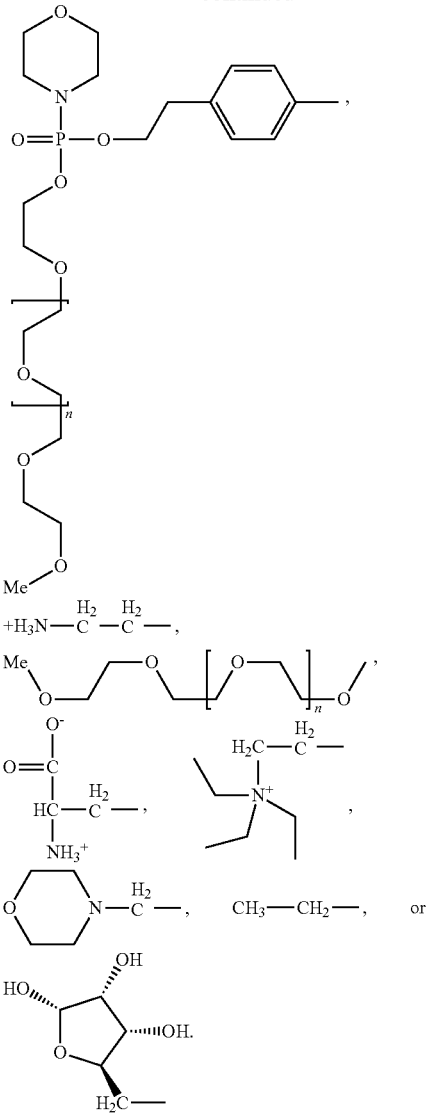

Specific examples of potentially suitable tails include, but are not limited to:

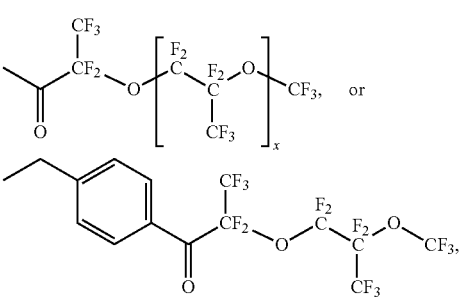

where x is any positive integer, for example, 1, 2, 3, 4, 5, 6, 7, 8, 9, 10, etc.

In some cases, a surfactant of the instant invention may also include a linking moiety. Non-limiting examples of linking moieties include carbonyls (—C(O)—) and phosphates ($PO_4$). In some cases, the linking moiety may connect more than one headgroup and/or more than one tail. For instance, a phosphate linking moiety may connect two headgroups (which each may the same or different), two tails (which each may the same or different) and a headgroup, etc.

Thus, in one set of embodiments, a surfactant of the present invention may include a headgroup (or more than one headgroup), a tail (or more than one tail), and optionally, a linking moiety (or more than one moiety), including the headgroups, tails, and linking moieties described above. Specific, non-limiting examples of some of the surfactants of the invention, comprising a head group, a tail, and optionally a linking moiety, follow:

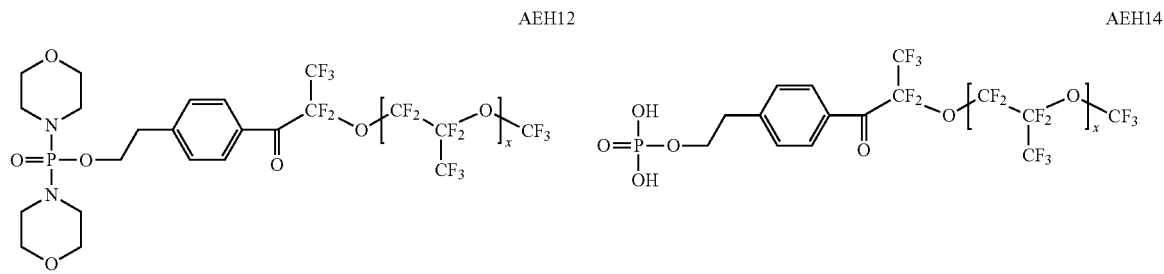

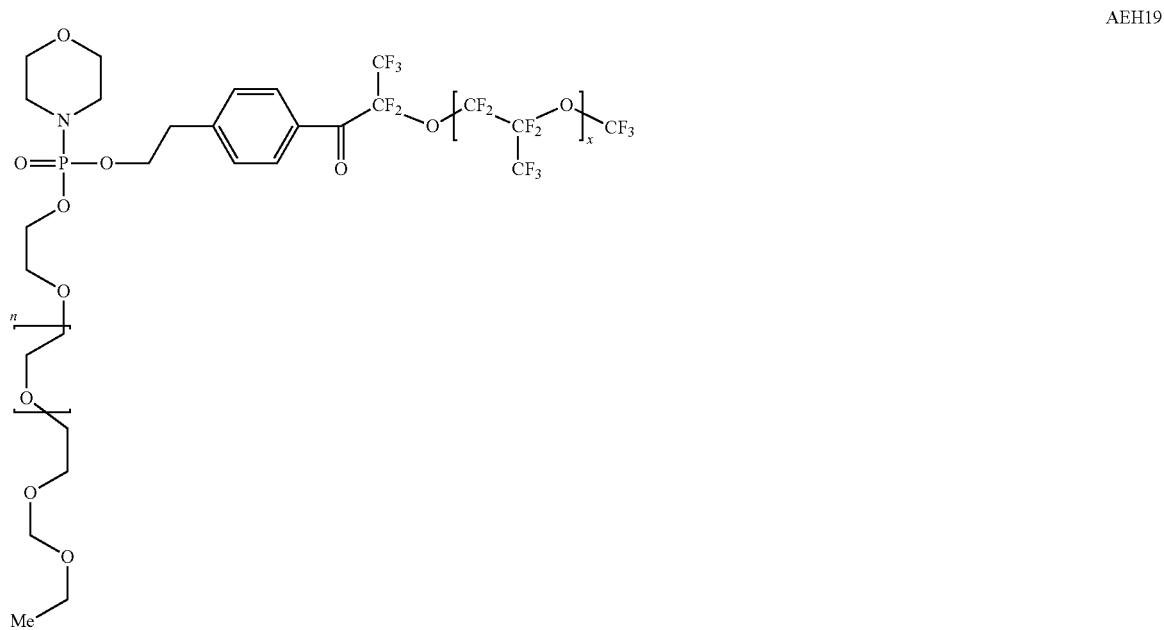

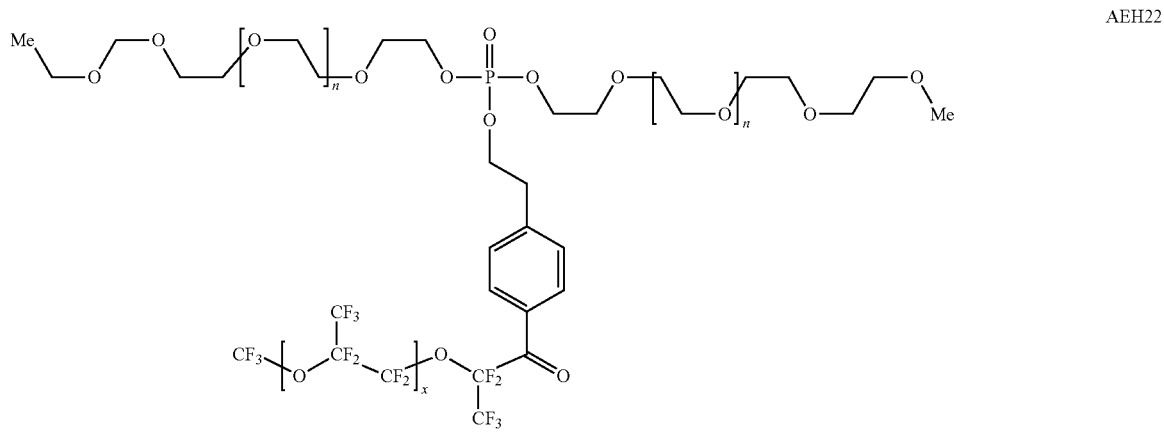

-continued
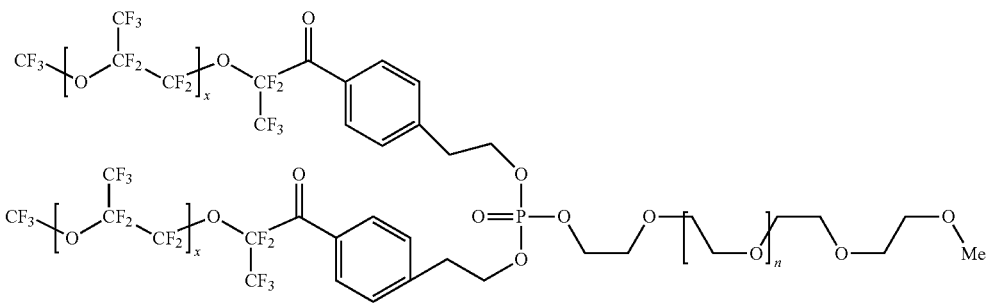
AEH23
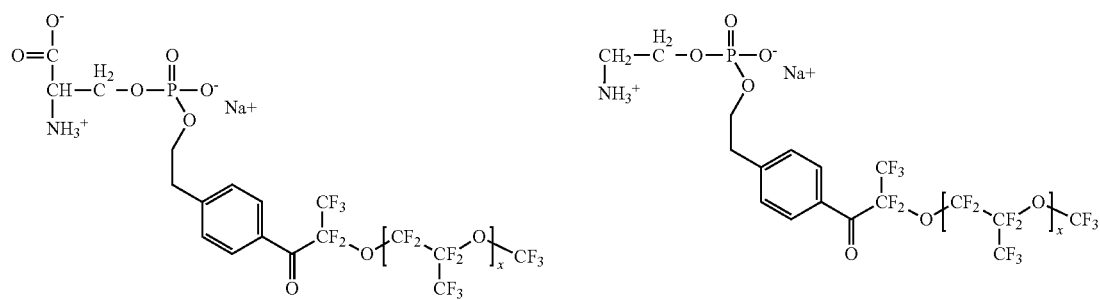
AEH100
AEH101
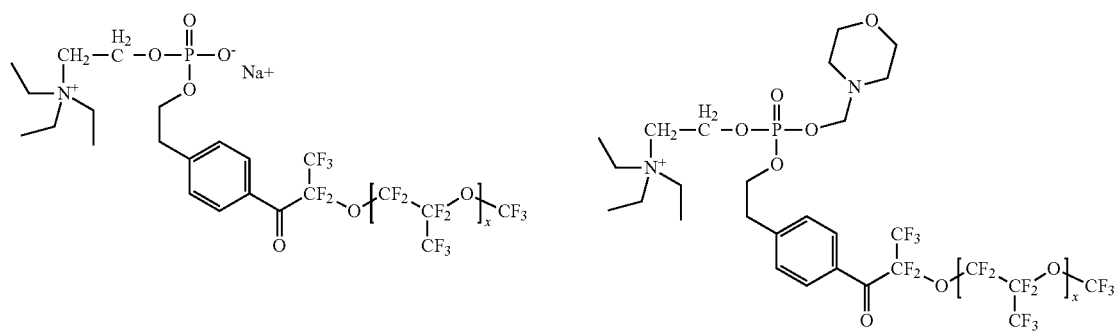
AEH102
AEH103
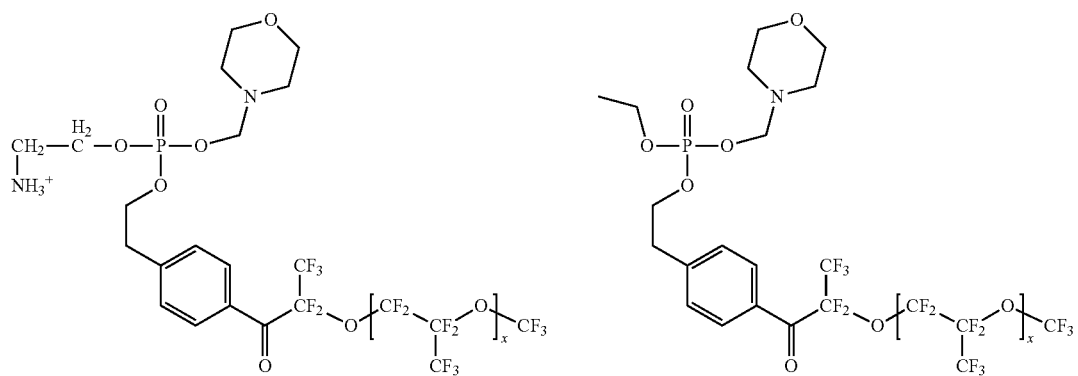
AEH104
AEH105

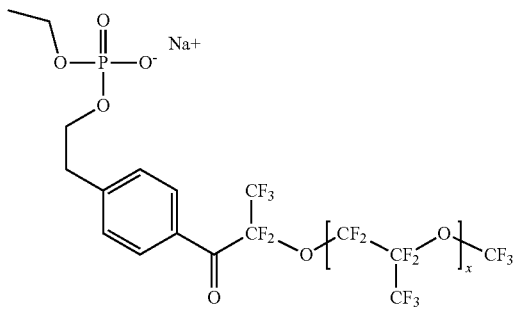

AEH106

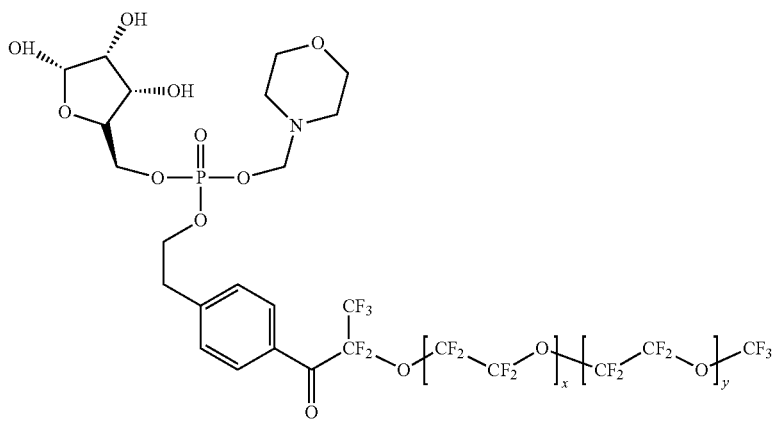

AEH107

The hydrophilic component of a surfactant of the present invention may have any molecular weight suitable for forming a water-in-fluorocarbon type emulsion. For instance, the molecular weight of the hydrophilic component may be greater than or equal to 100 g/mol, greater than or equal to 200 g/mol, greater than or equal to 300 g/mol, greater than or equal to 500 g/mol, greater than or equal to 800 g/mol, greater than or equal to 1,000 g/mol, greater than or equal to 1,500 g/mol, or greater than or equal to 2,000 g/mol, etc.

In some applications involving oil-in-fluorocarbon type emulsions and/or lipophilic solvent applications, a surfactant having a headgroup comprising a lipophilic component may be desired. The lipophilic component may include, for example, an alkyl block, $-(CH_2)_x-$. In some embodiments, x is less than or equal to 20, less than or equal to 18, less than or equal to 16, less than or equal to 14, less than or equal to 12, less than or equal to 10, less than or equal to 8, less than or equal to 6, less than or equal to 4, or less than or equal to 2. Other alkyl-containing and/or aromatic-containing components are known in the art and may be used in surfactants described herein.

Various fluorophilic components can be used as the fluorophilic continuous phase in emulsions described herein. In some cases, the fluorophilic component of the continuous phase and the fluorophilic components of the surfactant is the same. In other cases, however, they can be different. In addition to other structures described herein, the following are non-limiting examples of fluorophilic components that can be used in either a surfactant and/or a continuous phase: perfluorodecalin, perfluoromethyldecalin, perfluoroindane, perfluorotrimethyl bicyclo[3.3.1]nonane, perfluoromethyl adamantane, perfluoro-2,2,4,4-tetra-methylpentane; 9-12C perfluoro amines, e.g., perfluorotripropyl amine, perfluorotributyl amine, perfluoro-1-azatricyclic amines; bromofluorocarbon compounds, e.g., perfluorooctyl bromide and perfluorooctyl dibromide; F-4-methyl octahydroquinolidizine and perfluoro ethers, including chlorinated polyfluorocyclic ethers, perfluoro-4-methylmorpholine, perfluorotriethylamine, perfluoro-2-ethyltetrahydrofuran, perfluoro-2-butyltetrahydrofuran, perfluoropentane, perfluoro(2-methylpentane), perfluorohexane, perfluoro-4-isopropylmorpholine, perfluorodibutyl ether, perfluoroheptane, perfluorooctane, perfluorotripropylamine, perfluorononane, perfluorotributylamine, perfluorodihexyl ether, perfluoro[2-(diethylamino)ethyl-2-(N-morpholino)ethyl]ether, n-perfluorotetradecahydrophenanthrene, and mixtures thereof. In some instances, the fluorophilic component can be straight-chained, branched, cyclic, etc., and/or have a combination of such structures. Specific non-limiting examples include fluoroinert PFPEs (perfluoropolyethers), such as KRYTOX®, by DuPont or perfluoropolyethers and other fluoropolymers from Solvay Solexis.

In one particular embodiment, the choice of solvent and/or fluorophilic component may include approximately matching the average chain length of the fluorophilic portion of the surfactant with the average chain length of the continuous-phase component of the mixture.

In some embodiments, surfactants have a structure such as A-B, A-B-A, or (A-B—)$_n$ (i.e., A-B-A-B-A-B-A . . . ) or B-(A)$_n$, or A-B-A', or another multi-block configuration, where A (and A', if present) comprises a fluorophilic component and B is the hydrophilic or lipophilic component. In some cases, the surfactant may include a linking moiety, such as A-X—B, A-X—B-A, A-X—B-A', A-X$^1$—B—X$^2$-A, A-X$^1$—B—X$^2$-A', B—X-(A)$_n$-, B-(A-X)$_n$—, B—(X-A)$_n$, B—(X-A)$_n$, B-(A-X)$_n$, B—X$^1$-(A-X$^2$)$_n$, (A-X—B)$_n$, (A-B—X)$_n$, (A-X$^1$—B—X$^2$)$_n$, or the like, where "X" represents a covalent bond or a linking moiety, and X$^1$ and X$^2$, where present, may be the same or different.

Some such structures may have a ratio of the molecular weights of the A:B portions of greater than or equal to 1:1, greater than or equal to 3:1, greater than or equal to 6:1, greater than or equal to 9:1, greater than or equal to 10:1, greater than or equal to 12:1, greater than or equal to 15:1, greater than or equal to 20:1; greater than or equal to 25:1, greater than or equal to 30:1, greater than or equal to 40:1, or greater than or equal to 50:1, etc. Additionally or alternatively, the structures may have a ratio of the molecular weights of the X:B portions of greater than or equal to 1:1, greater than or equal to 3:1, greater than or equal to 6:1, greater than or equal to 9:1, greater than or equal to 10:1, greater than or equal to 12:1, greater than or equal to 15:1, greater than or equal to 20:1; greater than or equal to 25:1, greater than or equal to 30:1, greater than or equal to 40:1, or greater than or equal to 50:1, etc.

As described herein, the performance of a surfactant may also depend on the absolute block length and on the geometry of the surfactant, which may be tuned by changing the block length ratio in some cases. For example, surfactants having a structure such as A-B, A-B-A, or (A-B—)$_n$ (i.e., A-B-A-B-A-B-A . . . ), B-(A)$_n$, A-B-A', A-X—B, A-X—B-A, A-X—B-A', A-X$^1$—B—X$^2$-A, A-X$^1$—B—X$^2$-A', B—X-(A)$_n$-, B-(A-X)$_n$—, (A-X—B—)$_n$, (A-B—X)$_n$, (A-X$^1$—B—X$^2$)$_n$, etc., or another multi-block configuration, where A (and A', if present) comprises a fluorophilic component and B is the hydrophilic or lipophilic component, may have a ratio of the lengths of the A:B portions of greater than or equal to 1:1, greater than or equal to 3:1, greater than or equal to 6:1, greater than or equal to 9:1, greater than or equal to 10:1, greater than or equal to 12:1, greater than or equal to 15:1, greater than or equal to 20:1; greater than or equal to 25:1, greater than or equal to 30:1, greater than or equal to 40:1, or greater than or equal to 50:1, etc. In these structures, "X" represents a covalent bond or a linking moiety, and X$^1$ and X$^2$, where present, may be the same or different. Additionally or alternatively, these structures may have a ratio of the lengths of the X:B portions of greater than or equal to 1:1, greater than or equal to 3:1, greater than or equal to 6:1, greater than or equal to 9:1, greater than or equal to 10:1, greater than or equal to 12:1, greater than or equal to 15:1, greater than or equal to 20:1; greater than or equal to 25:1, greater than or equal to 30:1, greater than or equal to 40:1, or greater than or equal to 50:1, etc.

In some embodiments, the fluorosurfactants described herein are characterized by a certain overall chain length of, for example, less than 100 monomers, less than 80 monomers, less than 60 monomers, less than 40 monomers, or less than 20 monomers. Additionally or alternatively, the fluorosurfactants may have an overall chain length of, for example, greater than 5 monomers, greater than 7 monomers, greater than 10 monomers, greater than 30 monomers, greater than 50 monomers, greater than 70 monomers, or greater than 90 monomers. In other embodiments, fluorosurfactants of the invention include only a few monomers, or one monomer such as a macromonomer.

The capability to tune the compositions, lengths, molecular weights, and/or the geometry of the surfactants as described herein (which may be synthesized by forming a covalent bond between the fluorophilic and hydrophilic/lipophilic components and/or by graft polymerization, for example) allows for the tailored stabilization of droplets according to certain embodiments of the present invention. In some embodiments, higher ratios of fluorophilic component to hydrophilic (or lipophilic) component may be appropriate for the stabilization of very small aqueous droplets. Lower ratios may be useful for stabilizing fluorocarbon-in-water emulsions, for example. Also, the stabilization of double- and multiple emulsions is possible, in certain cases.

Increasing the size and/or length of the fluorophilic component can, in some embodiments, increase steric repulsion and/or improve long term stability of the emulsions. In some cases, if surfactant molecules of relatively high molecular weight and/or with relatively large headgroups are used, the adsorption of the surfactant to the interfaces can be slowed down in some cases, which may be advantageous for droplet formation, for instance, if hydrodynamic flow focusing techniques are used. Larger surfactants of suitable geometry may include larger chemical moieties, such as poly(ethylene glycol), which can allow for an even more efficient shielding of the interfaces against the adsorption of biological material.

Figure 4:
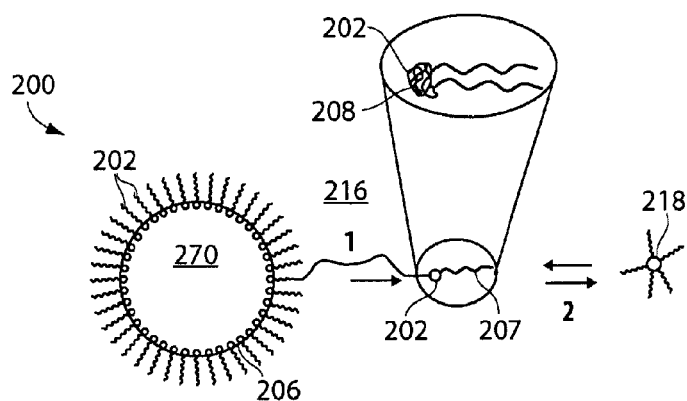
FIG. 4 shows a schematic diagram illustrating adsorption and desorption of fluorosurfactants during emulsification according to one embodiment of the invention.

For instance, without wishing to be bound by theory, the inventors believe that stabilization of droplets in a fluorophilic continuous phase involves the factors and criteria described below and herein. As shown in the diagram illustrated in FIG. 4, surfactant molecules 202 can adsorb to a newly formed droplet interface 206 during emulsification. Desorption of free surfactant molecules 207 can leave bare patches at the interface. The anchoring strength (i.e., a measure of the thermodynamic equilibrium of adsorption and desorption) of the surfactant is determined by the equilibrium between surfactant adsorption and desorption. The anchoring strength is greater (e.g., shifted to the adsorbed state) if the headgroup portion (in some cases, the polar portion) of the surfactant (e.g., portion 208 of surfactant 202) is soluble in the droplet phase (e.g., discontinuous phase 210). The solubility of a surfactant in the continuous, fluorophilic phase 216 can be determined, for instance, by the critical micelle concentration (CMC), above which surfactant molecules will aggregate to form micelles 218. For micellar surfactant molecules, the kinetics of interfacial adsorption can be slowed down significantly in some cases, as the dissolved surfactant molecules are free to diffuse to a droplet interface. Accordingly, the dynamics of droplet stabilization during emulsification may be important. The dynamics rely, for example, on surfactant diffusion to a newly formed interface. Diffusion is influenced by various factors, including the overall molecular weight of the surfactant and the CMC. Generally, all other factors being equal, smaller molecules typically will diffuse faster; furthermore, the shorter the headgroup portion of the surfactant, the higher the CMC and the better the diffusion.

Accordingly, in designing a suitable fluorosurfactant (e.g., a block-copolymer fluorosurfactant) for stabilizing droplets in a continuous fluorophilic phase, a suitable fluorophilic portion of a surfactant can be chosen such that sufficient steric stabilization of the emulsion is provided. Stabilization relies, at least in part, on the solubility of the outer-facing portion of the surfactant (i.e., the portion facing the continuous phase) in the fluorophilic continuous phase and on a sufficient thickness of the stabilizing layer. Long-term droplet stabilization may be achieved by droplets that include a thick steric stabilizing layer, e.g., a thick fluorophilic layer. The stabilizing layer may have a thickness of, for example, at least 10 Angstroms in some embodiments, or at least 20 Angstroms, at least 30 Angstroms, at least 40 Angstroms, or at least 50 Angstroms. In some cases, the thickness of the fluorophilic stabilization layer may be greater than about 7 to 10 Angstroms and less than about 5,000 Angstroms or less than about 1,000 Angstroms. In some embodiments involving emulsions comprising a fluorophilic continuous phase, long fluorophilic components are favorable. The fluorophilic component of a surfactant may be at least about 7 to 10

Angstroms in length in some embodiments, or at least about 50 Angstroms, at least about 100 Angstroms, at least about 300 Angstroms, at least about 500 Angstroms, at least about 1,000 Angstroms, or at least about 5,000 Angstroms in other embodiments.

In some cases, the outer-facing portion of the surfactant (e.g., the fluorophilic portion of a surfactant in an emulsion comprising a fluorophilic continuous phase) is larger, longer, and/or has a larger molecular weight than the counterpart of the headgroup portion. The hydrophilic or lipophilic headgroup portion may be long enough to keep the surfactant molecules anchored at the interface and to provide a sufficiently densely packed hydrophilic/lipophilic layer at the inner interface such that it is able to provide a barrier to interfacial adsorption, e.g., for biological applications. However, too long of a hydrophilic/lipophilic component may cause crowding on the inner interface, yielding an outer interface that is insufficiently covered with the fluorophilic component, and hence prone to coalescence. Sufficient coverage may be characterized by the absence of bare patches and by a brush of sufficiently extended fluorophilic molecules on the outer interface.

Figure 5:
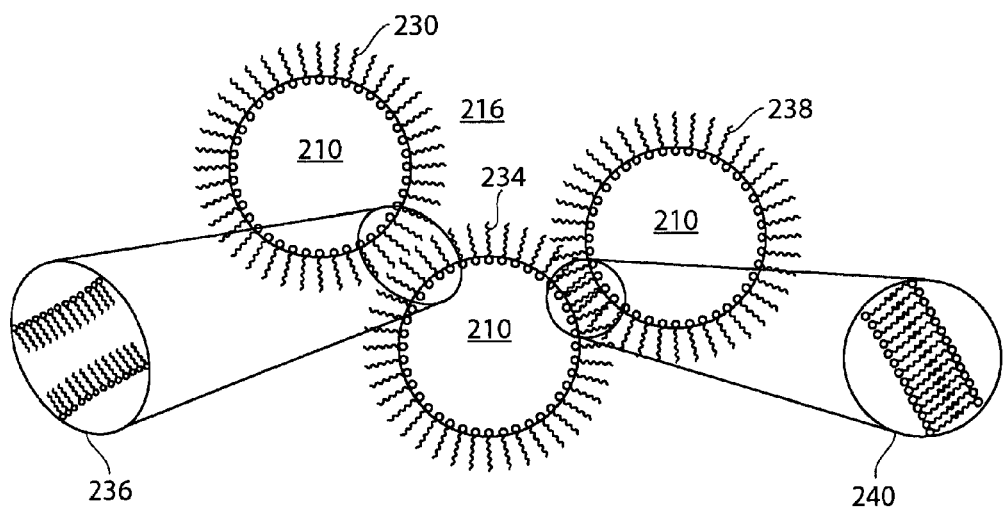
FIG. 5 shows a schematic diagram illustrating steric stabilization of droplets against coalescence according to one embodiment of the invention.

Moreover, the geometry of the surfactant may be important in preventing coalescence in some cases, which may start with the formation of a small neck connecting two droplets. Efficient surfactants that stabilize the droplet from coalescence may destabilize the neck. The surfactant geometry may fit the curvature of the undisturbed droplet and oppose the curvature of the neck. As an example, as shown in FIG. 5, the outer-facing portion of the surfactant may provide steric stabilization of two droplets against coalescence. This block may be chosen such that it is soluble in the continuous phase. Two sterically stabilized droplets 230 and 234 may be able to repel each other owing to the entropically excluded volume of the surfactant layers of each droplet interface, as shown in view 236. Two droplets 234 and 238 may be less sterically stable due to the entropically unfavorable interactions between the surfactant layers of each droplet interface, as shown in view 240. In some cases, surfactant mobility on the interface may facilitate the formation of a bare patch, or a fault in the stabilizing layer, which may lead to the formation of a neck or the coalescence of droplets.

A suitable headgroup portion of a fluorosurfactant described herein that is able to anchor the surfactant to an interface of the droplet may be immiscible with the continuous phase and, in some embodiments, may be soluble in the disperse phase. Solubility in the disperse phase, however, may allow for the potential of interaction of the headgroup portion with components or compounds contained in the droplet. Thus, in some embodiments, a fluorosurfactant described herein includes an headgroup portion that does not interact undesirably with a component contained in the disperse phase. For certain biological applications, for example, PEG has been found to efficiently suppress interactions of biomolecules and cells with interfaces. Being water soluble and non-toxic, PEG may be a suitable choice for an headgroup component of a surfactant in certain biological systems. Additionally, being chemically inert and soluble in certain organic solvents makes PEG attractive for performing certain organic chemistry processes inside droplets. Of course, other compositions such as those described herein can also be used as headgroup portions of fluorosurfactants of the invention. A non-limiting example of such a composition is a morpholinophosphate. In addition, in some cases, compounds may be adsorbed onto an inner surface or interface, which may prevent or reduce the adsorption of biological compounds, e.g., through coacervation processes. As an example, BSA may be used as an interfacially active compound for screening residual uncovered patches.

In some embodiments, fluorosurfactants of the invention comprise two oligomeric (or polymeric) components including a fluorophilic component (e.g., component "A") and a hydrophilic component (e.g., component "B"). These components may form a diblock-copolymer (e.g., a "A-B" structure), or other structures including those described herein. In order to synthesize a fluorosurfactant including these components, an appropriate solvent/solvent mixture may be chosen so as to dissolve (or at least partially dissolve or stabilize) both fluorophilic and hydrophilic (or lipophilic) components to provide mobility, which may be required for the coupling reaction. In one embodiment, the fluorophilic component comprises a perfluorinated oligomer or polymer, such as poly(perfluoro propyleneoxide) (e.g., KRYTOX® by DuPont); the hydrophilic component may include a non-fluorinated oligomer or polymer, such as poly(ethylene glycol) (PEG). In some embodiments, 40:60 mixtures by volume of fluorophilic component, e.g., methyl nonafluoroisobutylether and/or methyl nonafluorobutylether (e.g., HFE 7100), and a solvent, e.g., THF, may be adequate to dissolve both components. In another embodiment, a 1:1 mixture of a fluorophilic component, e.g., methyl nonafluoroisobutylether and/or methyl nonafluorobutylether (e.g., HFE 7100), and a solvent, e.g., dichloromethane, may be adequate to dissolve both components.

Those of ordinary skill in the art can choose suitable solvents to dissolve or stabilize particular components used to synthesize fluorosurfactants described herein based on, for example, known solubility properties of the components or by simple experimentation in combination with description provided herein. For instance, solubility parameters (e.g., Hildebrand parameters), as described in Barton, *Handbook of Solubility Parameters*, CRC Press, 1983, may be used to determine the likelihood of solubility of one component in another. Typically, chemical components having similar values of solubility parameter are soluble in one another. Those of ordinary skill in the art can also choose an appropriate solvent by, e.g., knowing the fluorophilic and hydrophilic (or lipophilic) components and the likelihood of reactivity between the surfactant components and the solvent, and/or by a simple screening test. One simple screening test may include adding the surfactant components to the solvent and determining whether the surfactant components react with and/or are negatively effected by the solvent. A screening test for choosing appropriate surfactant components and solvent for the formation of an emulsion can include mixing the components to form the emulsion and varying either the material composition, quantities, and/or concentration of one component while keeping the others constant, and determining the stability of the emulsion. The surfactants may have different relative block lengths or geometries. Other simple tests can be identified and conducted by those of ordinary skill in the art with the benefit of the present disclosure.

In some embodiments, it is desirable to choose a particular solvent to be contained inside droplets such as those described herein. For example, in some embodiments, emulsion droplets may be used as separate compartments for particle synthesis or high throughput screening, or the particles can be employed as miniaturized reaction sites, as described in more detail below. Prerequisites of such use include, for example, control over the droplet size, compatibility of the components contained in the disperse phase with the disperse phase and with the fluorosurfactants, and compatibility between the disperse phase, fluorosurfactants, and the continuous phase. While droplets may be made using emulsification techniques in some conventional emulsion systems (e.g., hydrocarbon oil-in-water emulsions and water-in-hydrocarbon oil emulsions), chemical compatibility in these systems can be limited if certain solvents, such as solvents that are miscible with hydrocarbons and water, are used as the continuous phase. In some cases, for chemical compatibility, the dispersed phase and the continuous phase in various embodiments of the instant invention may be chosen to be immiscible, and thus, the solvent to be compartmentalized in droplets may be chosen to be immiscible in the continuous phase (e.g., oil or water). For example, it may be difficult to form emulsions comprising certain alcohols or other solvents (e.g., THF) as the disperse phase, as alcohols or other solvents may be miscible with either water or certain organic oils, e.g., mineral oils or silicon oils that are used as the continuous phase. However, using emulsions involving a fluorocarbon phase and fluorosurfactants as described herein can allow generation of emulsions containing a wide variety of solvents. In particular, the inventors have discovered that emulsions of solvent droplets in fluorocarbon oils such as those described herein can include a wide range of common solvents such as alcohols as a discontinuous phase, which may not be possible in conventional emulsion systems. This is because fluorocarbons are at the same time hydrophobic and lipophobic, and may thus be immiscible with alcohols.

The choice of size and geometry of a surfactant (including outer and headgroup components) as applied to the stabilization of emulsions including an alcohol as a discontinuous phase is one example of tailoring droplets using description contained herein. Without wishing to be bound by any theory, the inventors have discovered the following trends and observations. In order of decreasing polarity, methanol (MeOH), ethanol (EtOH), and i-propanol (i-PrOH) are similar in their chemical properties and each does not dissolve in certain fluorocarbon oils. In some cases, each of methanol, ethanol, and i-propanol dissolve in a substance that can be used as an headgroup component of a fluorosurfactant. In one embodiment, the substance is PEG or a derivative thereof, which suggests that PEG-fluorophilic (e.g., PFPE)-block copolymers can stabilize emulsions comprising the alcohols in a fluorophilic continuous phase. However, surprisingly, it was discovered that the fairly polar methanol group may be stabilized with any of the applied surfactants, Table 1 shows that surfactants of certain block lengths provided long-term stabilizing i-propanol emulsions. These observations may be applied to other emulsions including low polarity solvents as the discontinuous phase.

Surfactants with small PEG- and small PFPE-blocks may decrease the surface tension; however, they may not provide colloidal stabilization of the emulsion. Increasing the length of both the PEG- and the PFPE-blocks may improve the long-term stability of the emulsion. In some cases, the influence of the outer-facing portion of the surfactant (e.g., PFPE) may be more important for long term stabilization than that of the headgroup portion (e.g., PEG). This suggests that the failure of emulsion stabilization may be dominated by the formation of a bare patch on the interface of two adjacent droplets, giving rise to neck formation and subsequent coalescence. This may also suggest that an inappropriate surfactant geometry or too short of an headgroup portion of a surfactant (e.g., PEG) that will facilitate surfactant desorption may be counterbalanced by a thicker stabilizing (e.g., outer-facing portion) layer, such as longer fluorophilic components of a surfactant.

TABLE 1

Comparison of the stability of methanol, ethanol and iso-propanol emulsions as a function of the block lengths of the applied surfactant 3 hours after emulsification:

|  | 0220 | 0420 | 0620 | 0920 | Cyt | 0232-1 | 0232-2 | 0432 | 0632 | 0932 | 0265-1 | 0265-2 | 0465 | 0665 | 0965 |
|---|---|---|---|---|---|---|---|---|---|---|---|---|---|---|---|
| MeOH | E | E | E | E | S | E | E | E | E | E | E | E | E | E | E |
| EtOH | T | E | E | E | S | T | E | E | E | E | T | T | E | E | E |
| i-PrOH | S | S | S | E | E | T | T | E | E | E | E | E | E | E | E |

Table 1 shows a summary of the effects of solvent polarity of the solvents MeOH>EtOH>i-PrOH, listed from highest to lowest polarity, surfactant geometry and absolute chain lengths on emulsion forming and stabilization. The block-copolymers are labeled with a four-digit code, and the co-polymers can also be labeled with E2K (difunctional polyethylene glycol coupled to two PFPE blocks). The first two digits in the entries in Table 1 indicate the molecular weight of the PEG block divided by 100, the third and fourth digit indicate the molecular weight of the PFPE block divided by 100. For example: 0220 (or E2K 0220) is a surfactant including PEG having a molecular weight of 200 g/mol and a PFPE block having a molecular weight of 2000 g/mol. The notations are as follows: "E"—stable emulsion was formed; "T"—slightly less stable emulsion that "E"; "S"—least stable emulsion was formed. "Cyt" is Cytonix FluorN surfactant, commercially available from Cytonix.

As the difference in polarity of the disperse and continuous phases becomes smaller, larger PEG-blocks and/or larger PFPE-blocks may be required for stabilizing emulsions. Larger PEG-blocks may provide a better anchoring strength to the interface compared to smaller PEG-blocks. Larger PFPE-blocks may shield a greater interfacial area more efficiently against coalescence compared to smaller PFPE-blocks. In some cases, the effect of the PFPE-block variation is more pronounced than that of the PEG-block variation. This may be due to the capability of a greater stabilizing moiety to cover a nearby bare patch or prevent or inhibit the bare patch from forming. In some embodiments, an increase in the size of one or both of the blocks could decrease the surfactant mobility on the interface, making the formation of bare patches less likely.

In another embodiment, an emulsion of the present invention comprises THF as a discontinuous phase and a fluorophilic continuous phase stabilized by fluorosurfactants described herein. In one embodiment, the surfactant comprises PEG and PFPE. In some cases, both longer PEG and longer PFPE blocks may afford an improved stabilization; the effect of the PFPE blocks may be more pronounced. In other cases, however, there are exceptions to this trend. For instance, surfactants including a PEG portion that has a higher molecular weight than the PFPE portion may stabilize droplets better than surfactants including a PFPE portion that has a higher molecular weight that the PEG portion.

This result may be associated with the pronounced geometry of the surfactant molecules that cause the formation of thermodynamically stable, swollen micelles that cannot coalesce.

In certain embodiments, fluorosurfactants of the invention include triblock-copolymers (e.g., A-B-A structures), whose mid-block is soluble in the discontinuous phase. This "double-tail" morphology is known to have advantages in the colloidal stabilization properties over certain "single-tail" (e.g., A-B) surfactants. In some embodiments, the mid-block can include a poly(ethylene glycol) moiety. Many poly(ethylene glycol)s are available with two reactive headgroups on either end of the polymer-chain, which can facilitate the synthesis of double-tail morphologies. However, the synthetic routes described herein may be used for the synthesis of other surface active morphologies, such as diblock-copolymers, multi-block-copolymers, polymer brushes, etc. In some cases, the triblock copolymer may also contain one or more linking moieties, for example, as in the structure $(A-X^1—B—X^2)_n$, where each "X" independently represents a covalent bond or a linking moiety, and the each X may be the same or different.

The following example syntheses use poly(ethylene glycol) as the hydrophilic component of a headgroup; however, the synthesis can be applied to the formation of surfactants including other chemical moieties. In particular, the synthetic routes described herein can be easily applied to the coupling of a variety of other hydrophilic components.

In some embodiments, surfactants including poly(ethylene glycol) as the hydrophilic component of a headgroup are advantageous for performing chemical and/or biological reactions (e.g., enzymatic reactions and reactions involving cells and/or cellular components). Poly(ethylene glycol)s are well known and widely applied to "passivate" surfaces against non-specific adsorption of nucleic acids and proteins to solid surfaces. (Harris, J. M.; Zalipsky, S. on *Poly (ethylene glycol): Chemistry and Biological Applications*, American Chemical Society, Washington, D.C.; 1997). For the same reason, poly(ethylene glycol) surfactants such as Tween (Bernath, K.; Hai, M.; Mastrobattista, E.; Griffiths, A. D. Magdassi, S.; Tawfik D. S. in *Analytical Biochemistry*, 325: 151-157; 2004) and Triton (Mastrobattista, E.; Taly, V.; Chanudet, E.; Treacy, P.; Kelly, B. T.; Griffiths, A. D. in *Chemistry & Biology*, 12: 1291-1300; 2005) have been applied for in vitro compartmentalization in hydrocarbon oils.

In some instances, a fluorophilic component and a non-fluorophilic component (e.g., a hydrophilic or lipophilic component) of a surfactant are bonded covalently. However, in other embodiments, ionic bonds or other associations, such as linking moieties, can be used to combine the two components. Non-limiting examples of reactions for coupling two or more components together follows.

Three different, non-limiting coupling reactions are now described, which can be used to achieve coupling of the fluorophilic and hydrophilic components. These include the formation of an ester bond, an amide bond, or an ether bond between a hydrophilic and fluorophilic component. The chemicals used in the synthetic routes described herein are produced on the industrial scale and therefore readily available.

While the amide bond may be formed in a particularly simple reaction of, e.g., poly(ethylene glycol) diamine, the formation of ether bonds may involve the use of hydroxyl terminated poly(ethylene glycol) components, which are inexpensive and are available in a wide variety of chain lengths. In some instances, ether bonds are more stable to hydrolysis than esters or amides; thus they may allow for a wider range of applicable pH.

In one embodiment, an ester bond may be formed through the reaction of, for example, poly(ethylene glycol) dicarboxylic acid with thionylchloride to yield the poly(ethylene glycol) diacid chloride, with which a fluoropolymer with a terminal alcohol group may react in the presence of poly (vinyl pyridine). The inverse case of reacting the fluorophilic acid halide with the poly(ethylene glycol) dialcohol (PEG $(OH)_2$) is possible as well.

In another embodiment, an amide bond may be formed through simple amidation reaction. For example, a poly (ethylene glycol) or other component comprising a mono- or diamine reacts on a fluoropoymer carrying a terminal methylester to yield the amide may be used. The formation of the inverse amide is possible as well.

In another embodiment, an ether bond may be synthesized using a Mitsunobu reaction, which links, for example, two components having hydroxyl functional groups. For instance a fluoropolymer and a poly(ethylene glycol) may both comprise hydroxyl functional groups and can be bonded using a Mitsunobu reaction. DEAD (diethyl azodicarboxylate) and triphenyl phosphine may be used for activating the less acidic poly(ethylene glycol) alcohol. Sorbitol may be applied as an optional hydrophilic group. Williamson ether synthesis is also possible with certain hydrophilic headgroups. A Williamson ether synthesis may also be used for linking a fluorophilic and lipophilic component. For instance, a tosylated fluoropolymer can be linked to an organic alcohol in the presence of an organic base.

Other synthetic routes may involve very reactive species, such as isocyanates (forming urethane bonds), or precursors that are amphiphiles by themselves, such as fluorocarbons with acid, nitrile or acid halogenide headgroups that may be coupled to the hydrophilic component yielding esters and amides. Various reagents may be used to activate carboxylic groups (e.g. BOP).

The details of some of these synthetic routes are described below, but are intended to be exemplary only and not limiting. Possible ways to purify the products are indicated in these procedures as well. A particularly interesting method of purification includes phase separation of the unreacted fluorophobic reactant from an appropriate low-polarity fluorosolvent mixture. The unreacted fluorophobic compound will cream, forming a supernatant that may be easily decanted. At the same time, block-copolymer surfactant may phase separate if the critical micelle concentration is exceeded, but it will sediment, rather than cream, due to the high density of the fluorocarbon components contained in the surfactant molecules.

In one particular embodiment, suitable geometries and acceptable stabilization of droplets in fluorocarbon oils have been achieved using the ether synthesized from the reaction of phytol and KRYTOX® alcohol with a molecular weight of 1,700 g/mol. The molecular weight ratio in this example was about 1:6. A molecular weight ratio of poly(ethylene glycol) to poly(perfluoropropylene oxide) of 1:4 to 1:5 was suitable for the stabilization of THF droplets in fluorocarbon oils. The applied poly(ethylene glycol) contained 75% diamine and 25% of monoamine, yielding 75% triblock and 25% diblock co-polymer.

In some embodiments, unreacted mixtures of the methyl ester of KRYTOX®-fluoropolymers and poly(ethylene glycol) diamines may reduce the surface tension between water and fluorocarbon oils and stabilize droplets. Therefore, interfacially active emulsifying systems that rely on the interaction of appropriately functionalized fluoropolymers with amines and polyethers across the interface are contemplated within the scope of the present invention, even if the fluorophilic and the hydrophilic (or lipophilic) components are not bound covalently. Similarly, the application of poly (ethylene glycol) and amines to screen the interface of droplets that are stabilized with conventional surfactant systems are contemplated within the scope of the present invention.

In one embodiment, a fluorosurfactant of the invention has the appropriate geometry for suitably stabilizing (e.g., sterically) droplets of hydrocarbon oils and organic solvents in fluorocarbon oils. In some cases, a fluorosurfactant includes lipophilic headgroups for stabilizing inverse emulsions that comprise hydrocarbon oils and organic solvents in addition to water. Also in these cases, the fluorosurfactants may comprise oligomeric or polymeric fluorocarbon tails, which can allow long term colloidal stability against coalescence. This may be achieved, for instance, through sufficient steric repulsion.

The surfactant syntheses described herein include, but are not limited to, coupling a perfluorinated component to a lipophilic component in a suitable solvent mixture. As a fluorophilic component, a perfluorinated oligo- or polymer, such as an poly(perfluoro propyleneoxide) (e.g. KRYTOX® by DuPont), was used. The lipophilic component can be another oligomeric component, such as poly(ethylene glycol), poly(propylene glycol) or poly(ethylene-co-butylene), poly-THF, or an alkyl component such as lauryl or phytol. Other examples include, but are not limited to, proteins, or aromatics. This may represent a convenient route to surfactants of low to intermediate chain lengths with a well defined structure and molecular weight distribution. Other suitable methods of synthesis are known to those of ordinary skill in the art. The solvent used for the coupling reaction may be chosen to dissolve both components to provide their mobility required for the coupling reaction. 40:60 mixtures by volume of methyl nonafluorobutyl ether (3M's HFE 7100) and THF showed good results in some experiments. Other non-limiting examples of suitable solvents include HFE 7100 (3M) and dichloromethane or fluorochlorocarbons.

Another aspect of the invention includes stabilizing emulsions involving electrostatic attraction of two oppositely charged components (e.g., a first surfactant including a headgroup and a tail, and a second surfactant including a headgroup and a tail), one of which is soluble in the dispersed phase, the other soluble in the continuous phase. The two components may combine to form at the interface between the continuous and discontinuous phases to stabilize an emulsion. The component soluble in the continuous phase may include an ionic surfactant suitable for stabilizing inverse emulsions. The component soluble in the disperse phase may assemble as a layer of counterions to the surfactant headgroups at the interface. Particularly suited are counterions carrying multiple charges as they cannot be replaced easily by other charged species. They may be chosen to fit the desired surface chemistry that allows for chemical/biochemical/biological reactions inside the droplets.

As a non-limiting example of such a system, poly(perfluoropropyleneoxide) carboxylic acid (KRYTOX® FS series) was dissolved in a continuous fluorous phase and a polycation was dissolved in the dispersed phase. Polycations may carry functionalities such as primary, secondary, tertiary, or quaternary amines. In some experiments, 0.01%-0.5% (w/w of the aqueous phase) low molecular weight chitosan (Aldrich) were dissolved in the aqueous phase. The precise weight fractions of each component will depend on, for example, the droplet size and on the cationic charge density. For chitosan, both the primary amine and the quaternary ammonium salt may be suitable for preventing the adsorption of biomolecules to the interfaces.

To produce stable droplets of organic solvents 0.01%-0.5% (w/w), polymeric ammonium salts with counterions which are highly soluble in the organic phase and inert to chemical reactions were added. Suitable polycations include, for example, poly-N-methyl-vinylpirydinium, quaternized poly-N-vinyl-imdazole, polyallylamine, or LUVIQUAT® (BASF). Other polycations are known in the art and can also be used. Suitable counter-anions include 4-(trifluoromethyl)-benzenesulfonate, or trifluoromethanesulfonate. Other counter-anions are known in the art and can also be used.

In another embodiment, two surfactants can be dissolved in a continuous fluorous phase and combined to assemble at the interface between the continuous and discontinuous phase of an emulsion. One surfactant can provides colloidal stability of the emulsion. For example, KRYTOX® 157 FSL can be used for steric stabilization of the droplets. The other surfactant can be chosen to prevent adsorption of components such as chemicals, reactants, and biomolecules to the interfaces. For example, small amounts (<0.5% by weight) of a commercial fluorous surfactant that comprises a poly (ethylene glycol) group, such as ZONYL® (DuPont) FSN, may be used to sterically block the charges of the KRYTOX® surfactant.

The emulsions of the present invention may be formed using any suitable emulsification procedure known to those of ordinary skill in the art. In this regard, it will be appreciated that the emulsions can be formed using microfluidic systems, ultrasound, high pressure homogenization, shaking, stirring, spray processes, membrane techniques, or any other appropriate method. In one particular embodiment, a micro-capillary or a microfluidic device is used to form an emulsion. The size and stability of the droplets produced by this method may vary depending on, for example, capillary tip diameter, fluid velocity, viscosity ratio of the continuous and discontinuous phases, and interfacial tension of the two phases.

Non-limiting examples of microfluidic systems potentially suitable for use with the instant invention include the following, each incorporated herein by reference: U.S. patent application Ser. No. 11/024,228, filed Dec. 28, 2004, entitled "Method and Apparatus for Fluid Dispersion," by Stone, et al., published as U.S. Patent Application Publication No. 2005/0172476 on Aug. 11, 2005; U.S. patent application Ser. No. 11/246,911, filed Oct. 7, 2005, entitled "Formation and Control of Fluidic Species," by Link, et al., published as U.S. Patent Application Publication No. 2006/0163385 on Jul. 27, 2006; U.S. patent application Ser. No. 11/360,845, filed Feb. 23, 2006, entitled "Electronic Control of Fluidic Species," by Link, et al., published as U.S. Patent Application Publication No. 2007/0003442 on Jan. 4, 2007; and International Patent Application No. PCT/US2006/007772, filed Mar. 3, 2006, entitled "Method and Apparatus for Forming Multiple Emulsions," by Weitz, et al., published as WO 2006/096571 on Sep. 14, 2006.

In some embodiments, an emulsion may be formed by mixing an aqueous or hydrocarbon component with the fluorocarbon component, the mixture having a water or hydrocarbon content of between about 1-40%, in some cases between about 5-25%, and in other cases between about 10-15%. In another embodiment, the emulsion has a water or hydrocarbon content of at least about 20%, at least about 30%, at least about 40%, or at least about 50%, or at least 80%, etc. However, certain embodiments of the invention provide an emulsion within reverse emulsion droplets having a disperse aqueous or lipophilic phase in a continuous, fluorocarbon phase. The criteria in accordance with certain embodiments of the invention that can be used to select suitable discontinuous phases, continuous phases, and surfactants suitable for use in the invention may include (but are not limited to) the description contained herein. A simple, non-limiting screening test to determine whether an aqueous (or hydrocarbon)-in-fluorocarbon emulsion has been created follows: If a water-soluble, fluorocarbon-insoluble dye is added to an emulsion, if the emulsion is an aqueous-in-fluorocarbon emulsion the dye may form a separate phase, since it is not miscible with the continuous, fluorocarbon phase. But in the case of a fluorocarbon-in-aqueous emulsion, the dye may dissolve in the continuous, aqueous phase giving the appearance of disillusion of the dye in the entire mixture. In a second non-limiting screening test, the aqueous phase can be made slightly electrically conductive and, if the emulsion is slightly electrically conductive, then the continuous phase is aqueous, i.e. a fluorocarbon-in-aqueous phase results. If the mixture is not electrically conductive, then an aqueous-in-fluorocarbon emulsion results. As a third non-limiting screening test, if the mixture is optically clear, then very small aqueous aggregates in a fluorocarbon, continuous phase may have been formed.

Figure 6:
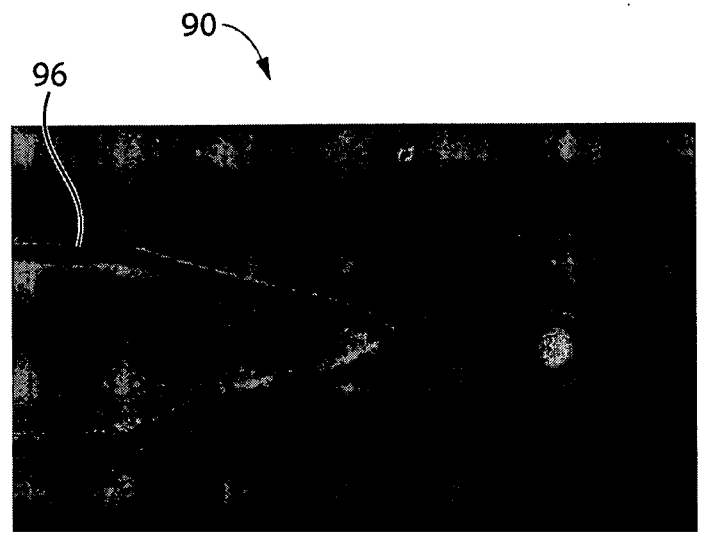
FIG. 6 shows a non-limiting example of a device used to form an emulsion according to one embodiment of the invention.

In one embodiment, emulsions of the invention are prepared using microfluidic systems. For instance, the formation of droplets at intersection 92 of device 90 is shown in FIG. 6. As shown in illustrative embodiment, fluid 94 flows in channel 96 in the direction of arrow 98. Fluid 94 may be, for example, an aqueous or lipophilic solution that forms the discontinuous phase of a droplet. Fluid 104 flows in channel 106 in the direction of arrow 107, and fluid 108 flows in channel 110 in the direction of arrow 112. In this particular embodiment, fluids 104 and 108 have the same chemical composition and serve as a carrier fluid 116, which is immiscible with fluid 94. In other embodiments, however, fluids 104 and 108 can have different chemical compositions and/or miscibilities relative to each other and to fluid 94. At intersection 92, droplet 120 is formed by hydrodynamic focusing after passing through nozzle 122. These droplets are carried (or flowed) in channel 124 in the direction of arrow 126.

Droplets of varying sizes and volumes may be generated within the microfluidic system. These sizes and volumes can vary depending on factors such as fluid viscosities, infusion rates, and nozzle size/configuration. Droplets may be chosen to have different volumes depending on the particular application. For example, droplets can have volumes of less than 1 µL (microliter), less than 0.1 µL (microliter), less than 10 nL, less than 1 nL, less than 0.1 nL, or less than 10 pL.

Emulsions including a fluorophilic continuous phase may be useful in a variety of fields due to their unique properties, according to another aspect of the invention. For example, one or more of the following advantages may be present in certain emulsions of the invention. A fluorophilic continuous phase may be immiscible with water and hydrocarbons and may allow separation of both hydrophilic and lipophilic compounds that can be contained within the droplets. In this way, cross-contamination of materials, such as proteins or DNA, between droplets may be reduced or prevented. This efficient compartmentalization can be advantageous for drop-based biological and/or chemical assays and the like. In addition, fluorophilic solvents such as fluorocarbons may be chemically inert. Their immiscibility with common organic solvents allows for making droplets or organic solvents that may be used as reactors with volumes typically on the order of picoliters, in certain embodiments of the present invention. In some embodiments, these emulsions can provide the dry environment that is necessary for carrying out water-sensitive chemical reactions. Certain fluorophilic solvents may also have a solubility for gases and can allow transport of gaseous compounds to and from the droplets. For example, biological experiments carried out with cells inside the droplets may benefit from the enhanced transport of oxygen. Microfluidic experiments may also be performed in polydimethylsiloxane (PDMS) or other polymeric devices obtained through the widely applied methods of soft-lithography. For instance, in contrast to mineral and silicone oils, certain fluorophilic solvents such as perfluorinated oils do not swell the rubbers and avoid a number of problems associated therewith.

Accordingly, the droplets and emulsions produced in accordance with various embodiments of the present invention have a variety of uses. For example, in one embodiment, the droplets are used as reaction vessels for carrying out chemical and/or biological reactions within the droplet. Increasing effort is being put into investigating biological systems on very small scales. This involves the observation of cells and their interaction with the environment as well as the investigation of strands of DNA, even of single genes. There are certain advantages to the encapsulation of cells and DNA into aqueous droplets (e.g., a dispersed phase of an emulsion) that are separated from one another with oil (e.g., a continuous phase), as is discussed herein. This is called compartmentalization and it generally allows the screening of much larger numbers of cells or genes at greater rates using much less chemicals than in classical experimental setups, such as Petri-dishes or microtiter plates.

As mentioned above, fluorocarbon oils may be suited as the continuous phase in some of these experiments, as they may reduce cross-contamination, e.g., through the diffusion of hydrophilic or lipophilic biological material from one droplet to another. Furthermore, they may allow for an efficient transport of oxygen in some cases, which is vital to some types of encapsulated cells.

In some applications, a role of the fluorosurfactant may be to ensure colloidal stability of the emulsion upon collision of droplets and/or during incubation in a creamed state. The surfactant may also reduce or prevent biological molecules from adsorbing to the interface of the droplet, which adsorption could disturb their native three-dimensional structure or render them inactive. For example, PEG and other head-groups described herein may reduce or prevent adsorption of certain biological molecules to interfaces and hence may be used for these applications. In fact, a model reaction for the in-vitro translation and transcription of specific DNA sequences into fluorescent proteins inside emulsion droplets demonstrates the potential of various fluorosurfactants of the invention (e.g., non-ionic fluorosurfactants) for biological in-vitro experiments.

In some embodiments, such as certain bioapplications that involve incubation at elevated temperatures, fluorosurfactants of the invention may comprise a water soluble fluorosurfactant such as the Zonyl compounds sold by DuPont. Some such compounds have relatively long PEG-units (400 g/mol and greater) and a short fluorotelomer. The compounds may be added to the water phase, but in some cases, they may be added to the fluorophilic phase. Such compounds can, in some embodiments, help keep biomolecules, such as BSA, from adsorbing to the droplet interface. They may aid the emulsification process and may also help in stabilizing the droplets during emulsification in some cases.

In other embodiments, a high-molecular weight surfactant may be inserted into the adsorbed surfactant layer after emulsification. The high-molecular weight surfactant may increase long term stabilization of the emulsion. In some cases, such a surfactant can be mixed with a fluorosurfactant before dissolving it in the fluorophilic continuous phase. Alternatively, the surfactant can be added to the fluorophilic continuous phase separately or added after emulsification of an emulsion.

Figure 7:
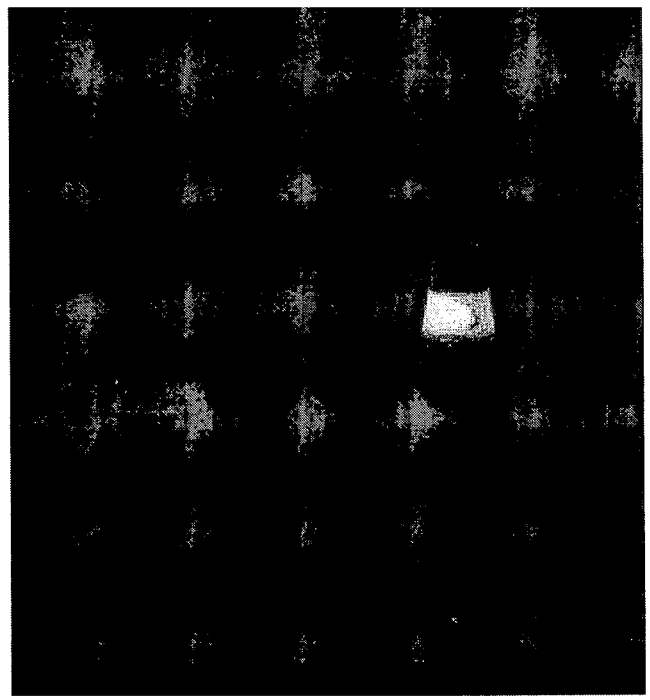
FIG. 7 shows in-vitro translation inside droplets of an emulsion according to one embodiment of the invention.

In some embodiments, in-vitro translation can be performed using emulsions described herein. A gene (e.g., a DNA sequence) can be contained in the droplets together with all the chemicals required for transcribing it into RNA and translating that into a protein. Such chemicals are known to those of ordinary skill in the art, and may be readily obtained commercially. This protein may be fluorescent itself (e.g., green fluorescent protein, GFP) or enzymatically active, catalyzing a reaction that yields a fluorescent product. A fluorescent product may not be formed if adsorption to the interfaces of one of the compounds takes place, disturbing the 3D-structure of the bioactive compound and rendering it inactive. Fluorescence indicates that the reactions took place and, therefore, that adsorption had been prevented successfully. This is demonstrated in the rightmost vessel of an example as shown in FIG. 7. The negative control, the left-most vessel of FIG. 7, shows only background fluorescence. The emulsion used in this particular experimental example included a fluorophilic continuous phase (FC 40) and an aqueous solution with an in-vitro translation mix and Zonyl, and the surfactant E2K 0420.

In certain embodiments, the discontinuous aqueous and/or lipophilic phase of a droplet/emulsion may include one or more physiologically acceptable reagents. The reagents may be dissolved or suspended in the discontinuous phase. In another set of embodiments, the discontinuous aqueous and/or lipophilic phase of a droplet/emulsion may include one or more reagents that can participate in a chemical and/or in a biological reaction of interest. Non-limiting examples of reagents that can be involved in a chemical and/or biological reaction, or other chemical and/or biological process, include: buffers, salts, nutrients, therapeutic agents, drugs, hormones, antibodies, analgesics, anticoagulants, anti-inflammatory compounds, antimicrobial compositions, cytokines, growth factors, interferons, lipids, oligonucleotides polymers, polysaccharides, polypeptides, protease inhibitors, cells, nucleic acids, RNA, DNA, vasoconstrictors or vasodilators, vitamins, minerals, stabilizers and the like. In other embodiments, the discontinuous aqueous and/or lipophilic phase can contain toxins and/or other substances to be tested, assayed, or reacted within the droplet. Accordingly, chemical and/or biological reactions may be performed within droplets of the invention. Because conditions of pH, temperature, reactant concentration, and the like will be adjusted for a particular reaction that is to take place within the disperse phase of the emulsion, in some cases, the surfactant system may be tailored so as to preserve the emulsion under these conditions.

As specific examples, in one embodiment, a therapeutic agent can be provided in the aqueous phase of a droplet and a reactant introduced into the aqueous phase, optionally via a carrier or by fusion of droplets, and allowed to react inside the droplet. In another embodiment, droplets of the invention can be used as drug-delivery carriers.

The invention also provides, according to another aspect, a technique for controlling the length of assembly of components within droplets. For instance, for polymerization reactions within a droplet, the size of the resulting particle can be controlled by confining the space within which the reaction can occur. The confined space may be defined by the size of the droplets, which can serve as microreactors in some cases. For example, when a polymeric precursor is provided in the discontinuous phase and a reactant is added to the discontinuous phase, the reactant may be allowed to interact with the precursor and cause polymerization, according to certain embodiments. Because of the size of the droplets and the limited amount of discontinuous phase, polymer particle size may be accordingly limited. Smaller particles than the precursor droplets may be prepared, for instance, by diluting the polymer precursor with appropriate solvents. In one particular embodiment, such a reaction can involve the polymerization of monomer units to form polyurethane.

Confining chemical reactions in small volumes is of interest for various reasons. For example, combinatorial approaches to chemical synthesis require that a large number of reactions be performed with slightly different compositions or under systematically changed conditions without using large amounts of chemicals. By screening the resulting products, as discussed herein, optimal reaction conditions can be found or scaled up to commercial scales. The droplets may also serve as suitable containers in some cases. 2) Certain products and intermediates are worth more if they are available as micron or nanometer sized objects (e.g., in lattices). These products span the range of, for example, micron-sized heterogeneous catalysts, crystalline nanoparticles with controlled electronic and photonic properties, polymeric dispersions, fillers used for nanocomposite materials, etc. One way to achieve such confined reactions is to carry them out in the droplets of an emulsion. Emulsions usually include the oil- or solvent phase and a continuous water phase. However, many organic reactions are sensitive to water and an aqueous continuous phase may not be used. Using a fluorophilic continuous phase (e.g., fluorocarbon oils) instead of water as the continuous phase for such systems, as described herein, may be used to circumvent this problem. In some cases, appropriate surfactants may also be added, e.g., to increase stability of the emulsion.

In one particular embodiment, the methods and components described herein can be used to stabilize droplets of organic solvents for combinatorial chemistry. Choosing a suitable combination of inner (e.g., lipophilic/hydrophilic) and outer (e.g., fluorophilic) components may allow for the stabilization of droplets of organic solvents, as required for performing many water-sensitive chemical reactions. For instance, this allows for the facilitated combinatorial screening of chemical reactions by using microfluidic devices. Note that the surfactants containing, e.g., poly(ethylene glycol) as the discontinuous phase as described herein, also can allow stabilization of droplets of a variety of organic solvents (e.g., THF and acetone).

In another embodiment, the methods and components described herein can be used for nanoparticle synthesis. Droplets of organic solvents may be stabilized (as the discontinuous phase) for the production of organic and inorganic micron or sub-micron particles. This makes the synthesis of particles formed from water-sensitive precursors possible, e.g., polyurethanes and polyesters. In another embodiment, crystalline silica and titania particles may be synthesized in water-free reactions. The absence of water, in certain embodiments, offers advantages over sol-gel methods, which may be used to yield entirely amorphous particles.

In one embodiment, particle synthesis can be achieved in a suspension polymerization process in which a liquid precursor is emulsified and then each of the emulsion droplets is converted, e.g., 1:1, yielding a polymer particle. Suspension polymerization is an industrially important method that can form particles with sizes ranging from less than a micron to tens of microns, for example. The suspension polymerization process can be used with a variety of chemical compositions. Suspension polymerization, in some cases, relies on phase separation (and/or chemical compatibility) between the precursor and the continuous emulsion phase.

Non-limiting examples of other materials that can be synthesized using methods described herein include silica, titania, vanadia, zirconia, etc., and combinations thereof, for instance, by sol-gel reactions, to form particles or the like. These and other reactions may be performed, for instance, acid or base-catalyzed. For example, base-catalyzed reactions may yield nanoparticles through nucleation and growth inside the droplets, according to some embodiments. In some cases, the nanoparticles may adhere to one another after solvent evaporation.

In one embodiment, a suitable continuous emulsion phase for polyurethane (PU) suspension polymerization may be perfluorinated oils, as these oils phase may separate from the hydrocarbon-based PU precursors, and may be water-free in some cases. Certain fluorosurfactants of the invention can achieve stabilization of PU droplets, as described herein. Examples of the synthesis of stabilized polyurethane particles and emulsions are described in more detail in the Examples section.

In some embodiments, polyurethanes or other polymer or polymer precursors within a dispersed phase may be modified by adding reagents, such as linking moieties, to the precursor that will be incorporated into the polymer backbone in the course of polymerization. In some cases, the composition of the precursor droplets is the same or similar to that of the precursor before emulsification and does not rely on the diffusion of precursors. This can make suspension polymerization more versatile than techniques such as emulsion or precipitation polymerization according to some embodiments. As another example, step growth polymerization reactions, including the polyaddition of polyurethanes, may be used. Such reactions can involve homogeneous distribution of added reagents along the polymer chains. In some embodiments, this approach is used to incorporate fluorescent dyes in the polyurethane, e.g., through urea links. Other compounds can also be incorporated using this approach.

Figure 10A:
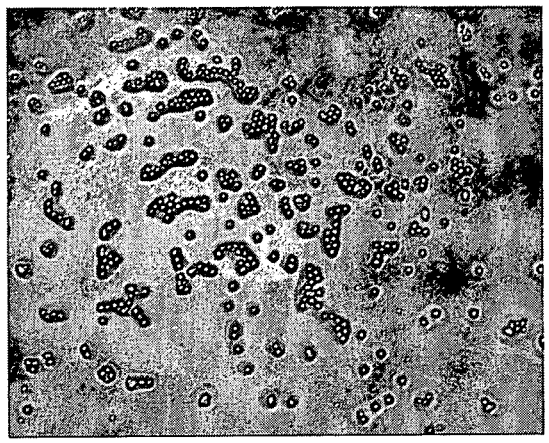
FIGS. 10A and 10B are bright-field and fluorescent micrographs, respectively, showing dried, fluorescently labeled, monodisperse particles of polyurethane latex according to one embodiment of the invention.
Figure 10B:
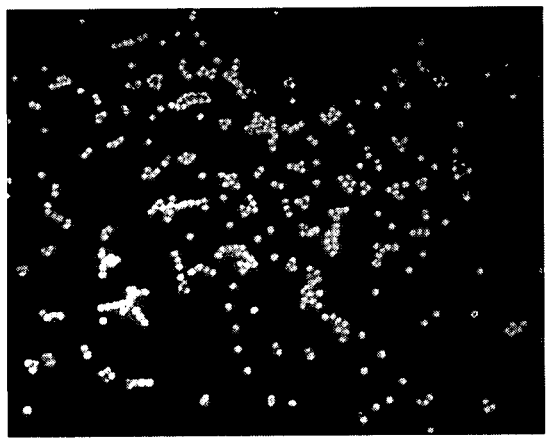

An example is illustrated in FIG. 10A. This figure is a bright field micrograph of dried, fluorescently labeled, monodisperse particles of a polyurethane latex. The synthesis of fluorescent particles is just one example of chemical modification through the addition of functional reagents to the PU-precursor. FIG. 10B is a similar view, showing a fluorescent micrograph of the particles.

Figure 11A:
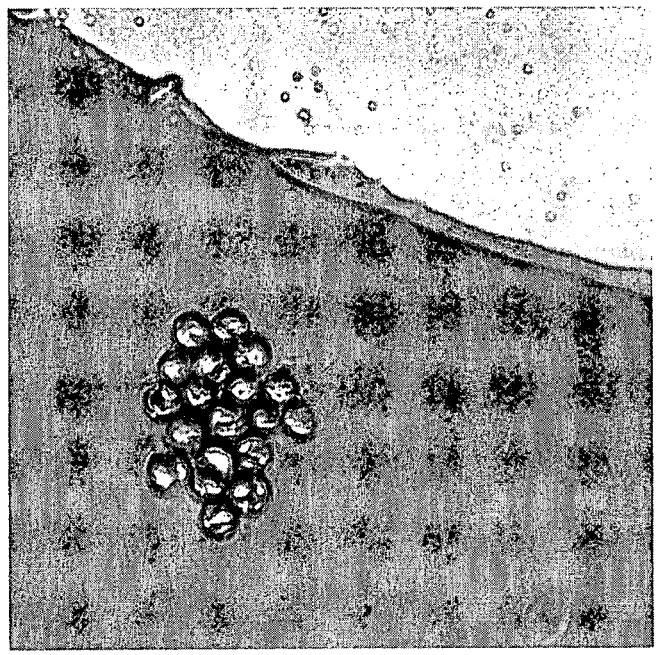
FIGS. 11A and 11B are bright-field and fluorescent micrographs, respectively, showing cross-linked and fluorescently labeled polyurethane latex particles formed by suspension polymerization in a single process step according to one embodiment of the invention.

In another embodiment, cross-linked particles (e.g., cross-linked polyurethane particles) can be formed. Cross-linking may be possible, for example, by replacing a small amount of dialcohol or diisocyanate with a trifunctional reagent, while maintaining a generally stochiometric 1:1 ratio of alcohol and isocyanate groups. Suspension polymerization can produce cross-linked particles in a single polymerization step, in some embodiments. Additionally, if desired, fluorescent labeling may not require an additional processing step. In some embodiments involving the surfactant systems described herein, neither cross-linker molecules nor reactive dyes may significantly change the colloidal stability of these emulsions. Effective cross-linking can be shown by dissolution tests with an appropriate solvent, such as THF. The example as shown in FIG. 11A illustrates how that upon application of THF, cross-linked particles may swell in some cases, but do not appear to dissolve as readily as would particles that are not as well cross-linked.

Figure 11B:
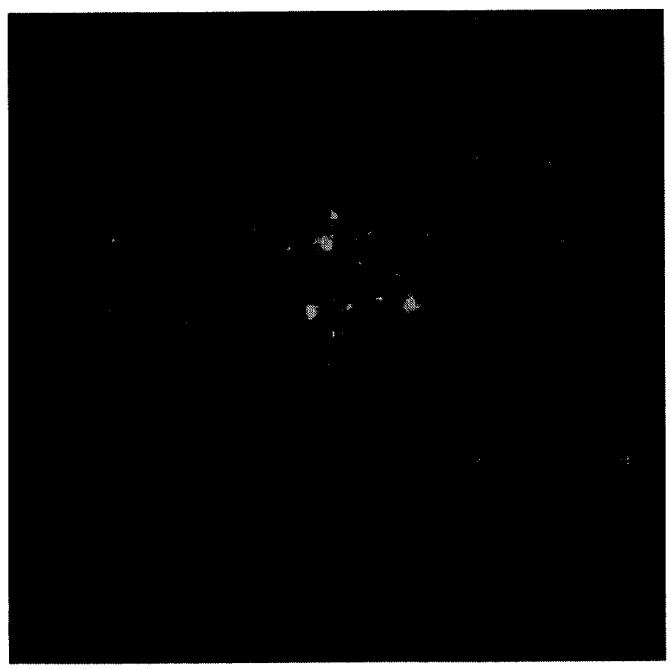

Certain cross-linked polymer particles synthesized in this way may not have gradients in the cross-linking density. Accordingly, a polymer network having homogeneously distributed cross-links may be produced in some embodiments. In some cases, homogeneously distributed cross-links can be formed using the step polymerization mechanism. Cross-linked, monodisperse, and fluorescently labeled organic microgel particles are shown in the example of FIG. 11B. Such particles may be useful as model systems in fundamental studies.

Figure 12A:
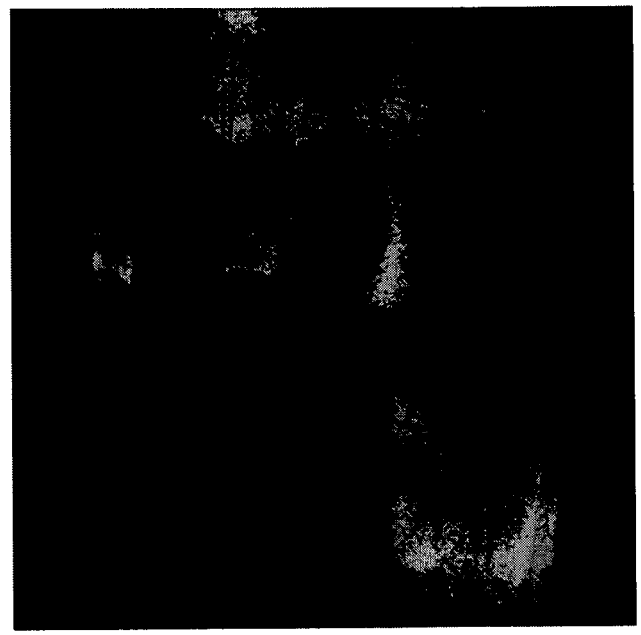
FIGS. 12A and 12B show cross-linked PU-particles, whose precursor was diluted with an equal volume of DMSO prior to emulsification according to one embodiment of the invention.
Figure 12B:
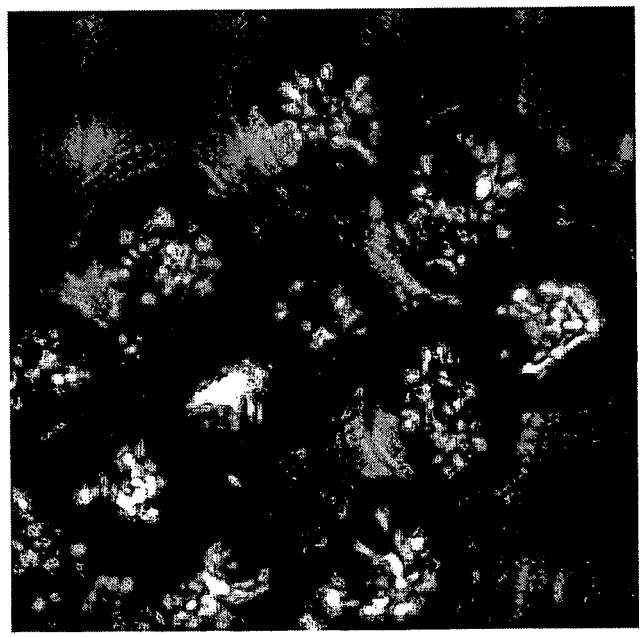

In some embodiments, various mechanical properties of the polymer particle can be tuned by reducing the effective volume fraction of the precursor within a particle. This may be achieved, for example, by diluting the precursor with an inert solvent that can dissolve the precursor as well as the polymer. In this way, suspension polymerization can allow control over the mesh size of a cross-linked polymer particle. Particles (e.g., microgel particles) that were polymerized with small volume fractions of precursor may swell upon addition of a suitable solvent. Depending on the degree of swelling, such particles can exhibit different stiffnesses or other physical properties. For instance, FIGS. 12A and 12B show examples of cross-linked PU-particles, whose precursor was diluted with an equal volume of DMSO prior to emulsification in this case. The dried particles may shrink as indicated by the pronounced wrinkles at their surface (or comparison, FIG. 9B shows cross-linked particles of the same composition that were synthesized from an undiluted PU-precursor).

In some embodiments, particles formed by methods such as those described herein may be used as scaffolds for adding additional coatings or features to the particles. For instance, particles may serve as scaffolds for composite particles; for example, the particle network may be swollen with a precursor of another polymer that is polymerized subsequently. The synthesis of such particles can benefit from the ability to stabilize organic droplets in a wide range of polarities, including DMSO, with PEG-based non-ionic fluorosurfactants, or other surfactants described herein.

In some cases, porous structures can be formed using methods described herein. For example, mesoporous structures may be formed inside a droplet through templated synthesis (e.g. through self assembly of block-copolymers). As described herein, fluorosurfactants including non-ionic fluorosurfactants can be used in a wide range of particle syntheses through conversion of precursor emulsion droplets. The immiscibility of fluorocarbon oils with hydrocarbons of many different polarities may allow the formation of droplets having certain hydrocarbon disperse phases that cannot be formed in certain other continuous phases. In addition, hydrophobic chemicals may be emulsified in a dry environment allowing water-sensitive reactions to be performed. While the benefits of such a system has been demonstrated in conjunction with the suspension polymerization of polyurethane particles, it should be understood that the invention is not limited in this respect and that articles and methods described herein can be used to form particles having other compositions in other embodiments. Furthermore, in a simple one-step process, solid particles can be made with the option of cross-linking, grafting fluorescent dyes or other moieties to the polymer network and controlling its mesh-size by applying an inert solvent during polymerization. This process may be used for producing a variety of other polymers that rely on water-sensitive syntheses, such as, for example, polyesters and polyureas, and for producing transition metal alkoxides. Organic droplets that allow for water sensitive reactions are useful in fields other than particle synthesis, such as heterogeneous catalysis or screening applications in drop-based microfluidics. In some instances, methods and components described herein can be used for reactions with gases. For example, reactions of liquids with gaseous reactants (such as hydrogenations and oxidations using hydrogen and oxygen, respectively) may be carried out very efficiently. Fluorocarbon oils can dissolve around an order of magnitude more gases than water and conventional solvents in some cases. The high gas solubility and the large interfacial area of emulsions comprising a fluorophilic continuous phase may enhance the transport of the gaseous reactant(s) to the reaction loci inside the droplets, which often is the rate limiting step in industrial processes. Transport across the interface can be facilitated by the enormous specific area of emulsion droplets. Thus, articles and methods described herein can be used for chemical heterophase reactions. Applications of water-sensitive catalysts are also possible.

In another embodiment, methods and components described herein can be used for studies of liquid crystalline behavior. Lyophilic mesophases of fluorocarbon surfactants are interesting because of their particular contrast in hydrophilicity. The synthetic routes described herein may be applied for the production of such materials.

In another embodiment, methods and components described herein can be used for modifying the wetting behavior of microchannels. Chemicals used as wetting agents are typically chemically inert and capable of changing the wetting properties of fluorous and silicone elastomers in a reversible manner. By adsorbing them onto a solid-liquid interface, they provide a surface that changes the wetting behavior in a reversible manner. For instance, silicone rubbers may be wet by fluorocarbon oils and fluorous rubbers may be wet by hydrocarbon oils and organic solvents.

In certain embodiments, colloidal stabilization of droplets can be achieved while preventing the adsorption of biological materials. For instance, using passivating agents such as PEGs as headgroups of surfactants, droplets containing solutions of biomolecules may be stabilized in fluorocarbon oils while preventing the adsorption of DNA, RNA, proteins or other materials to the interfaces. In some embodiments, cells may be encapsulated in aqueous droplets without adsorbing to the droplet interfaces. They may therefore be investigated as if they were floating in an aqueous bulk medium.

Some embodiments of the invention involve mixtures of more than one different surfactant. The combination of surfactants synthesized using methods described herein with similar or different geometry and different molecular weight allows for efficient emulsification. For instance, low molecular weight surfactants may lower the interfacial tension rapidly, while high molecular weight surfactants may provide long term stability. Such considerations are crucial to the velocity of an emulsification process, e.g., in industry.

The methods and components described herein can also be used for studies of liquid crystalline behavior. For example, lyophilic mesophases of fluorocarbon surfactants are interesting because of their large contrast in hydrophilicity. The synthetic routes described herein may be applied for the production of such materials, e.g., as previously discussed.

In some embodiments, surfactants having the following structures are contemplated:

1. PFPE (KRYTOX®)-PEG-PFPE (KRYTOX®), where PFPE is perfluoropolyether:

with various chain lengths, for example:

| | |
|---|---|
| KRYTOX ® block: $M_W$ = 1950 g/mol | corresponds to x = 10.7 |
| KRYTOX ® block: $M_W$ = 4,000 g/mol | corresponds to x = 23.0 |
| KRYTOX ® block: $M_W$ = 8,000 g/mol | corresponds to x = 47.1 |
| PEG block: $M_W$ = 400 g/mol | corresponds to y = 7.7 |
| PEG block: $M_W$ = 1,000 g/mol | corresponds to y = 21.8 |

2. PFPE (KRYTOX®)-PolyTHF-PFPE (KRYTOX®), where PFPE is perfluoropolyether:

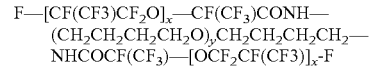

| | |
|---|---|
| KRYTOX ® block: $M_W$ = 1950 g/mol | corresponds to x = 10.7 |
| KRYTOX ® block: $M_W$ = 4,000 g/mol | corresponds to x = 23.0 |
| PTHF block: $M_n$ = 350 g/mol | corresponds to y = 3.9 |
| PTHF block: $M_n$ = 1100 g/mol | corresponds to y = 14.9 |

3. PFPE—alkyls:

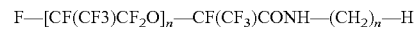

| | |
|---|---|
| KRYTOX ® block: $M_W$ = 1950 g/mol | corresponds to n = 10.7 |

4. Phytol may be used in some cases. Phytol is a branched $C_{18}$ hydrocarbon block that may be linked with an ether bond:

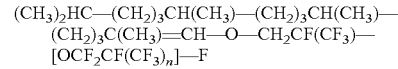

| | |
|---|---|
| KRYTOX ® block: $M_W$ = 1950 g/mol | corresponds to n = 10.7 |

5. PFPE—sugars:
For example, sorbitol can be linked to KRYTOX® with an ether bond:

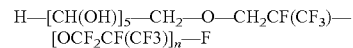

| | |
|---|---|
| KRYTOX ® block: $M_W$ = 1950 g/mol | corresponds to n = 10.7 |

6. Glucosamine is a glucose derivative that may be linked to KRYTOX® with an amide bond:

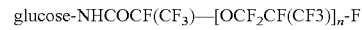

| | |
|---|---|
| KRYTOX ® block: $M_W$ = 1950 g/mol | corresponds to n = 10.7 |

Glucose is a 6 membered heterocycle of the sum formula $C_6O_6H_{12}$, in which the first and the fifth carbon atom are linked to the oxygen atom of the ring. Glucosamine carries an amine group instead of the OH-group at the second carbon atom.

The following documents are incorporated herein by reference in their entirety: U.S. Provisional Patent Application Ser. No. 60/392,195, filed Jun. 28, 2002, entitled "Multiphase Microfluidic System and Method," by Stone, et al.; U.S. Provisional Patent Application Ser. No. 60/424,042, filed Nov. 5, 2002, entitled "Method and Apparatus for Fluid Dispersion," by Link, et al.; U.S. Provisional Patent Application Ser. No. 60/461,954, filed Apr. 10, 2003, entitled "Formation and Control of Fluidic Species," by Link, et al.; U.S. Provisional Patent Application Ser. No. 60/498,091, filed Aug. 27, 2003, entitled "Electronic Control of Fluidic Species," by Link, et al.; U.S. patent application Ser. No. 08/131,841, filed Oct. 4, 1993, entitled "Formation of Microstamped Patterns on Surfaces and Derivative Articles," by Kumar, et al., now U.S. Pat. No. 5,512,131, issued Apr. 30, 1996; International Patent Application No. PCT/US96/03073, filed Mar. 1, 1996, entitled "Microcontact Printing on Surfaces and Derivative Articles," by Whitesides, et al., published as WO 96/29629 on Jun. 26, 1996; U.S. patent application Ser. No. 09/004,583, filed Jan. 8, 1998, entitled "Method of Forming Articles Including Waveguides via Capillary Micromolding and Microtransfer Molding," by Kim, et al., now U.S. Pat. No. 6,355,198, issued Mar. 12, 2002; International Patent Application No. PCT/US01/17246, filed May 25, 2001, entitled "Patterning of Surfaces Utilizing Microfluidic Stamps Including Three-Dimensionally Arrayed Channel Networks," by Anderson, et al., published as Publication No. WO 01/89788 on Nov. 29, 2001; International Patent Application No. PCT/US01/46181, filed May 25, 2001, entitled "Methods and Compositions for Encapsulating Active Agents," by Weitz, et al., published as Publication No. WO 02/47665 on Jun. 20, 2002; International Patent Application No. PCT/US02/23462, filed Jul. 24, 2002, entitled "Laminar Mixing Apparatus and Methods," by Stroock, et al., published as WO 03/011443 on Feb. 13, 2003; and International Patent Application No. PCT/US03/20542, filed Jun. 30, 2003, entitled "Method and Apparatus for Fluid Dispersion," by Stone, et al., published as Publication No. WO 2004/002627 on Jan. 8, 2004. Also incorporated herein by reference is U.S. patent application Ser. No. 11/246,911, filed Oct. 7, 2005, entitled "Formation and Control of Fluidic Species," by Link, et al.; U.S. patent application Ser. No. 11/024,228, filed Dec. 28, 2004, entitled "Method and Apparatus for Fluid Dispersion," by Stone, et al.; International Patent Application No. PCT/US2006/007772, filed Mar. 3, 2006, entitled "Method and Apparatus for Forming Multiple Emulsions," by Weitz, et al.; and U.S. patent application Ser. No. 11/360,845, filed Feb. 23, 2006, entitled "Electronic Control of Fluidic Species," by Link, et al.

The following applications are each incorporated herein by reference: U.S. Provisional Patent Application Ser. No. 60/659,045, filed Mar. 4, 2005, by Weitz, et al.; U.S. Provisional Patent Application Ser. No. 60/498,091, filed Aug. 27, 2003, by Link, et al.; U.S. Provisional Patent Application Ser. No. 60/392,195, filed Jun. 28, 2002, by Stone, et al.; U.S. Provisional Patent Application Ser. No. 60/424,042, filed Nov. 5, 2002, by Link, et al.; U.S. Pat. No. 5,512,131, issued Apr. 30, 1996 to Kumar, et al.; International Patent Publication WO 96/29629, published Jun. 26, 1996 by Whitesides, et al.; U.S. Pat. No. 6,355,198, issued Mar. 12, 2002 to Kim, et al.; International Patent Application Serial No.: PCT/US01/16973, filed May 25, 2001 by Anderson, et al., published as WO 01/89787 on Nov. 29, 2001; International Patent Application Serial No. PCT/US03/20542, filed Jun. 30, 2003 by Stone, et al., published as WO 2004/002627 on Jan. 8, 2004; International Patent Application Serial No. PCT/US2004/010903, filed Apr. 9, 2004 by Link, et al.; U.S. Provisional Patent Application Ser. No. 60/461,954, filed Apr. 10, 2003, by Link, et al.; International Patent Application Serial No. PCT/US2004/027912, filed Aug. 27, 2004, by Link, et al.; U.S. Provisional Patent Application Ser. No. 60/659,046, filed Mar. 4, 2005, entitled "Systems and Methods of Forming Particles," by Garstecki, et al.; and a U.S. utility patent application, entitled "Systems and Methods of Forming Particles," by Garstecki, et al., filed on even date herewith.

The following examples are intended to illustrate certain embodiments of the present invention, but are not to be construed as limiting and do not exemplify the full scope of the invention.

EXAMPLE 1

The following is an example of a procedure for forming an amide bond between a headgroup and a fluorophilic component of a surfactant:

Chemicals:
  PEG-diamine ($M_w$=400 from Tomah)
  KRYTOX® methylester (KRYTOX®-COOMe) ($M_w$=1900)
  THF (dry) or $CH_2Cl_2$ (dry)
  HFE 7100 (added molecular sieve to ensure dryness)
  possibly molecular sieves for drying
  for purification (removal of excess KRYTOX®-COOMe): Aminomethylstyrene-crosslinked Materials:
  stirrer
  distillation setup, or a rotavap
  flasks (100 ml), stirrers and standard equipment like glass syringes (Pyrex), funnel, etc.

Procedure:
  1.) Dissolve 0.5 g of PEG-diamine (400 g/mol) (Tomah) in 15 ml THF. Use a 50 ml or 100 ml flask.
  2.) Dissolve 4.69 g KRYTOX®methylester (1,900 g/mol, corresponds to 10% excess considering the presence of 25% PEG-monoamine in the Tomah product) in 10 ml HFE 7100.
  3.) Mix the solutions from 1.) and 2.) and stir at room temperature overnight (or up to several days) in a tightly sealed flask. Do not heat.
  4.) Suggestion for purification: If a greater excess of KRYTOX®-COOMe is applied, Aminomethylstyrene may be used to remove it. Add a 10 fold excess with respect to the excess of KRYTOX®-COOMe and stir overnight. Filter off and rinse with a 60:40 mixture by volume of THF:HFE 7100.
    Secondly, precipitation of the surfactant in a suitable solvent mixture may be used for removing unreacted PEG-reactant. Unreacted PEG phase-separates and can cream, dragging along some of the solvent. This phase can be easily decanted.
    At the same time, the can surfactant phase-separate to form a fluffy precipitate in the lower, fluorocarbon-rich phase. This may be due to the low solubility of the PEG-blocks in the solvent mixture.
  5.) Evaporate the solvent mixture not exceeding a temperature of 40° C. (Rotavap).

Remarks:
One alternative solvent: 1:1 mixture of $CH_2Cl_2$ and HFE 7100.

Other block lengths of the PEG and the KRYTOX®-block have been applied. One good combination seems to be Tomah PEG-diamine (400 g/mol) and KRYTOX® methylester (4,000 g/mol). In all of these experiments the stochiometric ratio was kept constant. Reaction times were increased with increasing chain length and were varied at room temperature from one day to one week.

EXAMPLE 2

This example illustrates the following procedure for forming an ester bond between a headgroup and a fluorophilic component of a surfactant:

Chemicals:
PEG—dicarboxylic acid ($M_w$=600, from Sigma-Aldrich)
KRYTOX® Alcohol (Mw=1900)
$SOCl_2$
4-Polyvinylpyridine (2% cross-linked, from Sigma-Aldrich)
DMF (dry, as a catalyst, however: only small amount)
$CH_2Cl_2$ (best if dry—Sure Seal bottle or DrySolv)
THF (dry)
HFE 7100
possibly molecular sieves for drying Materials:
hot plate stirrer with external temperature probe
oil bath
reflux setup with balloon
glass filter/column with silica/glass wool
distillation setup—or ideally a rotavap, balance
flasks (100 ml), stirrers and standard equipment like glass syringes (Pyrex), funnel, etc.

Procedure:
1) Dissolve 1 g dicarboxy-PEG in 10 ml methylenechloride. Helpful: Use a 100 ml flask.
2) Add 0.8 g (0.6 ml) thionylchloride (corresponds to 2-fold excess), while cooling the flask on ice. Don't use plastic syringes.
3) Add approximately 15 drops of dimethylformamide as a catalyst from a 20 gauge needle.
4) Take to room temperature and let react for half an hour, then heat to 36° C. and let react overnight. Put a reflux column to the flask, the top of it was closed with a balloon ($H_2O$ sensitive compounds, HCl-formation).
5) Evaporate methylenechloride, thionylchloride and DMF (distillation, best with rotavap). Try not to exceed 40° C., as this may produce unexpected reactions and color changes due to $SOCl_2$. Keep under vacuum for 2 hours to make sure everything has evaporated.
6) Add 6 ml THF to the PEG acid chloride (tune viscosity).
7) Add 0.85 g Polyvinylpyridine (2-fold excess) for neutralization, stir well.
8) Add 9.5 g KRYTOX® alcohol (about a 1.5-fold excess) dissolved in a mixture of 12 ml THF and 12 ml HFE 7100 under cooling in an ice-bath.
Remark: This is a rough minimum of the amount of solvent needed. At room temperature, there will be two phases, but at 50° C. the upper THF phase will dissolve. For more solvent, add a 60:40% v/v mixture of THF: HFE 7100.
9) Stir vigorously for 30 minutes at room temperature (in order to disperse the solid polyvinylpyridine well).
Then heat up to about 56-60° C. and let react overnight. It may include a reflux column with a balloon on top.
10) After cooling down, filtrate over a glass filter funnel or a bed of 2 cm silica. Use a 60:40 mixture of THF and HFE 7100 for washing, the polyvinylpyridine and the filter. Filtration can be done after 1 day, but not much may came off upon washing in some cases.
11) Further purification: evaporate solvent. A precipitate of the fluoro-compound(s) may be formed by increasing the THF-concentration.

EXAMPLE 3

For testing emulsion stabilities of the emulsions shown in Table 1, the emulsions were formulated containing Fluorinert Electronic Liquid FC 40 fluorocarbon oil (available from 3M) with 1.6 wt % of the respective fluorosurfactant. FC 40 is a perfluoro compound with primarily compounds with 12 carbons, with the hydrogen replace by F. 10% v/v with respect to the fluorocarbon phase and the alcohol was added. Emulsification was carried out by first turning over the vessel, then shaking it by hand for 15 s and finally shaking it vigorously by hitting the edge of a table for an additional 15 s and for an additional minute, if emulsification was insufficient.

EXAMPLE 4

This example describes the synthesis of polyurethane particles using articles and methods described herein, according to one embodiment of the invention. In this example, the emulsions were formed by shaking the precursor and a fluorocarbon oil in the presence of fluorosurfactant.

Polyurethane latexes were synthesized from a stochiometric ratio of polyethylene glycol (a dialcohol) of a molecular weight of about 200 g/mol with hexanediisocyanate to form urethane bonds. This was emulsified in a fluorocarbon phase comprising the oil FC 40 and 1.6 wt % of the surfactant E2K 0420.

Emulsification of the polyurethane precursor yielded separate droplets with a similar chemical composition as the precursor liquid. Crude emulsions were obtained by shaking up the precursor and a fluorocarbon oil in the presence of fluorosurfactant, yielding a polydisperse precursor emulsion.

The resulting rubbery polymer resembled soft blocks of Spandex. At high degrees of polymerization, the liquid precursor became solid. Therefore, the mechanical properties of the product was used as a measure of conversion.

Figure 8A:
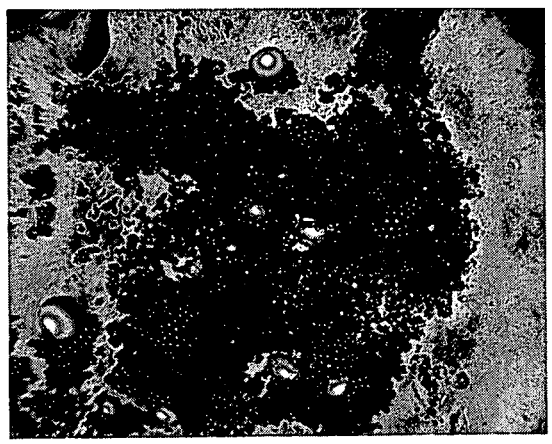
FIGS. 8A and 8B are bright-field and fluorescent micrographs, respectively, showing fluorescein-labelled polyurethane particles formed by suspension polymerization according to one embodiment of the invention.

One way to confirm that the use of a continuous fluorocarbon phase results in a high degrees of polymerization or solid particles is by removing the continuous fluorocarbon phase through evaporation. Only solid particles have the mechanical rigidity to resist coalescence and retain their spherical shape in spite of capillary forces. This was tested with a crude polydisperse precursor emulsion obtained by shaking. FIG. 8A shows a bright field micrograph of such an emulsion after partial conversion; it displays both patches of coalesced droplets and solid particles upon drying.

Figure 8B:
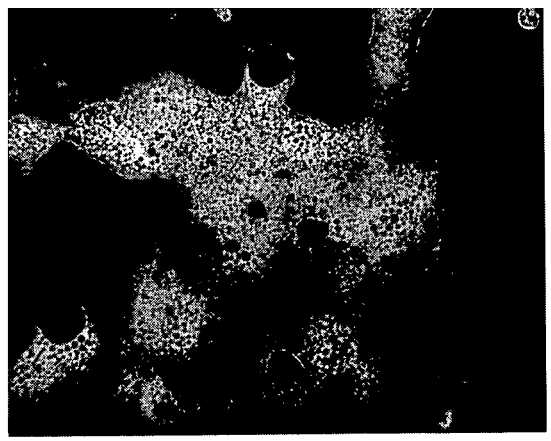

An additional probe for conversion is the presence of fluorescein, a fluorescent dye added to the reaction mixture prior to emulsification. Fluorescein is quenched in the presence of isocyanates and does not fluoresce. Fluorescence reappears, however, as the isocyanate is used up in the course of the reaction. Cross-polarization microscopy (FIG. 8B) shows the low conversion of the coalesced patches by the absence of fluorescence, and the higher conversion of the un-coalesced particles by its presence. The presence of solid particles indicates that the fluorosurfactants may be suited for stabilizing polyurethane precursor emulsions in fluorocarbon oils in some cases. Moreover, it demonstrates the benefits of this water-free emulsion system by maintaining a generally stochiometric ratio of water-sensitive isocyanate and alcohol moieties. This confirms that there were, at best, very low levels of water present that could degrade the isocyanate precursor. In this case, if water was present, the stochiometric ratio of the reagents would be shifted and conversions would remain too low to yield solid particles with the applied precursors. Hence, this example demonstrates that organic droplets in fluorocarbon oils may be stable. Such emulsions can provide a water-free system that may allow a wide range of organic synthetic reactions to be performed inside droplets that represent veritable mini-reactors.

EXAMPLE 5

This example describes the synthesis of polyurethane particles using articles and methods as described herein in various embodiments of the present invention. In this example, the emulsions were formed using flow focusing techniques.

Polyurethane latexes were synthesized from a generally stochiometric ratio of polyethylene glycol (a dialcohol) of a molecular weight of 200 g/mol with hexanediisocyanate to form urethane bonds. This was emulsified in a fluorocarbon phase comprising the oil FC 40 and 1.6 wt % of the surfactant E2K 0420.

Emulsions with control over the droplet size were obtained by hydrodynamic flow focusing in microfluidic devices. For the rapid prototyping of such devices, soft lithography was used to form devices in polydimethylsiloxane (PDMS). Monodisperse emulsion droplets were formed when co-flowing streams of the continuous and of the precursor phase were forced into one microfluidic output channel. Surface tension caused the disperse stream to break up into discrete droplets. A surfactant that is dissolved in the continuous phase adsorbed to the newly formed interfaces of the droplets, thereby stabilizing the droplets against coalescence.

Figure 9A:
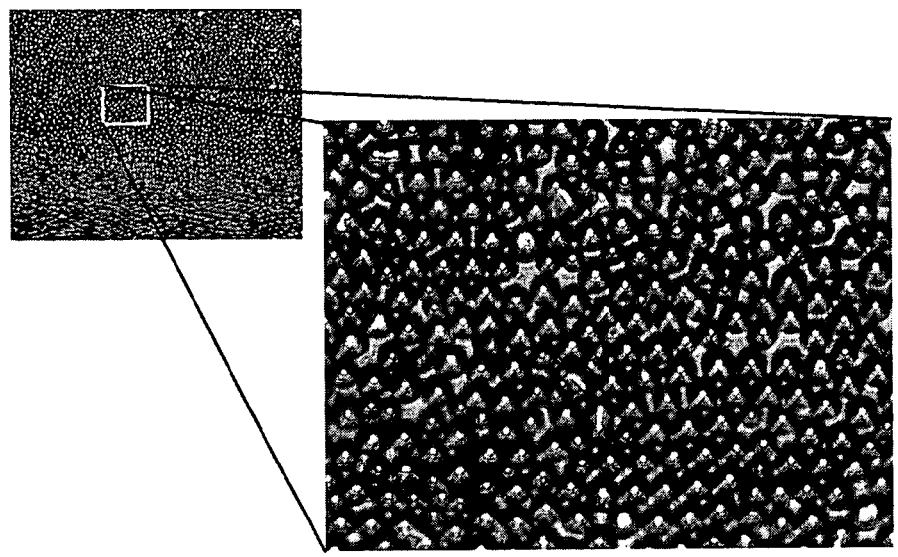
FIG. 9A is a micrograph showing a monodisperse precursor emulsion in a fluorophilic continuous phase according to one embodiment of the invention.
Figure 9B:
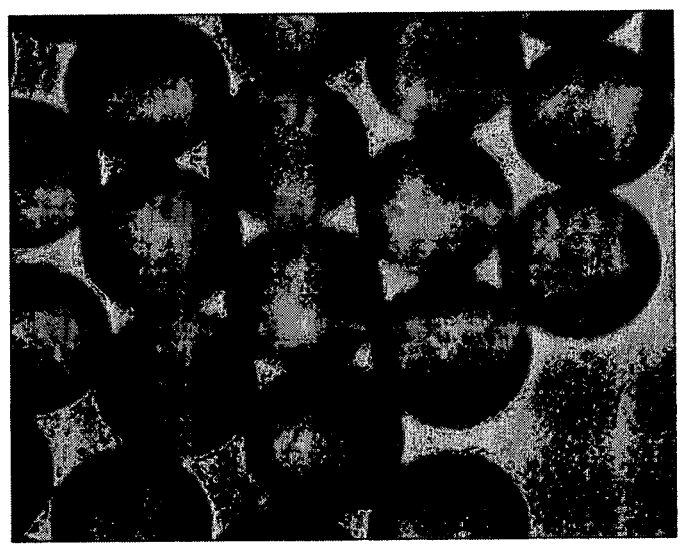
FIG. 9B is a micrograph showing dried monodisperse polyurethane latex particles according to one embodiment of the invention.

FIG. 9A shows a monodisperse PU-precursor emulsion in fluorocarbon oil. Its polymerization yields monodisperse particles (FIG. 9B). Upon drying, the fully converted particles exhibited small wrinkles on their surfaces. However, these wrinkles may be due to particle deformations on the glass slide that arose from the low glass transition temperature of the polymer, and can be prevented by using other substrates.

These results demonstrate that control over the particle size is possible by combining microfluidic emulsification with suspension polymerization. Moreover, it shows that the applied surfactant allowed for emulsification through hydrodynamic flow focusing and that it stabilized the fluorocarbon based emulsions sufficiently against coalescence throughout the polymerization and even at elevated temperature.

EXAMPLE 6

Figure 13A:
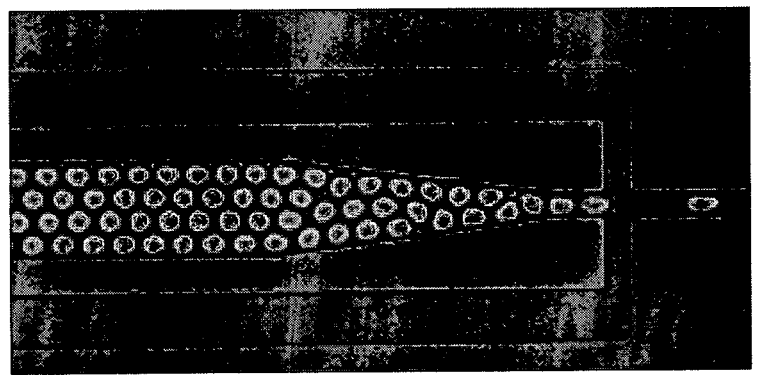
FIGS. 13A and 13B show reinjection and collection of aqueous droplets into a microfluidic device according to one embodiment of the invention.

FIG. 13A shows reinjection of aqueous droplets into a microfluidic device containing 3% BSA and 0.1% Zonyl FSN with respect to water. The continuous phase was FC 40, the surfactant E2K 0420 (100 mg E2K 0420 added to 3 ml FC 40, which was equivalent to about 1.6%).

Figure 13B:
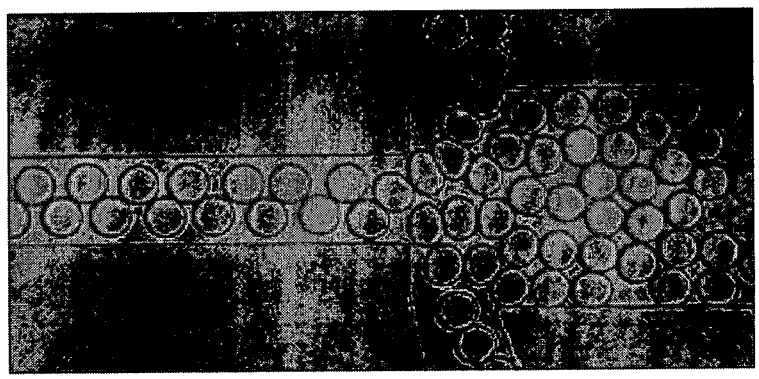

FIG. 13B shows the same system as described in FIG. 13A, illustrating collection (before reinjection) of the droplets. The droplets were observed to be somewhat deformed. However the droplets did not coalesce, which is an indication of the stability of the droplets.

Figure 14:
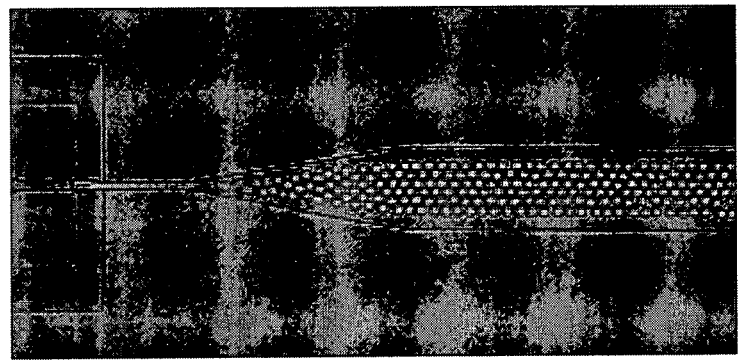
FIG. 14 illustrates the formation of droplets by hydrodynamic flow focusing and the stability of the droplets immediately after emulsification according to one embodiment of the invention.

FIG. 14 shows the same system as described in FIG. 13A and illustrates the formation of droplets by hydrodynamic flow focusing. The droplets were stabilized immediately after emulsification so that they would not coalesce. The droplets came into contact immediately after their formation, but did not coalesce, which suggests that rapid diffusion of the fluorosurfactants to the newly formed interfaces had occurred.

Figure 15:
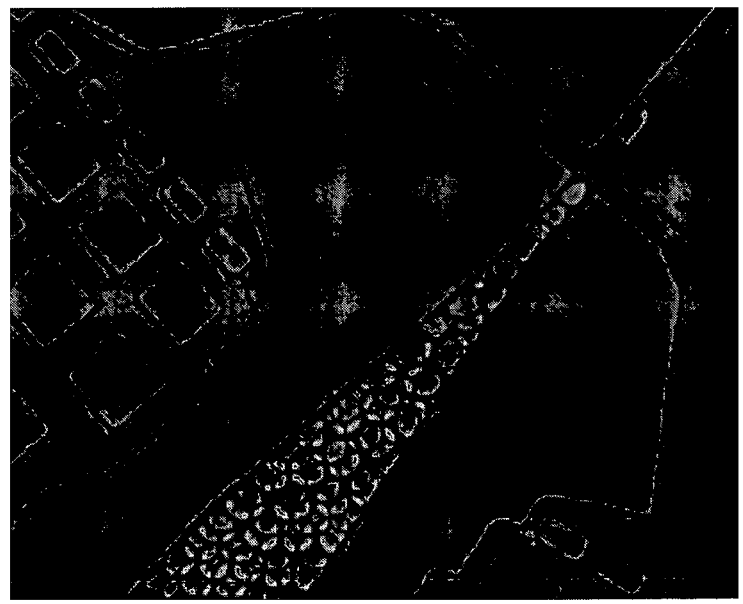
FIG. 15 shows monodisperse droplets formed in microfluidic devices containing viable yeast cells according to one embodiment of the invention.

FIG. 15 shows monodisperse droplets formed in microfluidic devices containing viable yeast cells. This example shows that monodisperse droplets may be formed with a E2K 0420 surfactant.

EXAMPLE 7

This example illustrates the synthesis of certain surfactants of the present invention, specifically AEH12, AEH14, AEH19, AEH22, AEH23, AEH100, AEH101, AEH102, AEH103, AEH104, AEH105, AEH106, or AEH107.

The perfluoroether and Krytox FS(H) were purchased from Dupont. The PEG was PEG monomethoxy with a molar mass of 750 g/mol (purchased from Sigma-Aldrich). All other chemicals were purchased from Sigma-Aldrich.

Thin-layer chromatography (TLC) analyses were performed on RP-18 silica gel F-254 plates (Merck). Silica gel (70-230 mesh, Merck) was used for column chromatography.

Synthesis of AEH12 head group. 3.14 g of 2-phenylethanol (20.45 mmol) and 7.1 ml of triethylamine (2.5 eq) were dissolved in 50 ml of dry tetrahydrofuran (THF) and added dropwise, at 0° C. and under anhydrous nitrogen, to 3.14 g of phosphorus oxytrichloride (20.45 mmol) in 100 ml of THF. The mixture was stirred at 0° C. for 3 hours. A solution of 3.56 g morpholine (40.90 mmol) and 14.2 ml triethylamine (2.5 eq) in 50 ml of THF was then added dropwise to the stirred reaction mixture, which was maintained free of oxygen and cooled with an ice-bath. After stirring for 18 hours the mixture was allowed to warm to room temperature, triethylamine hydrochloride was filtered off, and the solvent and excess of amine were removed under vacuum. The clear oily residue was dried under reduced pressure and purified by chromatography (ethyl acetate/methanol 9:1). The yield of this reaction was 70% (P,P-dimorpholino P-(2-phenylethyloxyd) phosphate). Purity was determined by TLC ($R_f$ value: 0.7, ethyl acetate/methanol 9:1).

Figure 16A:
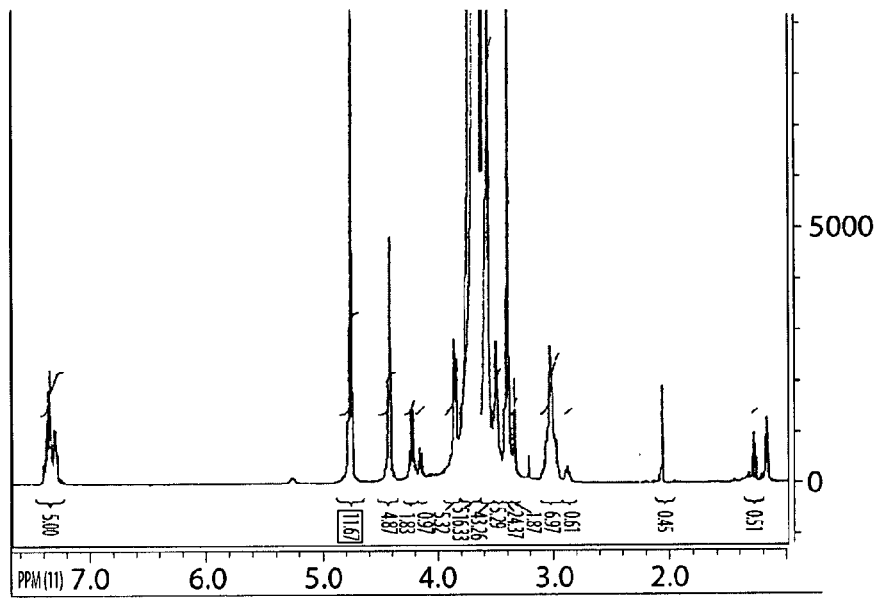
FIGS. 16A-16C illustrate NMR spectra of certain compounds of the invention.
Figure 16B:
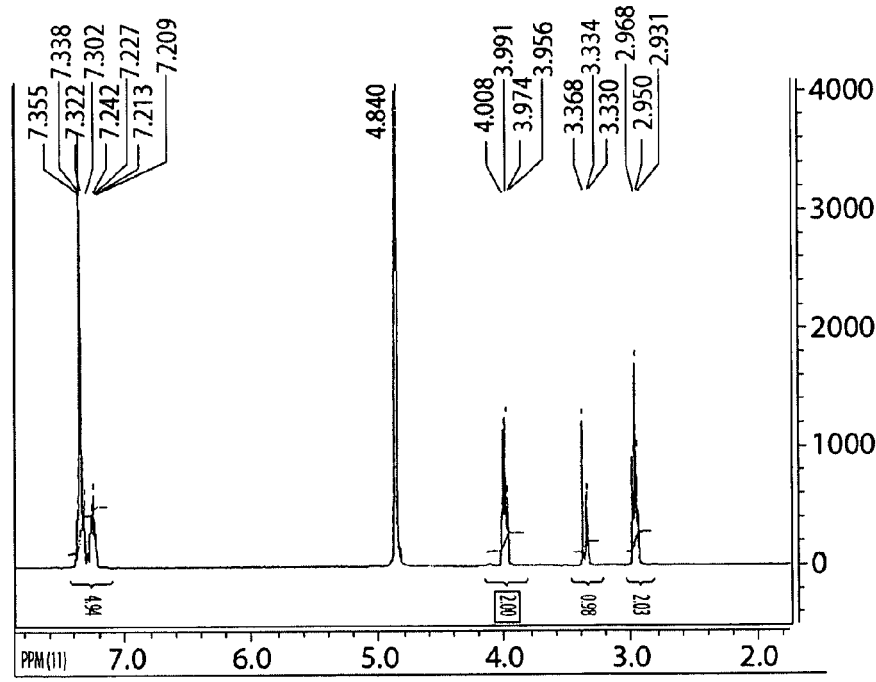
Figure 16C:
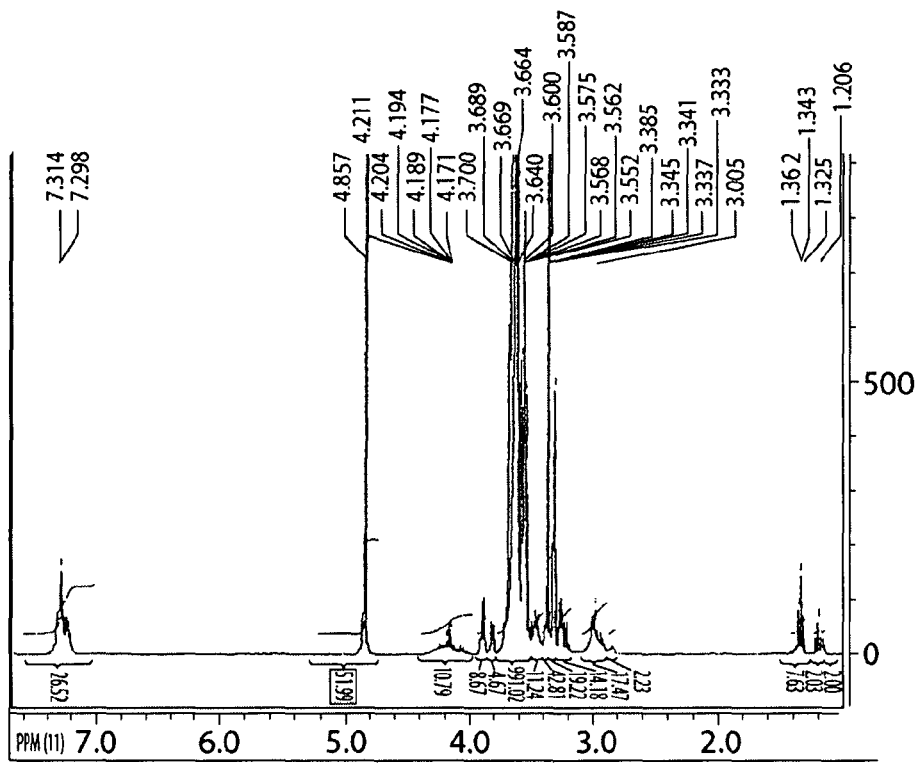
Figure 17A:
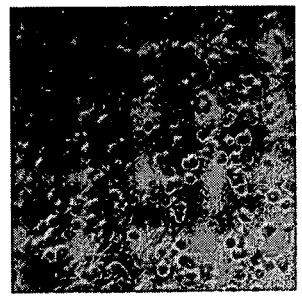
FIGS. 17A-17H illustrate cells exposed to various surfactants of the invention.
Figure 17B:
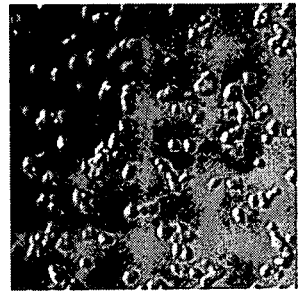
Figure 17C:
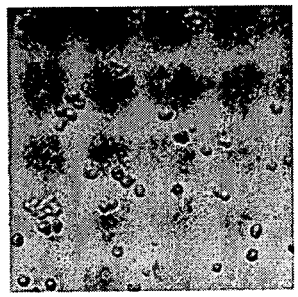
Figure 17D:
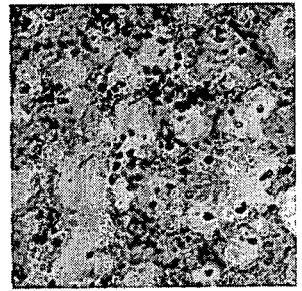
Figure 17E:
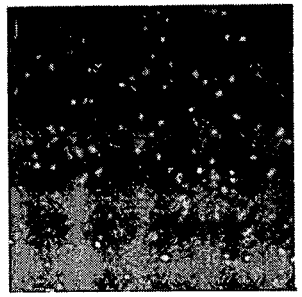
Figure 17F:
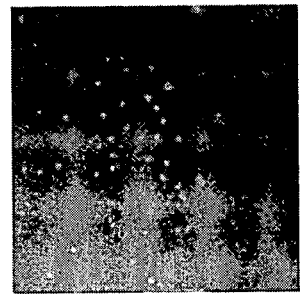
Figure 17G:
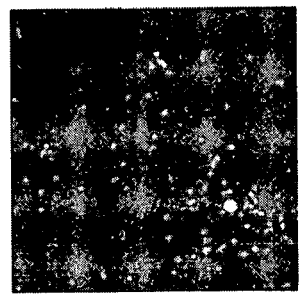
Figure 17H:
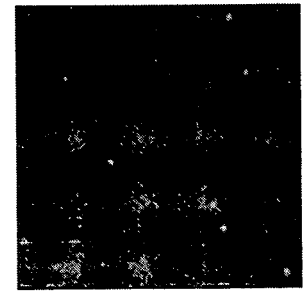

Synthesis of other head groups. The same procedure was applied for the synthesis of the other head groups, substituting with the appropriate components where necessary. Following synthesis, the structures of some of the head groups were verified by $^1H$ nuclear magnetic resonance (NMR). NMR spectra for AEH12, AEH14, and AEH19 were collected using a Bruker AC 400 spectrometer and are shown in FIGS. 16A-16C.

Preparation of the acyl chloride of Krytox FS(H). The acyl chloride of Krytox FS(H) was prepared by adding an excess of thionyl chloride (4 equivalents) under an anhydrous atmosphere and vigorously mixing for 1 hour. After this time, the excess of thionyl chloride was removed under vacuum.

Grafting the acyl chloride of Krytox FS(H) to the P,P-dimorpholino P-(2-phenylethyloxyd) phosphate. The acyl chloride of Krytox FS(H) tail was grafted to the P,P- dimorpholino P-(2-phenylethyloxyd) phosphate head group using a Friedel-Craft reaction. A solution of 0.78 g of the P,P-dimorpholino P-(2-phenylethyloxyd) phosphate head group (0.68 mmol) and 0.11 g (1.2 eq) of aluminium trichloride were mixed in 50 ml of THF and stirred under reflux for 1 hour. Then, under vigorous agitation, 2.27 g of the acyl chloride of Krytox FS(H) was then added and the reaction mixture was stirred under reflux overnight.

The THF was removed under vacuum by rotary evaporation. The residual white viscous mixture was resuspended in Fluorinert Electronic Liquid FC-3283 and filtered on Celite 545. The celite was washed with 200 ml of FC-3283 to recover all of the surfactant. The filtrate was then distilled under vacuum by rotary evaporation to remove the FC-3283 and recover the final product: AEH12.

Grafting the acyl chloride of Krytox FS(H) to the other head groups. The same procedure was applied for the synthesis of all the other surfactants, substituting with the appropriate components where necessary.

Characterization of the surfactants: Emulsion stability. Water-in-oil (w/o) emulsions were generated in a microfluidics device (a "droplet-former") using a flow-focusing geometry to form the droplets. An aqueous stream was infused from one channel through a narrow constriction with oil streams on either side hydrodynamically-focusing the water stream. Different combinations of flow rates and/or device geometries generated steady streams of uniform droplets of water in oil with volumes in the range of 10-500 pl.

The oil phase in each experiment was formed from the fluorocarbon oil Fluorinert Electronic Liquid FC-40 (manufactured by 3M) containing the dissolved surfactant of interest. The aqueous phase was phosphate-buffered saline (PBS).

To determine the stability of each emulsion, the emulsion was collected in a Hamilton glass syringe and then reloaded into the droplet-forming device using the same oil phase to space out the droplets. An emulsion was considered stable in this example if more than 99% of the droplets were not coalesced on reloading.

Results. The following surfactants generated stable w/o emulsions using the methodology described above when the surfactant concentration was in the range 0.5-2.5% (w/w): AEH12, AE14, and AEH19. The other surfactants were not tested in this example.

Compatibility with mammalian cells. 100 microliters of FC-40 oil containing a surfactant of interest were pipetted into the well of a clear 96-well plate. 100 microliters of a cell suspension containing $1.5 \times 10^4$ cells in Dulbecco's Modified Eagle's Medium supplemented with 10% (v/v) fetal bovine serum were then layered on top of the oil in each well. The cells were detached human HEK 293T expressing green fluorescent protein (GFP). After 24 hours the cells were examined by bright-field and fluorescence microscopy.

After 24 hours, bright-field microscopy revealed that the cells seeded directly on the well bottom (a control), on FC-40 alone, and on FC-40 containing AEH12 were healthy (FIGS. 17A-17H). The cells seeded on FC-40 containing the non-biocompatible surfactant R22 (Raindance Technologies) were unhealthy and appeared lysed. Fluorescence microscopy, revealing the distribution of intact GFP-containing cells, supported these observations. In FIG. 17, FIGS. 17A to 17D are bright-field microscope images of HEK 293T cells on the following surfaces: (17A) the bottom of a plastic well (control); (17B) FC-40 oil; (17C) FC-40 oil containing 2.5% (w/w) AEH12; and (17D) FC-40 oil containing 2.5% (w/w) R22. FIGS. 17E to 17H are fluorescence microscope images of the same samples.

Compatibility with in vitro transcription-translation. An in vitro transcription-translation reaction was prepared by adding 5 nM of "T7 promoter-evolved β-galactosidase (EBG) Class IV-T7 terminator" DNA fragments and 500 micromolar fluorescein di-β-D-galactopyranoside (FDG) to a Novagen EcoPro T7 transcription-translation reaction (EMD Biosciences). A control reaction containing no DNA fragments was prepared as well. Each reaction was emulsified in FC-40 containing 2.5% (w/w) AEH19 using a droplet-forming device. The droplets generated in each case were 10 pl in volume. Each emulsion was collected and incubated at 30° C. for 1.5 hours and then reloaded into the droplet-forming device. Several thousand droplets from each emulsion were stimulated with 488 nm-wavelength laser light and their emissions in the fluorescein channel were measured.

Figure 18:
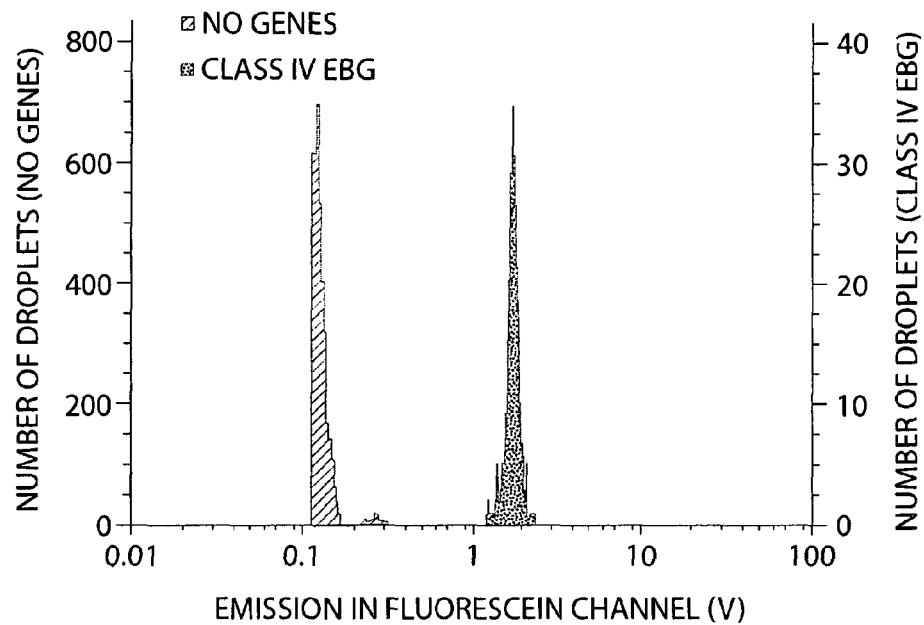
FIG. 18 illustrates the expression of genes in cells exposed to a surfactant, in accordance with one embodiment of the invention.

After 1.5 hours at 30° C. it was observed that the droplets containing the EBG Class IV genes exhibited much greater fluorescence than droplets containing no genes per droplet (FIG. 18). This figure shows histograms of emissions in the fluorescein channel for populations of droplets containing transcription-translation reactions. The grey histogram corresponds to the droplets containing EBG Class IV genes. The black histogram corresponds to the droplets containing no genes. It was concluded that the fluorescent signal of the former population was increased due to the presence of the genes; thus, the genes inside the droplets were transcribed and translated, resulting in the production of an enzyme (EBG Class IV) that was able to cleave the non-fluorescent substrate FDG, releasing fluorescent fluorescein.

Compatibility with purified enzymes. An enzymatic reaction containing the following components was prepared: 50 mM Tris HCl pH 8, 10 mM calcium chloride, 10 mM ethylamine, 200 micromolar phenazine methosulphate (PMS), 100 micromolar resazurin, 10 micromolar pyrroloquinoline quinone (PQQ), and alcohol dehydrogenase (ADH) protein in 0.05% (v/v) ethanol. For each surfactant, 200 microliters of this aqueous solution were emulsified in 200 microliters of FC-40 containing the surfactant of interest by vigorously shaking for 1 minute. 50 microliters of each emulsion was transferred to the well of a black 96-well plate. Every 4 seconds, the wells of the plate were stimulated with 540 nm-wavelength light and the resulting emissions at 590 nm-wavelength were measured.

Figure 19:
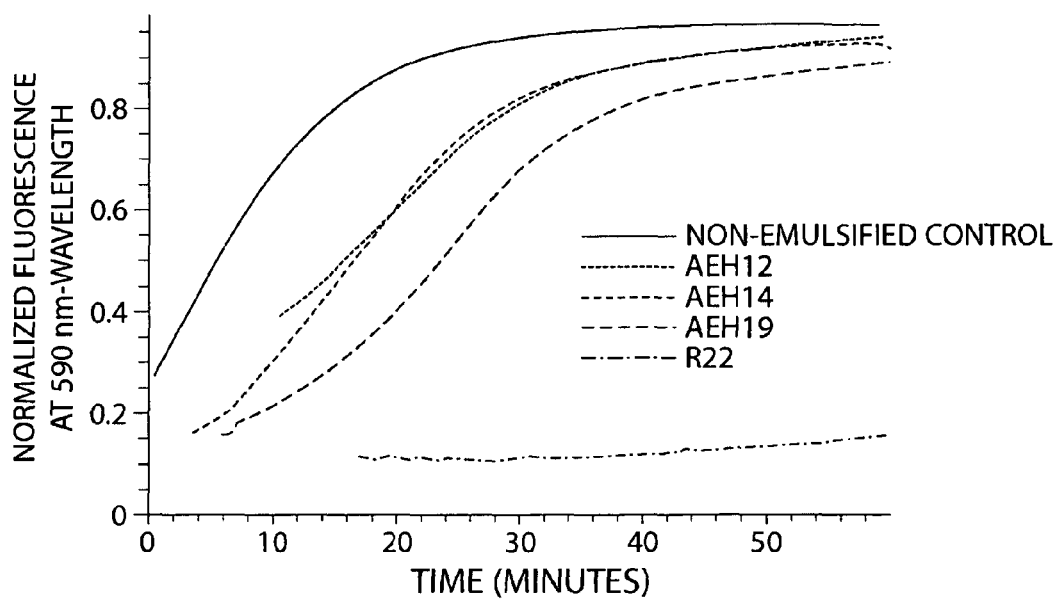
FIG. 19 illustrates an enzymatic reaction, in accordance with another embodiment of the invention.

The enzymatic reaction described above should generate fluorescent resorufin by reducing the non-fluorescent resazurin when the ADH is active. The reaction profiles for the different surfactants revealed that emulsification of the reaction using the surfactants AEH12, AEH14, and AEH19 was not detrimental to its progress (FIG. 19). Conversely, emulsification of the reaction using the non-biocompatible surfactant R22 appeared to significantly reduced the rate of the reaction.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of", when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A surfactant, comprising a block copolymer including a perfluorinated polyether (PFPE) block coupled to a polyethylene glycol (PEG) block via an amide bond, wherein the PFPE block comprises a formula of $F(CF(CF_3)CF_2O)_x$—$CF(CF_3)CONH$—, wherein x is an integer greater than or equal to 8; and the PEG block comprises a formula of—$(C_nH_{2n}O)_y$—or —$(C_nH_{2n}O)_y$—$CH_3$, wherein n is a positive integer and y is an integer greater than or equal to 10.

2. The surfactant of claim 1, wherein the surfactant comprises one block of PFPE and one block of PEG.

3. The surfactant of claim 1, wherein the surfactant comprises two blocks of PFPE and one block of PEG.

4. A composition comprising the surfactant of claim 1.

5. The composition of claim 4, further comprising a hydrophobic liquid.

6. The composition of claim 4, further comprising an aqueous liquid.

7. The composition of claim 4, further comprising a fluorinated oil and an aqueous liquid.

8. The composition of claim 7, wherein the aqueous liquid additionally comprises biological molecules.

9. The composition of claim 8, wherein the biological molecules comprise nucleic acids.

10. A method of forming aqueous droplets, comprising:
providing a microfluidic device;
providing an aqueous liquid to the microfluidic device;
providing a fluorinated liquid to the microfluidic device;
providing a surfactant comprising a block copolymer that includes a perfluorinated polyether (PFPE) block coupled to a polyethylene glycol (PEG) block via an amide bond, and comprises a formula —$(C_nF_{2n}O)_x$—$(C_mF_{2m})_y$—$CONH$— wherein n, m, x, and y are positive integers; and
forming aqueous droplets in the fluorinated liquid in the presence of the surfactant.

11. The method of claim 10, wherein the microfluidic device comprises a first channel intersecting a second channel at a junction.

12. The method of claim 11, wherein the aqueous liquid flows in the first channel and the fluorinated liquid flows in the second channel.

13. The method of claim 12, wherein the aqueous droplets are formed at the junction.

14. The method of claim 13, wherein the microfluidic device includes a nozzle, and the droplets form after the aqueous and fluorinated liquids pass through the nozzle.

15. The method of claim 10, wherein the aqueous droplets comprise biological molecules.

16. The method of claim 15, wherein the biological molecules comprise nucleic acids.

17. The method of claim 10, wherein the aqueous droplets comprise buffers, salts, nutrients, therapeutic agents, drugs, hormones, antibodies, analgesics, anticoagulants, anti-inflammatory compounds, antimicrobial compositions, cytokines, growth factors, interferons, lipids, polymers, polysaccharides, polypeptides, protease inhibitors, cells, RNA, DNA, vasoconstrictors, vasodilators, vitamins, minerals, or stabilizers.

18. The method of claim 10, wherein the aqueous droplets comprise fluorescent molecules.

19. The method of claim 10, wherein the surfactant comprises the formula $-(CF(CF_3)CF_2O)_x-CF(CF_3)CONH-$, wherein x is greater than or equal to 8.

20. A method of forming aqueous droplets, comprising:
providing a microfluidic device;
providing an aqueous liquid to the microfluidic device;
providing a fluorinated liquid to the microfluidic device;
providing a surfactant of claim 1, and
forming aqueous droplets in the fluorinated liquid in the presence of the surfactant.

* * * * *